(12) United States Patent
Binz et al.

(10) Patent No.: US 12,435,445 B2
(45) Date of Patent: *Oct. 7, 2025

(54) DESIGNED ANKYRIN REPEAT DOMAINS WITH ALTERED SURFACE RESIDUES

(71) Applicant: MOLECULAR PARTNERS AG, Zurich-Schlieren (CH)

(72) Inventors: Hans Kaspar Binz, Zurich-Schlieren (CH); Johannes Schilling, Ehrendingen (CH); Patrik Forrer, Steinen (CH); Victor Levitsky, Birmensdorf (CH); Natalia Venetz, Zurich (CH); Marcel Walser, Winterthur (CH)

(73) Assignee: Molecular Partners AG, Zurich-Schlieren (CH)

( * ) Notice: Subject to any disclaimer, the term of this patent is extended or adjusted under 35 U.S.C. 154(b) by 239 days.

This patent is subject to a terminal disclaimer.

(21) Appl. No.: 18/153,576

(22) Filed: Jan. 12, 2023

(65) Prior Publication Data

US 2023/0340698 A1 Oct. 26, 2023

Related U.S. Application Data

(63) Continuation of application No. 17/400,471, filed on Aug. 12, 2021, now Pat. No. 11,578,427, which is a continuation of application No. PCT/EP2020/085855, filed on Dec. 11, 2020.

(30) Foreign Application Priority Data

| Dec. 11, 2019 | (EP) | 19215433 |
| Dec. 11, 2019 | (EP) | 19215434 |
| Dec. 11, 2019 | (EP) | 19215435 |
| Dec. 11, 2019 | (EP) | 19215436 |
| Mar. 4, 2020 | (EP) | 20161059 |
| Jun. 19, 2020 | (EP) | 20181234 |

(51) Int. Cl.
*C40B 40/10* (2006.01)
*A61K 38/00* (2006.01)
*C07K 14/47* (2006.01)

(52) U.S. Cl.
CPC .............. *C40B 40/10* (2013.01); *C07K 14/47* (2013.01); *A61K 38/00* (2013.01); *C07K 2318/20* (2013.01)

(58) Field of Classification Search
None
See application file for complete search history.

(56) References Cited

U.S. PATENT DOCUMENTS

| 7,417,130 | B2 | 8/2008 | Stumpp et al. |
| 8,710,187 | B2 | 4/2014 | Binz et al. |
| 8,722,618 | B2 | 5/2014 | Jacobs et al. |
| 8,846,577 | B2 | 9/2014 | Steiner et al. |
| 8,901,076 | B2 | 12/2014 | Binz et al. |
| 9,163,070 | B2 | 10/2015 | Baumann |
| 9,221,892 | B2 | 12/2015 | Binz |
| 9,284,361 | B2 | 3/2016 | Steiner et al. |
| 9,365,629 | B2 | 6/2016 | Parmeggiani et al. |
| 9,458,211 | B1 | 10/2016 | Bakker et al. |
| 9,717,802 | B2 * | 8/2017 | Binz .................. A61P 35/00 |
| 10,370,414 | B2 | 8/2019 | Fiedler et al. |
| 10,717,772 | B2 | 7/2020 | Metz et al. |
| 11,466,062 | B2 * | 10/2022 | Amstutz .................. C07K 14/47 |
| 11,578,427 | B2 * | 2/2023 | Binz .................. C12N 15/62 |
| 2008/0206201 | A1 | 8/2008 | Beier et al. |
| 2012/0277143 | A1 | 11/2012 | Jacobs et al. |
| 2015/0284463 | A1 | 10/2015 | Tamaskovic et al. |
| 2016/0251404 | A1 | 9/2016 | Tresch et al. |
| 2016/0362453 | A1 | 12/2016 | Bakker et al. |
| 2020/0385488 | A1 | 12/2020 | Reichen et al. |
| 2021/0347835 | A1 | 11/2021 | Amstutz et al. |
| 2021/0395318 | A1 | 12/2021 | Rigamonti et al. |
| 2022/0106707 | A1 | 4/2022 | Levitsky et al. |

FOREIGN PATENT DOCUMENTS

| EP | 2 738 180 A1 | 6/2014 |
| WO | WO 2003/070752 A2 | 8/2003 |
| WO | WO 2009/015842 A2 | 2/2009 |
| WO | WO 2014/060365 A1 | 4/2014 |
| WO | WO 2014/083208 A1 | 6/2014 |
| WO | WO 2015/136072 A1 | 9/2015 |
| WO | WO 2016/023898 A1 | 2/2016 |
| WO | WO 2016/154246 A1 | 9/2016 |
| WO | WO 2019/099689 A1 | 5/2019 |
| WO | WO 2020/245171 A1 | 12/2020 |
| WO | WO 2020/245173 A1 | 12/2020 |
| WO | WO 2020/245175 A1 | 12/2020 |

(Continued)

OTHER PUBLICATIONS

Amstutz et al., "Intracellular Kinase Inhibitors Selected from Combinatorial Libraries of Designed Ankyrin Repeat Proteins," JBC (2005) vol. 280 No. 26, pp. 24715-24722.
Amstutz et al., "Rapid selection of specific MAP kinase-binders from designed ankyrin repeat protein libraries," Protein Engineering, Design & Selection (2006) 19(5), pp. 219-229.
Bandeiras et al., "Structure of wild-type Plk-1 kinase domain in complex with a selective DARPin", Acta Cryst. (2008) D64, pp. 339-353.
Binz, "Designing Repeat Proteins: Well-expressed, Soluble and Stable Proteins from Combinatorial Libraries of Consensus Ankyrin Repeat Proteins" J Mol Biol (2003) 332, pp. 489-503.
Binz et al., "High-affinity binders selected from designed ankyrin repeat protein libraries", Nature Biotechnology (2004) 22(5), pp. 575-582.

(Continued)

*Primary Examiner* — Anand U Desai

(57) ABSTRACT

The present invention relates to designed ankyrin repeat domains with altered surface residues, as well as to proteins comprising such a designed ankyrin repeat domain, nucleic acids encoding such domains or proteins, methods of preparing such proteins, pharmaceutical compositions comprising such proteins or nucleic acids, and the use of such proteins, nucleic acids or pharmaceutical compositions in the treatment of diseases.

1 Claim, 4 Drawing Sheets

Specification includes a Sequence Listing.

(56) References Cited

FOREIGN PATENT DOCUMENTS

| WO | WO 2021/116470 A2 | 6/2021 |
|----|-------------------|--------|
| WO | WO 2021/229076 A1 | 11/2021 |

OTHER PUBLICATIONS

Binz et al., "Designed Repeat Proteins—Molecules with Antibody-like Binding Properties," BIOforum Europe 4, 2005, pp. 34-36, GIT VERLAG GmbH & Co. KG (3 pages).
Binz et al., "Engineered proteins as specific binding reagents," Current Opinion in Biotechnology (2005) 16, p. 459-469.
Binz et al., "Engineering novel binding proteins from nonimmunoglobulin domains," Nature Biotechnology (2005) 23(10), p. 1257-1268.
Binz et al., "Crystal Structure of a Consensus-Designed Ankyrin Repeat Protein: Implications for Stability," Proteins: Structure, Function, and Bioinformatics 65 (2006) pp. 280-284.
Binz et al., "Design and characterization of MP0250, a tri-specific anti-HGF/anti-VEGF DAR Pin® drug candidate," mAbs (2017) vol. 9 No. 8, pp. 1262-1269.
Boersma et al., "DARPins and other repeat protein scaffolds: advances in engineering and applications," Curr Opin Biotechnol (2011) 22(6), p. 849-857.
Denisova et al., "Construction and Use of Darpin Library for the Discovery of Tumor Specific Antigen Binder Proteins", May 22, 2015, 8th Annual Canadian Cancer Immunotherapy Consortium Meeting (1 page).
Eggel et al., "DARPins as Bispecific Receptor Antagonists Analyzed for Immunoglobulin E Receptor Blockage", J Mol Biol (2009) 393, pp. 598-607.
Fiedler et al., "MP0250, a VEGF and HGF neutralizing DARPin® molecule shows high anti-tumor efficacy in mouse xenografts and patient-derived tumor models," Oncotarget 2017, vol. 8, No. 58, pp. 98371-98383.
Fiedler et al., "Supplementary Materials of 'MP0250, a VEGF and HGF neutralizing DARPin® molecule shows high anti-tumor efficacy in mouse xenografts and patient-derived tumor models'," Oncotarget 2017, vol. 8, No. 58 (2 pages).
Forrer et al., "A novel strategy to design binding molecules harnessing the modular nature of repeat proteins," FEBS Letters (2003) 539, pp. 2-6.
Forrer et al., "Consensus Design of Repeat Proteins," ChemBioChem (2004) 5, pp. 183-189.
Hanes et al., "In vitro selection and evolution of functional proteins by using ribosome display," Proc Natl Acad Sci USA (1997) 94(10), pp. 4937-4942.
He et al., "Ribosome display: cell-free protein display technology," Brief Funct Genomic Proteomic (2002) 1 (2), p. 204-212.
https://www.uniprot.org/uniprot/A0A1G0, Feb. 15, 2017.
Interlandi et al., "Characterization and further stabilization of designed ankyrin repeat proteins by combining molecular dynamics simulations and experiments," J Mol Biol (2008) 375(3), p. 837-854.
Kawe et al., "Isolation of Intracellular Proteinase Inhibitors Derived from Designed Ankyrin Repeat Proteins by Genetic Screening," J Biol Chem (2006) 281, pp. 40252-40263.
Kohl et al., "Designed to be stable: Crystal structure of a consensus ankyrin repeat protein", PNAS (2003) 100(4), pp. 1700-1705.
Kramer et al., "Structural Determinants for Improved Stability of Designed Ankyrin Repeat Proteins with a Redesigned C-Capping Module", J Mol Biol (2010) 404, p. 381-391.
Merz et al., "Stabilizing Ionic Interactions in a Full-consensus Ankyrin Repeat Protein", J. Mol. Biol. (2008) 376, pp. 232-240.
Molecular Partners AG, "Molecular Partners: Building Tomorrow's Breakthroughs," Nov. 11, 2019, A presentation of Molecular Partners AG (42 pages).
Molecular Partners AG, "Translating the DARPin difference into patient benefit," Jun. 29, 2019, archived webpage from Molecular Partners AG website, retrieved from https://web.archive.org/web/20190629154324/https://www.molecularpartners.com/our-approach/ on Jun. 23, 2021 (2 pages).
Molecular Partners AG, Molecular Partners Announces Scientific Leadership Transition After Successful Transformation of Research Organization to Focus on Novel DARPin Therapeutics in Oncology, Press Release from Molecular Partners AG website, Jun. 11, 2019, retrieved from https://www.molecularpartners.com/molecular-partners-announces-scientific-leadership-transition-after-successful-transformation-of-research-organization-to-focus-on-novel-darpin-therapeutics-in-oncolo (5 pages).
NCBI Reference Sequence: XP_022289373.1, tankyrase-1-like [Crassostrea virginica], published Sep. 14, 2017, https://www.ncbi.nlm.nih.gov/protein/xp 022289373.1 (2 pages).
Nilsen, "Affinity maturation of a T cell receptor by use of phage display," 2014. Thesis for Master's degree. https://www.duo.uio.no/handle/10852/40693?show=full (77 pages).
Orf Names:A2143_ 11365, "A0A 1 GODY05", Feb. 15, 2017, retrieved from the Internet on Sep. 18, 2020: URL:https://www.uniprot.org/uniprot/AOA 1 G0DY05.txt?version=1 0 (1 page).
Plückthun et al., "Designed ankyrin repeat proteins (DAR Pins): binding proteins for research, diagnostics, and therapy," Annu Rev Pharmacol Toxicol. 2015;55, pp. 489-511.
Schilling et al., "Thermostable designed ankyrin repeat proteins (DARPins) as building blocks for innovative drugs", bioRxiv preprint doi:https://doi.org/10.1101/2021.04.27.441521; posted Apr. 27, 2021 (12 pages).
Senn Hauser et al., "Chaperone-Assisted Crystallography with DARPins", Structure (2008) 16, p. 1443-1453.
Skora et al., "Generation of MANAbodies specific to HLA-restricted epitopes encoded by somatically mutated genes," Proc Natl Acad Sci US A, 2015;112(32) pp. 9967-9972.
Steiner et al., "Efficient Selection of DARPins with Sub-nanomolar Affinities using SRP Phage Display", J Mol Biol 2008, 382(5), p. 1211-1227.
Steiner et al., "Supplementary Material of 'Efficient Selection of DARPins with Sub-nanomolar Affinities using SRP Phage Display'," J Mol Biol 2008, 382(5) (17 pages).
Steiner et al., "Half-life extension using serum albumin-binding DARPin® domains", PEDS (2017), pp. 1-9.
Stumpp et al., "Designing Repeat Proteins: Modular Leucine-rich Repeat Protein Libraries Based on the Mammalian Ribonuclease Inhibitor Family", J Mol Biol (2003) 332, pp. 471-487.
Stumpp et al., "DARPins: A true alternative to antibodies," Curr Opin Drug Discov Devel. (2007) 10(2), p. 153-159.
Stumpp et al., "DARPins: A new generation of protein therapeutics", Drug Discovery Today (2008) 13(15-16), p. 695-701.
Stumpp et al., "Beyond Antibodies: The DARPin(R) Drug Platform", BioDrugs, 2020: 423-433.
Tassev, "Generation and Use of HLA-A2-Restricted, Peptidespecific Monoclonal Antibodies and Chimeric Antigen Receptors," Thesis for PhD degree, 2011. https://www.sloankettering.edu/sites/default/files/node/165658/document/final-dimiter-tassev.pdf (176 pages).
Theurillat et al., "Designed ankyrin repeat proteins: a novel tool for testing epidermal growth factor receptor 2 expression in breast cancer", Modern Pathology (2010), p. 1-9.
Veesler et al., "Crystal Structure and Function of a DARPin Neutralizing Inhibitor of Lactococcal Phage TP901-1", J Biol Chem (2009) 284(44), p. 30718-30726.
Walser et al., "Highly potent anti-SARS-COV-2 multivalent DARPin therapeutic candidates", BioRxiv preprint, Aug. 26, 2020 (39 pages).
Walser et al., "Highly potent anti-SARS-COV-2 multivalent DARPin therapeutic candidates", BioRxiv preprint, Nov. 20, 2020 (46 pages).
Wetzel et al., "Folding and Unfolding Mechanism of Highly Stable Full Consensus Ankyrin Repeat Proteins," J. Mol. Bio (2008), pp. 241-257.
Wetzel et al., "Residue-Resolved Stability of Full Consensus Ankyrin Repeat Proteins Probed by NMR", J. Mol. Biol. (201 O) 402, pp. 241-258.
Zahnd et al., "Selection and Characterization of Her2 Binding-designed Ankyrin Repeat Proteins," J Biol Chem (2006) 281(46), pp. 35167-35175.
Zahnd et al., "A designed ankyrin repeat protein evolved to picomolar affinity to Her2," J Mol Biol (2007) 369(4), p. 1015-1028.

(56) References Cited

OTHER PUBLICATIONS

Zahnd et al., "Ribosome display: selecting and evolving proteins in vitro that specifically bind to a target," Nature Methods (2007) 4(3), pp. 269-279.
Zahnd et al., "Efficient tumor targeting with high-affinity designed ankyrin repeat proteins: effects of affinity and molecular size", Cancer Res (2010) 70(4), pp. 1595-1605.
Zahnd et al., "Supplementary Information for 'Efficient tumor targeting with high-affinity designed ankyrin repeat proteins: effects of affinity and molecular size'," Cancer Res (2010) 70(4) (23 pages).
Zhao et al., "Affinity maturation of T-cell receptor-like antibodies for Wilms tumor 1 peptide greatly enhances therapeutic potential," Leukemia, 2015;29(11 ), pp. 2238-2247.
International Search Report for International Application No. PCT/EP2020/085863, Sep. 27, 2021 (7 pages).
International Search Report for International Application No. PCT/EP2020/085864, Sep. 28, 2021 (8 pages).
International Search Report for International Application No. PCT/EP2020/085855, Mar. 29, 2021.
Written Opinion of the International Searching Authority for International Application No. PCT/EP2020/085863 (9 pages).
Written Opinion of the International Searching Authority for International Application No. PCT/EP2020/085864 (9 pages).
Written Opinion of the International Search Authority for International Application No. PCT/EP2020/085855.
3rd party observation submitted on Jun. 23, 2021 in PCT/EP2020/085863 (54 pages).
3rd party observation submitted on Jun. 23, 2021 in PCT/EP2020/085864 (54 pages).
3rd party observation submitted on Apr. 11, 2022 in PCT/EP2020/085855 (13 pages).
3rd party observation submitted on Feb. 22, 2022 in PCT/EP2020/085863 (8 pages).
3rd party observation submitted on Feb. 22, 2022 in PCT/EP2020/085864 (8 pages).

\* cited by examiner

Fig. 1A     Fig. 1B     Fig. 1C     Fig. 1D
   
Fig. 1E
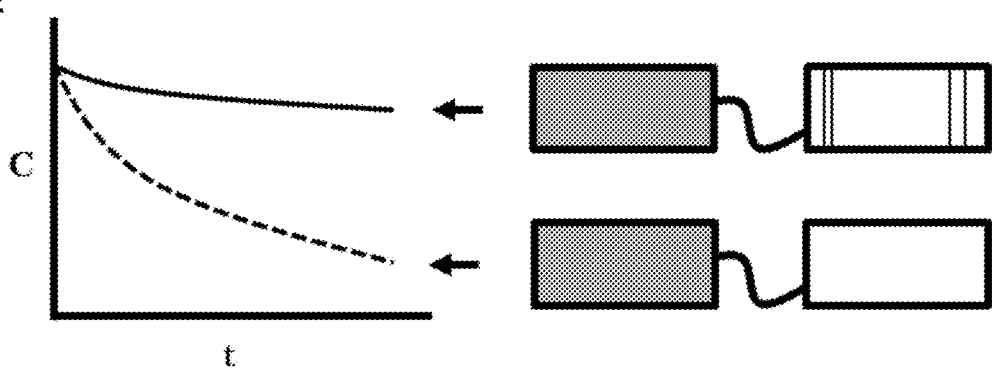
Fig. 1F

Fig. 2

```
                                    1         2         3
                          1         0         0         0
SEQ ID NO: 69:   DLGKKLLEAARAGQDDEVRELLKAGADVNA
SEQ ID NO: 70:   DLGXKLLEAAXXGQDDEVRELLKAGADVNA
SEQ ID NO: 71:   DLGXKLLEAAXXGQDDXVRXLLXAGADVNA
SEQ ID NO: 72:   DLGXXLLEAAXXGQDDXVRXLXXXGADVNA
SEQ ID NO: 73:   XXXXXLLEAAXXGXDXXXXXXXXXGADVNA
SEQ ID NO: 74:   XXXXXXXEXXXXXXDXXXXXXXXXGADVNA
SEQ ID NO: 75:   DLGKKLLQAARAGQLDEVRELLKAGADVNA
SEQ ID NO: 76:   DLGSKLLQAARAGQLDTVRTLLQAGADVNA
SEQ ID NO: 77:   DLGXKLLQAAXXGQLDEVRELLKAGADVNA
SEQ ID NO: 78:   DLGXKLLQAAXXGQLDXVRXLLXAGADVNA
SEQ ID NO: 79:   DLGXXLLQAAXXGQLDXVRXLXXXGADVNA
SEQ ID NO: 80:   XXXXXLLQAAXXGXLXXXXXXXXXGADVNA
SEQ ID NO: 81:   XXXXXXXQXXXXXXLXXXXXXXXXGADVNA
SEQ ID NO: 107:  DLGKKLLQAARAGQLDEVRELLKA
SEQ ID NO: 108:  DLGSKLLQAARAGQLDTVRTLLQA
SEQ ID NO: 109:  DLGXKLLQAAXXGQLDEVRELLKA
SEQ ID NO: 110:  DLGXKLLQAAXXGQLDXVRXLLXA
SEQ ID NO: 111:  DLGXXLLQAAXXGQLDXVRXLXXX
```

Fig. 3

```
                                    1         2         2
                          1         0         0         8
SEQ ID NO: 82:   QDKSGKTPADLAADAGHEDIAEVLQKAA
SEQ ID NO: 83:   XDXXGXTPADXAADXGHEDIAEVLQKAA
SEQ ID NO: 84:   XDXXGXTPADXAADXGHEXIAXVLQXAA
SEQ ID NO: 85:   XDXXGXTPXXXAADXGXEXXXXXXXXAA
SEQ ID NO: 86:   XDXXGXTPXXXXADXXXEXXXXXXXXXX
SEQ ID NO: 87:   XDXXGXTPXXXXXDXXXEXXXXXXXXAA
SEQ ID NO: 88:   QDKSGKTPADLAARAGHQDIAEVLQKAA
SEQ ID NO: 89:   QDTQGTTPADLAARAGHQQIASVLQQAA
SEQ ID NO: 90:   XDXXGXTPADXAARXGHQDIAEVLQKAA
SEQ ID NO: 91:   XDXXGXTPADXAARXGHQXIAXVLQXAA
SEQ ID NO: 92:   XDXXGXTPXXXAARXGXQXXXXXXXXAA
SEQ ID NO: 93:   XDXXGXTPXXXXARXXXQXXXXXXXXXX
SEQ ID NO: 94:   XDXXGXTPXXXXXRXXXQXXXXXXXXAA
```

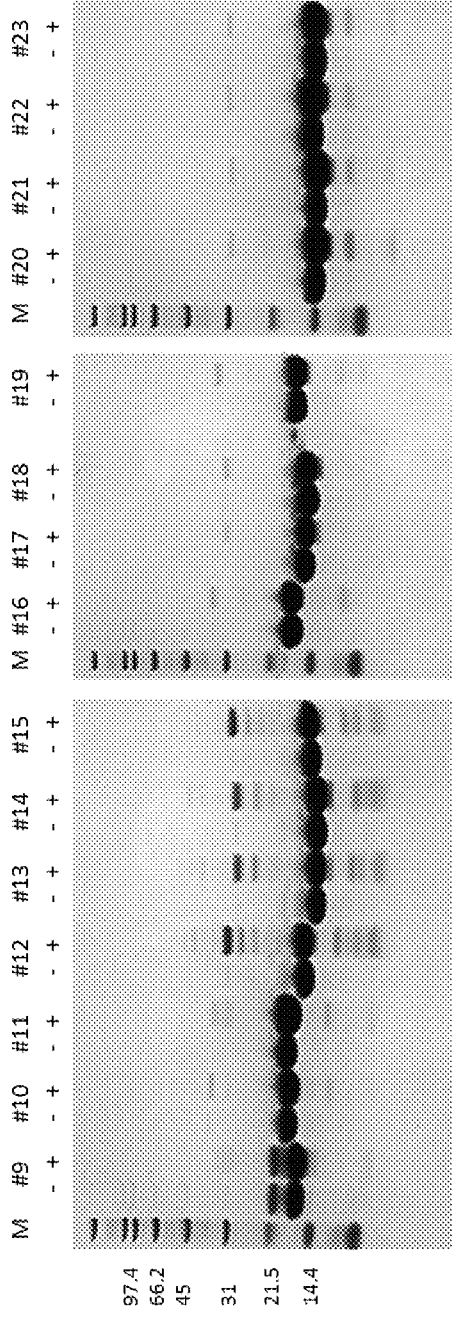
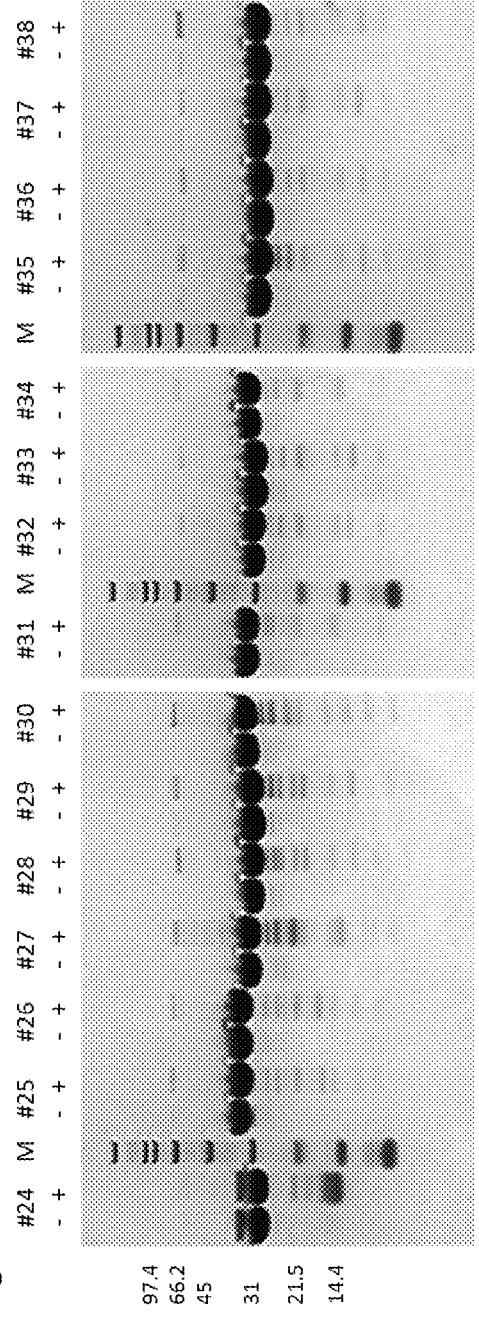

SEQUENCE LISTING

```
Sequence total quantity: 142
SEQ ID NO: 1            moltype = AA  length = 12
FEATURE                 Location/Qualifiers
REGION                  1..12
                        note = His-tag
source                  1..12
                        mol_type = protein
                        organism = synthetic construct
SEQUENCE: 1
MRGSHHHHHH GS                                                                  12

SEQ ID NO: 2            moltype = AA  length = 22
FEATURE                 Location/Qualifiers
REGION                  1..22
                        note = GS-rich peptide linker
source                  1..22
                        mol_type = protein
                        organism = synthetic construct
SEQUENCE: 2
GGGGSGGGGS GGGGSGGGGS GS                                                       22

SEQ ID NO: 3            moltype = AA  length = 24
FEATURE                 Location/Qualifiers
REGION                  1..24
                        note = PT-rich peptide linker
source                  1..24
                        mol_type = protein
                        organism = synthetic construct
```

```
SEQUENCE: 3
GSPTPTPTTP TPTPTTPTPT PTGS                                             24

SEQ ID NO: 4            moltype = AA  length = 124
    FEATURE                 Location/Qualifiers
    REGION                  1..124
                            note = Ankyrin repeat domain
    source                  1..124
                            mol_type = protein
                            organism = synthetic construct
SEQUENCE: 4
DLGKKLLEAA RAGQDDEVRE LLKAGADVNA KDYFSHTPLH LAARNGHLKI VEVLLKAGAD       60
VNAKDFAGKT PLHLAANEGH LEIVEVLLKA GADVNAQDIF GKTPADIAAD AGHEDIAEVL      120
QKAA                                                                   124

SEQ ID NO: 5            moltype = AA  length = 124
    FEATURE                 Location/Qualifiers
    REGION                  1..124
                            note = Ankyrin repeat domain
    source                  1..124
                            mol_type = protein
                            organism = synthetic construct
SEQUENCE: 5
DLGKKLLEAA RAGQDDEVRE LLKAGADVNA KDYFSHTPLH LAARNGHLKI VEVLLKAGAD       60
VNAKDFAGKT PLHLAAADGH LEIVEVLLKA GADVNAQDIF GKTPADIAAD AGHEDIAEVL      120
QKAA                                                                   124

SEQ ID NO: 6            moltype = AA  length = 124
    FEATURE                 Location/Qualifiers
    REGION                  1..124
                            note = Ankyrin repeat domain
    source                  1..124
                            mol_type = protein
                            organism = synthetic construct
SEQUENCE: 6
DLGKKLLEAA RAGQDDEVRE LLKAGADVNA KDYFSHTPLH LAARNGHLKI VEVLLKAGAD       60
VNAKDFAGKT PLHLAADAGH LEIVEVLLKA GADVNAQDIF GKTPADIAAD AGHEDIAEVL      120
QKAA                                                                   124

SEQ ID NO: 7            moltype = AA  length = 124
    FEATURE                 Location/Qualifiers
    REGION                  1..124
                            note = Ankyrin repeat domain
    source                  1..124
                            mol_type = protein
                            organism = synthetic construct
SEQUENCE: 7
DLGKKLLEAA RAGQDDEVRE LLKAGADVNA KDYFSHTPLH LAARNGHLKI VEVLLKAGAD       60
VNAKDFAGKT PLHLAANDGH LEIVEVLLKA GADVNAQDIF GKTPADIAAD AGHEDIAEVL      120
QKAA                                                                   124

SEQ ID NO: 8            moltype = AA  length = 124
    FEATURE                 Location/Qualifiers
    REGION                  1..124
                            note = Ankyrin repeat domain
    source                  1..124
                            mol_type = protein
                            organism = synthetic construct
SEQUENCE: 8
DLGKKLLEAA RAGQDDEVRI LMANGADVNA KDYFSHTPLH LAARNGHLKI VEVLLKAGAD       60
VNAKDFAGKT PLHLAANDGH LEIVEVLLKH GADVNAQDIF GKTPADIAAD AGHEDIAEVL      120
QKAA                                                                   124

SEQ ID NO: 9            moltype = AA  length = 157
    FEATURE                 Location/Qualifiers
    REGION                  1..157
                            note = Ankyrin repeat domain
    source                  1..157
                            mol_type = protein
                            organism = synthetic construct
SEQUENCE: 9
DLGKKLLEAA RAGQDDEVRE LLKAGADVNA KDQIGWTPLH LAANYGHLEI VEVLLKAGAD       60
VNAKDLWGQT PLHLAAWKGH LEIVEVLLKA GADVNAKDTD GLTPHLAAI RGHLEIVEVL       120
LKAGADVNAQ DKSGKTPADL AADAGHEDIA EVLQKAA                               157

SEQ ID NO: 10           moltype = AA  length = 157
    FEATURE                 Location/Qualifiers
    REGION                  1..157
                            note = Ankyrin repeat domain
```

```
source                  1..157
                        mol_type = protein
                        organism = synthetic construct
SEQUENCE: 10
DLGSKLLQAA RAGQLDTVRT LLQAGADVNA KDQIGWTPLH LAANYGHLEI VEVLLKAGAD     60
VNAKDLWGQT PLHLAAWKGH LEIVEVLLKA GADVNAKDTD GLTPLHLAAI RGHLEIVEVL    120
LKAGADVNAQ DTQGTTPADL AARAGHQQIA SVLQQAA                             157

SEQ ID NO: 11           moltype = AA  length = 157
FEATURE                 Location/Qualifiers
REGION                  1..157
                        note = Ankyrin repeat domain
source                  1..157
                        mol_type = protein
                        organism = synthetic construct
SEQUENCE: 11
DLGKKLLQAA RAGQLDEVRE LLKAGADVNA KDQIGWTPLH LAANYGHLEI VEVLLKAGAD     60
VNAKDLWGQT PLHLAAWKGH LEIVEVLLKA GADVNAKDTD GLTPLHLAAI RGHLEIVEVL    120
LKAGADVNAQ DKSGKTPADL AARAGHQDIA EVLQKAA                             157

SEQ ID NO: 12           moltype = AA  length = 124
FEATURE                 Location/Qualifiers
REGION                  1..124
                        note = Ankyrin repeat domain
source                  1..124
                        mol_type = protein
                        organism = synthetic construct
SEQUENCE: 12
DLGLKLLTAA WEGQDDEVRE LLKAGADVNA KDWYGYTPLH AAANEGHLEI VEVLLKAGAD     60
VNAKDVVGWT PLHIAAYWGH LEIVEVLLKA GADVNAQDQT GQTPADLAAW QGHEDIAEVL    120
QKAA                                                                 124

SEQ ID NO: 13           moltype = AA  length = 124
FEATURE                 Location/Qualifiers
REGION                  1..124
                        note = Ankyrin repeat domain
source                  1..124
                        mol_type = protein
                        organism = synthetic construct
SEQUENCE: 13
DLGSKLLQAA WEGQLDTVRT LLQAGADVNA KDWYGYTPLH AAANEGHLEI VEVLLKAGAD     60
VNAKDVVGWT PLHIAAYWGH LEIVEVLLKA GADVNAQDTQ GTTPADLAAR QGHQQIASVL    120
QQAA                                                                 124

SEQ ID NO: 14           moltype = AA  length = 124
FEATURE                 Location/Qualifiers
REGION                  1..124
                        note = Ankyrin repeat domain
source                  1..124
                        mol_type = protein
                        organism = synthetic construct
SEQUENCE: 14
DLGKKLLQAA RAGQLDEVRE LLKAGADVNA KDWYGYTPLH AAANEGHLEI VEVLLKAGAD     60
VNAKDVVGWT PLHIAAYWGH LEIVEVLLKA GADVNAQDKS GKTPADLAAR AGHQDIAEVL    120
QKAA                                                                 124

SEQ ID NO: 15           moltype = AA  length = 124
FEATURE                 Location/Qualifiers
REGION                  1..124
                        note = Ankyrin repeat domain
source                  1..124
                        mol_type = protein
                        organism = synthetic construct
SEQUENCE: 15
DLGLKLLQAA WEGQLDEVRE LLKAGADVNA KDWYGYTPLH AAANEGHLEI VEVLLKAGAD     60
VNAKDVVGWT PLHIAAYWGH LEIVEVLLKA GADVNAQDQT GQTPADLAAR QGHQDIAEVL    120
QKAA                                                                 124

SEQ ID NO: 16           moltype = AA  length = 124
FEATURE                 Location/Qualifiers
REGION                  1..124
                        note = Ankyrin repeat domain
source                  1..124
                        mol_type = protein
                        organism = synthetic construct
SEQUENCE: 16
DLGWKLLEAA VIGQDDEVRE LLKAGADVNA KDVDGNTPLH YAAHVGHLEI VEVLLKAGAD     60
VNAKDEQGYT PLHLAAWRGH LEIVEVLLKA GADVNAQDLE GATPADLAAH EGHEDIAEVL    120
QKAA                                                                 124
```

```
SEQ ID NO: 17              moltype = AA   length = 124
FEATURE                    Location/Qualifiers
REGION                     1..124
                           note = Ankyrin repeat domain
source                     1..124
                           mol_type = protein
                           organism = synthetic construct
SEQUENCE: 17
DLGSKLLQAA VIGQLDTVRT LLQAGADVNA KDVDGNTPLH YAAHVGHLEI VEVLLKAGAD    60
VNAKDEQGYT PLHLAAWRGH LEIVEVLLKA GADVNAQDTQ GTTPADLAAR EGHQQIASVL   120
QQAA                                                                124

SEQ ID NO: 18              moltype = AA   length = 124
FEATURE                    Location/Qualifiers
REGION                     1..124
                           note = Ankyrin repeat domain
source                     1..124
                           mol_type = protein
                           organism = synthetic construct
SEQUENCE: 18
DLGKKLLQAA RAGQLDEVRE LLKAGADVNA KDVDGNTPLH YAAHVGHLEI VEVLLKAGAD    60
VNAKDEQGYT PLHLAAWRGH LEIVEVLLKA GADVNAQDKS GKTPADLAAR AGHQDIAEVL   120
QKAA                                                                124

SEQ ID NO: 19              moltype = AA   length = 124
FEATURE                    Location/Qualifiers
REGION                     1..124
                           note = Ankyrin repeat domain
source                     1..124
                           mol_type = protein
                           organism = synthetic construct
SEQUENCE: 19
DLGWKLLQAA VIGQLDEVRE LLKAGADVNA KDVDGNTPLH YAAHVGHLEI VEVLLKAGAD    60
VNAKDEQGYT PLHLAAWRGH LEIVEVLLKA GADVNAQDLE GATPADLAAR EGHQDIAEVL   120
QKAA                                                                124

SEQ ID NO: 20              moltype = AA   length = 124
FEATURE                    Location/Qualifiers
REGION                     1..124
                           note = Ankyrin repeat domain
source                     1..124
                           mol_type = protein
                           organism = synthetic construct
SEQUENCE: 20
DLGTKLLEAA QYGQDDEVRE LLKAGADVNA KDVDGATPLH WAAYKGHPEI IEVLLKAGAD    60
VNAKDAVGWT PLHIAANHGH LEIVEVLLKA GADVNAQDSY GATPADLAAI WGHEDIAEVL   120
QKAA                                                                124

SEQ ID NO: 21              moltype = AA   length = 124
FEATURE                    Location/Qualifiers
REGION                     1..124
                           note = Ankyrin repeat domain
source                     1..124
                           mol_type = protein
                           organism = synthetic construct
SEQUENCE: 21
DLGSKLLQAA QYGQLDTVRT LLQAGADVNA KDVDGATPLH WAAYKGHPEI IEVLLKAGAD    60
VNAKDAVGWT PLHIAANHGH LEIVEVLLKA GADVNAQDTQ GTTPADLAAR WGHQQIASVL   120
QQAA                                                                124

SEQ ID NO: 22              moltype = AA   length = 124
FEATURE                    Location/Qualifiers
REGION                     1..124
                           note = Ankyrin repeat domain
source                     1..124
                           mol_type = protein
                           organism = synthetic construct
SEQUENCE: 22
DLGKKLLQAA RAGQLDEVRE LLKAGADVNA KDVDGATPLH WAAYKGHPEI IEVLLKAGAD    60
VNAKDAVGWT PLHIAANHGH LEIVEVLLKA GADVNAQDKS GKTPADLAAR AGHQDIAEVL   120
QKAA                                                                124

SEQ ID NO: 23              moltype = AA   length = 124
FEATURE                    Location/Qualifiers
REGION                     1..124
                           note = Ankyrin repeat domain
source                     1..124
                           mol_type = protein
```

```
                                       -continued
                                    organism = synthetic construct
SEQUENCE: 23
DLGTKLLQAA QYGQLDEVRE LLKAGADVNA KDVDGATPLH WAAYKGHPEI IEVLLKAGAD    60
VNAKDAVGWT PLHIAANHGH LEIVEVLLKA GADVNAQDSY GATPADLAAR WGHQDIAEVL   120
QKAA                                                                124

SEQ ID NO: 24              moltype = AA  length = 303
FEATURE                    Location/Qualifiers
REGION                     1..303
                           note = Ankyrin repeat protein
source                     1..303
                           mol_type = protein
                           organism = synthetic construct
SEQUENCE: 24
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGK KLLEAARAGQ DDEVRELLKA GADVNAKDQI   180
GWTPLHLAAN YGHLEIVEVL LKAGADVNAK DLWGQTPLHL AAWKGHLEIV EVLLKAGADV   240
NAKDTDGLTP LHLAAIRGHL EIVEVLLKAG ADVNAQDKSG KTPADLAADA GHEDIAEVLQ   300
KAA                                                                303

SEQ ID NO: 25              moltype = AA  length = 303
FEATURE                    Location/Qualifiers
REGION                     1..303
                           note = Ankyrin repeat protein
source                     1..303
                           mol_type = protein
                           organism = synthetic construct
SEQUENCE: 25
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGS KLLQAARAGQ LDTVRTLLQA GADVNAKDQI   180
GWTPLHLAAN YGHLEIVEVL LKAGADVNAK DLWGQTPLHL AAWKGHLEIV EVLLKAGADV   240
NAKDTDGLTP LHLAAIRGHL EIVEVLLKAG ADVNAQDTQG TTPADLAARA GHQQIASVLQ   300
QAA                                                                303

SEQ ID NO: 26              moltype = AA  length = 303
FEATURE                    Location/Qualifiers
REGION                     1..303
                           note = Ankyrin repeat protein
source                     1..303
                           mol_type = protein
                           organism = synthetic construct
SEQUENCE: 26
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGK KLLQAARAGQ LDEVRELLKA GADVNAKDQI   180
GWTPLHLAAN YGHLEIVEVL LKAGADVNAK DLWGQTPLHL AAWKGHLEIV EVLLKAGADV   240
NAKDTDGLTP LHLAAIRGHL EIVEVLLKAG ADVNAQDKSG KTPADLAARA GHQDIAEVLQ   300
KAA                                                                303

SEQ ID NO: 27              moltype = AA  length = 270
FEATURE                    Location/Qualifiers
REGION                     1..270
                           note = Ankyrin repeat protein
source                     1..270
                           mol_type = protein
                           organism = synthetic construct
SEQUENCE: 27
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGL KLLTAAWEGQ DDEVRELLKA GADVNAKDWY   180
GYTPLHAAAN EGHLEIVEVL LKAGADVNAK DVVGWTPLHI AAYWGHLEIV EVLLKAGADV   240
NAQDTGQTP ADLAAWQGHE DIAEVLQKAA                                    270

SEQ ID NO: 28              moltype = AA  length = 270
FEATURE                    Location/Qualifiers
REGION                     1..270
                           note = Ankyrin repeat protein
source                     1..270
                           mol_type = protein
                           organism = synthetic construct
SEQUENCE: 28
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGS KLLQAAWEGQ LDTVRTLLQA GADVNAKDWY   180
GYTPLHAAAN EGHLEIVEVL LKAGADVNAK DVVGWTPLHI AAYWGHLEIV EVLLKAGADV   240
NAQDTQGTTP ADLAARQGHQ QIASVLQQAA                                    270
```

```
SEQ ID NO: 29            moltype = AA  length = 270
FEATURE                  Location/Qualifiers
REGION                   1..270
                         note = Ankyrin repeat protein
source                   1..270
                         mol_type = protein
                         organism = synthetic construct
SEQUENCE: 29
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGK KLLQAARAGQ LDEVRELLKA GADVNAKDWY   180
GYTPLHAAAN EGHLEIVEVL LKAGADVNAK DVVGWTPLHI AAYWGHLEIV EVLLKAGADV   240
NAQDKSGKTP ADLAARAGHQ DIAEVLQKAA                                    270

SEQ ID NO: 30            moltype = AA  length = 270
FEATURE                  Location/Qualifiers
REGION                   1..270
                         note = Ankyrin repeat protein
source                   1..270
                         mol_type = protein
                         organism = synthetic construct
SEQUENCE: 30
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGL KLLQAAWEGQ LDEVRELLKA GADVNAKDWY   180
GYTPLHAAAN EGHLEIVEVL LKAGADVNAK DVVGWTPLHI AAYWGHLEIV EVLLKAGADV   240
NAQDQTGQTP ADLAARQGHQ DIAEVLQKAA                                    270

SEQ ID NO: 31            moltype = AA  length = 270
FEATURE                  Location/Qualifiers
REGION                   1..270
                         note = Ankyrin repeat protein
source                   1..270
                         mol_type = protein
                         organism = synthetic construct
SEQUENCE: 31
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGW KLLEAAVIGQ DDEVRELLKA GADVNAKDWY   180
GNTPLHYAAH VGHLEIVEVL LKAGADVNAK DEQGYTPLHL AAWRGHLEIV EVLLKAGADV   240
NAQDLEGATP ADLAAHEGHE DIAEVLQKAA                                    270

SEQ ID NO: 32            moltype = AA  length = 270
FEATURE                  Location/Qualifiers
REGION                   1..270
                         note = Ankyrin repeat protein
source                   1..270
                         mol_type = protein
                         organism = synthetic construct
SEQUENCE: 32
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGS KLLQAAVIGQ LDTVRTLLQA GADVNAKDVD   180
GNTPLHYAAH VGHLEIVEVL LKAGADVNAK DEQGYTPLHL AAWRGHLEIV EVLLKAGADV   240
NAQDTQGTTP ADLAAREGHQ QIASVLQQAA                                    270

SEQ ID NO: 33            moltype = AA  length = 270
FEATURE                  Location/Qualifiers
REGION                   1..270
                         note = Ankyrin repeat protein
source                   1..270
                         mol_type = protein
                         organism = synthetic construct
SEQUENCE: 33
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL   120
QKAAGGGGSG GGGSGGGGSG GGGSGSDLGK KLLQAARAGQ LDEVRELLKA GADVNAKDVD   180
GNTPLHYAAH VGHLEIVEVL LKAGADVNAK DEQGYTPLHL AAWRGHLEIV EVLLKAGADV   240
NAQDKSGKTP ADLAARAGHQ DIAEVLQKAA                                    270

SEQ ID NO: 34            moltype = AA  length = 270
FEATURE                  Location/Qualifiers
REGION                   1..270
                         note = Ankyrin repeat protein
source                   1..270
                         mol_type = protein
                         organism = synthetic construct
SEQUENCE: 34
DLGKKLLEAA RAGQDDEVRE LLKAGADVNA KDYFSHTPLH LAARNGHLKI VEVLLKAGAD    60
```

```
VNAKDFAGKT PLHLAANEGH LEIVEVLLKA GADVNAQDIF GKTPADIAAD AGHEDIAEVL    120
QKAAGGGGSG GGGSGGGGSG GGGSGSDLGW KLLQAAVIGQ LDEVRELLKA GADVNAKDVD    180
GNTPLHYAAH VGHLEIVEVL LKAGADVNAK DEQGYTPLHL AAWRGHLEIV EVLLKAGADV    240
NAQDLEGATP ADLAAREGHQ DIAEVLQKAA                                    270

SEQ ID NO: 35           moltype = AA   length = 270
FEATURE                 Location/Qualifiers
REGION                  1..270
                        note = Ankyrin repeat protein
source                  1..270
                        mol_type = protein
                        organism = synthetic construct
SEQUENCE: 35
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL    120
QKAAGGGGSG GGGSGGGGSG GGGSGSDLGT KLLEAAQYGQ DDEVRELLKA GADVNAKDVD    180
GATPLHWAAY KGHPEIIEVL LKAGADVNAK DAVGWTPLHI AANHGHLEIV EVLLKAGADV    240
NAQDSYGATP ADLAAIWGHE DIAEVLQKAA                                    270

SEQ ID NO: 36           moltype = AA   length = 270
FEATURE                 Location/Qualifiers
REGION                  1..270
                        note = Ankyrin repeat protein
source                  1..270
                        mol_type = protein
                        organism = synthetic construct
SEQUENCE: 36
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL    120
QKAAGGGGSG GGGSGGGGSG GGGSGSDLGS KLLQAAQYGQ LDTVRTLLQA GADVNAKDVD    180
GATPLHWAAY KGHPEIIEVL LKAGADVNAK DAVGWTPLHI AANHGHLEIV EVLLKAGADV    240
NAQDTQGTTP ADLAARWGHQ QIASVLQQAA                                    270

SEQ ID NO: 37           moltype = AA   length = 270
FEATURE                 Location/Qualifiers
REGION                  1..270
                        note = Ankyrin repeat protein
source                  1..270
                        mol_type = protein
                        organism = synthetic construct
SEQUENCE: 37
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL    120
QKAAGGGGSG GGGSGGGGSG GGGSGSDLGK KLLQAARAGQ LDEVRELLKA GADVNAKDVD    180
GATPLHWAAY KGHPEIIEVL LKAGADVNAK DAVGWTPLHI AANHGHLEIV EVLLKAGADV    240
NAQDKSGKTP ADLAARAGHQ DIAEVLQKAA                                    270

SEQ ID NO: 38           moltype = AA   length = 270
FEATURE                 Location/Qualifiers
REGION                  1..270
                        note = Ankyrin repeat protein
source                  1..270
                        mol_type = protein
                        organism = synthetic construct
SEQUENCE: 38
DLGKKLLEAA RAGQDDEVRE LLKAGADVNA KDYFSHTPLH LAARNGHLKI VEVLLKAGAD    60
VNAKDFAGKT PLHLAANEGH LEIVEVLLKA GADVNAQDIF GKTPADIAAD AGHEDIAEVL    120
QKAAGGGGSG GGGSGGGGSG GGGSGSDLGT KLLQAAQYGQ LDEVRELLKA GADVNAKDVD    180
GATPLHWAAY KGHPEIIEVL LKAGADVNAK DAVGWTPLHI AANHGHLEIV EVLLKAGADV    240
NAQDSYGATP ADLAARWGHQ DIAEVLQKAA                                    270

SEQ ID NO: 39           moltype = AA   length = 305
FEATURE                 Location/Qualifiers
REGION                  1..305
                        note = Ankyrin repeat protein
source                  1..305
                        mol_type = protein
                        organism = synthetic construct
SEQUENCE: 39
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL    120
QKAAGSPTPT PTTPTPTPTT PTPTPTGSDL GKKLLEAARA GQDDEVRELL KAGADVNAKD    180
QIGWTPLHLA ANYGHLEIVE VLLKAGADVN AKDLWGQTPL HLAAWKGHLE IVEVLLKAGA    240
DVNAKDTDGL TPLHLAAIRG HLEIVEVLLK AGADVNAQDK SGKTPADLAA DAGHEDIAEV    300
LQKAA                                                               305

SEQ ID NO: 40           moltype = AA   length = 305
FEATURE                 Location/Qualifiers
REGION                  1..305
```

```
                           note = Ankyrin repeat protein
source                     1..305
                           mol_type = protein
                           organism = synthetic construct
SEQUENCE: 40
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GSKLLQAARA GQLDTVRTLL QAGADVNAKD   180
QIGWTPLHLA ANYGHLEIVE VLLKAGADVN AKDLWGQTPL HLAAWKGHLE IVEVLLKAGA   240
DVNAKDTDGL TPLHLAAIRG HLEIVEVLLK AGADVNAQDT QGTTPADLAA RAGHQQIASV   300
LQQAA                                                              305

SEQ ID NO: 41              moltype = AA   length = 305
FEATURE                    Location/Qualifiers
REGION                     1..305
                           note = Ankyrin repeat protein
source                     1..305
                           mol_type = protein
                           organism = synthetic construct
SEQUENCE: 41
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GKKLLQAARA GQLDEVRELL KAGADVNAKD   180
QIGWTPLHLA ANYGHLEIVE VLLKAGADVN AKDLWGQTPL HLAAWKGHLE IVEVLLKAGA   240
DVNAKDTDGL TPLHLAAIRG HLEIVEVLLK AGADVNAQDK SGKTPADLAA RAGHQDIAEV   300
LQKAA                                                              305

SEQ ID NO: 42              moltype = AA   length = 272
FEATURE                    Location/Qualifiers
REGION                     1..272
                           note = Ankyrin repeat protein
source                     1..272
                           mol_type = protein
                           organism = synthetic construct
SEQUENCE: 42
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GLKLLTAAWE GQDDEVRELL KAGADVNAKD   180
WYGYTPLHAA ANEGHLEIVE VLLKAGADVN AKDVVGWTPL HIAAYWGHLE IVEVLLKAGA   240
DVNAQDQTGQ TPADLAAWQG HEDIAEVLQK AA                                272

SEQ ID NO: 43              moltype = AA   length = 272
FEATURE                    Location/Qualifiers
REGION                     1..272
                           note = Ankyrin repeat protein
source                     1..272
                           mol_type = protein
                           organism = synthetic construct
SEQUENCE: 43
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GSKLLQAAWE GQLDTVRTLL QAGADVNAKD   180
WYGYTPLHAA ANEGHLEIVE VLLKAGADVN AKDVVGWTPL HIAAYWGHLE IVEVLLKAGA   240
DVNAQDTQGT TPADLAARQG HQQIASVLQQ AA                                272

SEQ ID NO: 44              moltype = AA   length = 272
FEATURE                    Location/Qualifiers
REGION                     1..272
                           note = Ankyrin repeat protein
source                     1..272
                           mol_type = protein
                           organism = synthetic construct
SEQUENCE: 44
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GKKLLQAARA GQLDEVRELL KAGADVNAKD   180
WYGYTPLHAA ANEGHLEIVE VLLKAGADVN AKDVVGWTPL HIAAYWGHLE IVEVLLKAGA   240
DVNAQDKSGK TPADLAARAG HQDIAEVLQK AA                                272

SEQ ID NO: 45              moltype = AA   length = 272
FEATURE                    Location/Qualifiers
REGION                     1..272
                           note = Ankyrin repeat protein
source                     1..272
                           mol_type = protein
                           organism = synthetic construct
SEQUENCE: 45
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
```

```
QKAAGSPTPT PTTPTPTPTT PTPTPTGSDL GLKLLQAAWE GQLDEVRELL KAGADVNAKD   180
WYGYTPLHAA ANEGHLEIVE VLLKAGADVN AKDVVGWTPL HIAAYWGHLE IVEVLLKAGA   240
DVNAQDQTGQ TPADLAARQG HQDIAEVLQK AA                                 272

SEQ ID NO: 46           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 46
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GWKLLEAAVI GQDDEVRELL KAGADVNAKD   180
VDGNTPLHYA AHVGHLEIVE VLLKAGADVN AKDEQGYTPL HLAAWRGHLE IVEVLLKAGA   240
DVNAQDLEGA TPADLAAHEG HEDIAEVLQK AA                                 272

SEQ ID NO: 47           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 47
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GSKLLQAAVI GQDTVRTLL QAGADVNAKD    180
VDGNTPLHYA AHVGHLEIVE VLLKAGADVN AKDEQGYTPL HLAAWRGHLE IVEVLLKAGA   240
DVNAQDTQGT TPADLAAREG HQQIASVLQQ AA                                 272

SEQ ID NO: 48           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 48
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GKKLLQAARA GQDDEVRELL KAGADVNAKD   180
VDGNTPLHYA AHVGHLEIVE VLLKAGADVN AKDEQGYTPL HLAAWRGHLE IVEVLLKAGA   240
DVNAQDKSGK TPADLAARAG HQDIAEVLQK AA                                 272

SEQ ID NO: 49           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 49
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GWKLLQAAVI GQDEVRELL KAGADVNAKD    180
VDGNTPLHYA AHVGHLEIVE VLLKAGADVN AKDEQGYTPL HLAAWRGHLE IVEVLLKAGA   240
DVNAQDLEGA TPADLAAREG HQDIAEVLQK AA                                 272

SEQ ID NO: 50           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 50
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GTKLLEAAQY GQDDEVRELL KAGADVNAKD   180
VDGATPLHWA AYKGHPEIIE VLLKAGADVN AKDAVGWTPL HIAANHGHLE IVEVLLKAGA   240
DVNAQDSYGA TPADLAAIWG HEDIAEVLQK AA                                 272

SEQ ID NO: 51           moltype = AA   length = 272
FEATURE                 Location/Qualifiers
REGION                  1..272
                        note = Ankyrin repeat protein
source                  1..272
```

```
                        mol_type = protein
                        organism = synthetic construct
SEQUENCE: 51
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GSKLLQAAQY GQLDTVRTLL QAGADVNAKD   180
VDGATPLHWA AYKGHPEIIE VLLKAGADVN AKDAVGWTPL HIAANHGHLE IVEVLLKAGA   240
DVNAQDTQGT TPADLAARWG HQQIASVLQQ AA                                 272

SEQ ID NO: 52           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 52
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GKKLLQAARA GQLDEVRELL KAGADVNAKD   180
VDGATPLHWA AYKGHPEIIE VLLKAGADVN AKDAVGWTPL HIAANHGHLE IVEVLLKAGA   240
DVNAQDKSGK TPADLAARAG HQDIAEVLQK AA                                 272

SEQ ID NO: 53           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 53
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GTKLLQAAQY GQLDEVRELL KAGADVNAKD   180
VDGATPLHWA AYKGHPEIIE VLLKAGADVN AKDAVGWTPL HIAANHGHLE IVEVLLKAGA   240
DVNAQDSYGA TPADLAARWG HQDIAEVLQK AA                                 272

SEQ ID NO: 54           moltype = AA   length = 305
FEATURE                 Location/Qualifiers
REGION                  1..305
                        note = Ankyrin repeat protein
source                  1..305
                        mol_type = protein
                        organism = synthetic construct
SEQUENCE: 54
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GKKLLEAARA GQDDEVRELL KAGADVNAKD   180
QIGWTPLHLA ANYGHLEIVE VLLKAGADVN AKDLWGQTPL HLAAWKGHLE IVEVLLKAGA   240
DVNAKDTDGL TPLHLAAIRG HLEIVEVLLK AGADVNAQDK SGKTPADLAA DAGHEDIAEV   300
LQKAA                                                               305

SEQ ID NO: 55           moltype = AA   length = 305
FEATURE                 Location/Qualifiers
REGION                  1..305
                        note = Ankyrin repeat protein
source                  1..305
                        mol_type = protein
                        organism = synthetic construct
SEQUENCE: 55
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GSKLLQAARA GQLDTVRTLL QAGADVNAKD   180
QIGWTPLHLA ANYGHLEIVE VLLKAGADVN AKDLWGQTPL HLAAWKGHLE IVEVLLKAGA   240
DVNAKDTDGL TPLHLAAIRG HLEIVEVLLK AGADVNAQDT QGTTPADLAA RAGHQQIASV   300
LQQAA                                                               305

SEQ ID NO: 56           moltype = AA   length = 305
FEATURE                 Location/Qualifiers
REGION                  1..305
                        note = Ankyrin repeat protein
source                  1..305
                        mol_type = protein
                        organism = synthetic construct
SEQUENCE: 56
DLGKKLLEAA RAGQDDEVRE LLKAGADVNA KDYFSHTPLH LAARNGHLKI VEVLLKAGAD    60
VNAKDFAGKT PLHLAAADGH LEIVEVLLKA GADVNAQDIF GKTPADIAAD AGHEDIAEVL   120
QKAAGSPTPT PTTPTPTPTT PTPTPTGSDL GKKLLQAARA GQLDEVRELL KAGADVNAKD   180
QIGWTPLHLA ANYGHLEIVE VLLKAGADVN AKDLWGQTPL HLAAWKGHLE IVEVLLKAGA   240
```

```
DVNAKDTDGL TPLHLAAIRG HLEIVEVLLK AGADVNAQDK SGKTPADLAA RAGHQDIAEV    300
LQKAA                                                                305

SEQ ID NO: 57           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 57
DLGKKLLEAA RAGQDDEVRE LLKAGADVNA KDYFSHTPLH LAARNGHLKI VEVLLKAGAD     60
VNAKDFAGKT PLHLAADAGH LEIVEVLLKA GADVNAQDIF GKTPADIAAD AGHEDIAEVL    120
QKAAGSPTPT PTTPTPTPTT PTPTPTGSDL GLKLLTAAWE GQDDEVRELL KAGADVNAKD    180
WYGYTPLHAA ANEGHLEIVE VLLKAGADVN AKDVVGWTPL HIAAYWGHLE IVEVLLKAGA    240
DVNAQDQTGQ TPADLAAWQG HEDIAEVLQK AA                                  272

SEQ ID NO: 58           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 58
DLGKKLLEAA RAGQDDEVRE LLKAGADVNA KDYFSHTPLH LAARNGHLKI VEVLLKAGAD     60
VNAKDFAGKT PLHLAADAGH LEIVEVLLKA GADVNAQDIF GKTPADIAAD AGHEDIAEVL    120
QKAAGSPTPT PTTPTPTPTT PTPTPTGSDL GSKLLQAAWE GQDTVRTLL  QAGADVNAKD    180
WYGYTPLHAA ANEGHLEIVE VLLKAGADVN AKDVVGWTPL HIAAYWGHLE IVEVLLKAGA    240
DVNAQDTQGT TPADLAARQG HQQIASVLQQ AA                                  272

SEQ ID NO: 59           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 59
DLGKKLLEAA RAGQDDEVRE LLKAGADVNA KDYFSHTPLH LAARNGHLKI VEVLLKAGAD     60
VNAKDFAGKT PLHLAADAGH LEIVEVLLKA GADVNAQDIF GKTPADIAAD AGHEDIAEVL    120
QKAAGSPTPT PTTPTPTPTT PTPTPTGSDL GKKLLQAARA GQLDEVRELL KAGADVNAKD    180
WYGYTPLHAA ANEGHLEIVE VLLKAGADVN AKDVVGWTPL HIAAYWGHLE IVEVLLKAGA    240
DVNAQDKSGK TPADLAARAG HQDIAEVLQK AA                                  272

SEQ ID NO: 60           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 60
DLGKKLLEAA RAGQDDEVRE LLKAGADVNA KDYFSHTPLH LAARNGHLKI VEVLLKAGAD     60
VNAKDFAGKT PLHLAADAGH LEIVEVLLKA GADVNAQDIF GKTPADIAAD AGHEDIAEVL    120
QKAAGSPTPT PTTPTPTPTT PTPTPTGSDL GLKLLQAAWE GQLDEVRELL KAGADVNAKD    180
WYGYTPLHAA ANEGHLEIVE VLLKAGADVN AKDVVGWTPL HIAAYWGHLE IVEVLLKAGA    240
DVNAQDQTGQ TPADLAARQG HQDIAEVLQK AA                                  272

SEQ ID NO: 61           moltype = AA   length = 272
FEATURE                 Location/Qualifiers
REGION                  1..272
                        note = Ankyrin repeat protein
source                  1..272
                        mol_type = protein
                        organism = synthetic construct
SEQUENCE: 61
DLGKKLLEAA RAGQDDEVRE LLKAGADVNA KDYFSHTPLH LAARNGHLKI VEVLLKAGAD     60
VNAKDFAGKT PLHLAADAGH LEIVEVLLKA GADVNAQDIF GKTPADIAAD AGHEDIAEVL    120
QKAAGSPTPT PTTPTPTPTT PTPTPTGSDL GWKLLEAAVI GQDDEVRELL KAGADVNAKD    180
VDGNTPLHYA AHVGHLEIVE VLLKAGADVN AKDEQGYTPL HLAAWRGHLE IVEVLLKAGA    240
DVNAQDLEGA TPADLAAHEG HEDIAEVLQK AA                                  272

SEQ ID NO: 62           moltype = AA   length = 272
FEATURE                 Location/Qualifiers
REGION                  1..272
                        note = Ankyrin repeat protein
source                  1..272
                        mol_type = protein
```

```
                             organism = synthetic construct
SEQUENCE: 62
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GSKLLQAAIF GQLDTVRTLL QAGADVNAKD   180
VDGNTPLHYA AHVGHLEIVE VLLKAGADVN AKDEQGYTPL HLAAWRGHLE IVEVLLKAGA   240
DVNAQDTQGT TPADLAAREG HQQIASVLQQ AA                                 272

SEQ ID NO: 63            moltype = AA  length = 272
FEATURE                  Location/Qualifiers
REGION                   1..272
                         note = Ankyrin repeat protein
source                   1..272
                         mol_type = protein
                         organism = synthetic construct
SEQUENCE: 63
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GKKLLQAARA GQLDEVRELL KAGADVNAKD   180
VDGNTPLHYA AHVGHLEIVE VLLKAGADVN AKDEQGYTPL HLAAWRGHLE IVEVLLKAGA   240
DVNAQDKSGK TPADLAARAG HQDIAEVLQK AA                                 272

SEQ ID NO: 64            moltype = AA  length = 272
FEATURE                  Location/Qualifiers
REGION                   1..272
                         note = Ankyrin repeat protein
source                   1..272
                         mol_type = protein
                         organism = synthetic construct
SEQUENCE: 64
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GWKLLQAAVI GQLDEVRELL KAGADVNAKD   180
VDGNTPLHYA AHVGHLEIVE VLLKAGADVN AKDEQGYTPL HLAAWRGHLE IVEVLLKAGA   240
DVNAQDLEGA TPADLAAREG HQDIAEVLQK AA                                 272

SEQ ID NO: 65            moltype = AA  length = 272
FEATURE                  Location/Qualifiers
REGION                   1..272
                         note = Ankyrin repeat protein
source                   1..272
                         mol_type = protein
                         organism = synthetic construct
SEQUENCE: 65
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GTKLLEAAQY GQDDEVRELL KAGADVNAKD   180
VDGATPLHWA AYKGHPEIIE VLLKAGADVN AKDAVGWTPL HIAANHGHLE IVEVLLKAGA   240
DVNAQDSYGA TPADLAAIWG HEDIAEVLQK AA                                 272

SEQ ID NO: 66            moltype = AA  length = 272
FEATURE                  Location/Qualifiers
REGION                   1..272
                         note = Ankyrin repeat protein
source                   1..272
                         mol_type = protein
                         organism = synthetic construct
SEQUENCE: 66
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GSKLLQAAQY GQLDTVRTLL QAGADVNAKD   180
VDGATPLHWA AYKGHPEIIE VLLKAGADVN AKDAVGWTPL HIAANHGHLE IVEVLLKAGA   240
DVNAQDTQGT TPADLAARWG HQQIASVLQQ AA                                 272

SEQ ID NO: 67            moltype = AA  length = 272
FEATURE                  Location/Qualifiers
REGION                   1..272
                         note = Ankyrin repeat protein
source                   1..272
                         mol_type = protein
                         organism = synthetic construct
SEQUENCE: 67
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GKKLLQAARA GQLDEVRELL KAGADVNAKD   180
VDGATPLHWA AYKGHPEIIE VLLKAGADVN AKDAVGWTPL HIAANHGHLE IVEVLLKAGA   240
DVNAQDKSGK TPADLAARAG HQDIAEVLQK AA                                 272

SEQ ID NO: 68            moltype = AA  length = 272
```

```
FEATURE                 Location/Qualifiers
REGION                  1..272
                        note = Ankyrin repeat protein
source                  1..272
                        mol_type = protein
                        organism = synthetic construct
SEQUENCE: 68
DLGKKLLEAA RAGQDDEVRE LLKAGADVNA KDYFSHTPLH LAARNGHLKI VEVLLKAGAD    60
VNAKDFAGKT PLHLAADAGH LEIVEVLLKA GADVNAQDIF GKTPADIAAD AGHEDIAEVL   120
QKAAGSPTPT PTTPTPTPTT PTPTPTGSDL GTKLLQAAQY GQLDEVRELL KAGADVNAKD   180
VDGATPLHWA AYKGHPEIIE VLLKAGADVN AKDAVGWTPL HIAANHGHLE IVEVLLKAGA   240
DVNAQDSYGA TPADLAARWG HQDIAEVLQK AA                                272

SEQ ID NO: 69           moltype = AA  length = 30
FEATURE                 Location/Qualifiers
REGION                  1..30
                        note = N-terminal capping module
source                  1..30
                        mol_type = protein
                        organism = synthetic construct
SEQUENCE: 69
DLGKKLLEAA RAGQDDEVRE LLKAGADVNA                                    30

SEQ ID NO: 70           moltype = AA  length = 30
FEATURE                 Location/Qualifiers
REGION                  1..30
                        note = N-terminal capping module
VARIANT                 4
                        note = X can be any naturally occuring amino acid
VARIANT                 11
                        note = X can be any naturally occuring amino acid
VARIANT                 12
                        note = X can be any naturally occuring amino acid
source                  1..30
                        mol_type = protein
                        organism = synthetic construct
SEQUENCE: 70
DLGXKLLEAA XXGQDDEVRE LLKAGADVNA                                    30

SEQ ID NO: 71           moltype = AA  length = 30
FEATURE                 Location/Qualifiers
REGION                  1..30
                        note = N-terminal capping module
VARIANT                 4
                        note = X can be any naturally occuring amino acid
VARIANT                 11
                        note = X can be any naturally occuring amino acid
VARIANT                 12
                        note = X can be any naturally occuring amino acid
VARIANT                 17
                        note = X can be any naturally occuring amino acid
VARIANT                 20
                        note = X can be any naturally occuring amino acid
VARIANT                 23
                        note = X can be any naturally occuring amino acid
source                  1..30
                        mol_type = protein
                        organism = synthetic construct
SEQUENCE: 71
DLGXKLLEAA XXGQDDXVRX LLXAGADVNA                                    30

SEQ ID NO: 72           moltype = AA  length = 30
FEATURE                 Location/Qualifiers
REGION                  1..30
                        note = N-terminal capping module
VARIANT                 4
                        note = X can be any naturally occuring amino acid
VARIANT                 5
                        note = X can be any naturally occuring amino acid
VARIANT                 11
                        note = X can be any naturally occuring amino acid
VARIANT                 12
                        note = X can be any naturally occuring amino acid
VARIANT                 17
                        note = X can be any naturally occuring amino acid
VARIANT                 20
                        note = X can be any naturally occuring amino acid
VARIANT                 22
                        note = X can be any naturally occuring amino acid
```

```
VARIANT          23
                 note = X can be any naturally occuring amino acid
VARIANT          24
                 note = X can be any naturally occuring amino acid
source           1..30
                 mol_type = protein
                 organism = synthetic construct
SEQUENCE: 72
DLGXXLLEAA XXGQDDXVRX LXXXGADVNA                                               30

SEQ ID NO: 73    moltype = AA  length = 30
FEATURE          Location/Qualifiers
REGION           1..30
                 note = N-terminal capping module
VARIANT          1
                 note = X can be any naturally occuring amino acid
VARIANT          2
                 note = X can be any naturally occuring amino acid
VARIANT          3
                 note = X can be any naturally occuring amino acid
VARIANT          4
                 note = X can be any naturally occuring amino acid
VARIANT          5
                 note = X can be any naturally occuring amino acid
VARIANT          11
                 note = X can be any naturally occuring amino acid
VARIANT          12
                 note = X can be any naturally occuring amino acid
VARIANT          14
                 note = X can be any naturally occuring amino acid
VARIANT          16
                 note = X can be any naturally occuring amino acid
VARIANT          17
                 note = X can be any naturally occuring amino acid
VARIANT          18
                 note = X can be any naturally occuring amino acid
VARIANT          19
                 note = X can be any naturally occuring amino acid
VARIANT          20
                 note = X can be any naturally occuring amino acid
VARIANT          21
                 note = X can be any naturally occuring amino acid
VARIANT          22
                 note = X can be any naturally occuring amino acid
VARIANT          23
                 note = X can be any naturally occuring amino acid
VARIANT          24
                 note = X can be any naturally occuring amino acid
source           1..30
                 mol_type = protein
                 organism = synthetic construct
SEQUENCE: 73
XXXXXLLEAA XXGXDXXXXX XXXXGADVNA                                               30

SEQ ID NO: 74    moltype = AA  length = 30
FEATURE          Location/Qualifiers
REGION           1..30
                 note = N-terminal capping module
VARIANT          1
                 note = X can be any naturally occuring amino acid
VARIANT          2
                 note = X can be any naturally occuring amino acid
VARIANT          3
                 note = X can be any naturally occuring amino acid
VARIANT          4
                 note = X can be any naturally occuring amino acid
VARIANT          5
                 note = X can be any naturally occuring amino acid
VARIANT          6
                 note = X can be any naturally occuring amino acid
VARIANT          7
                 note = X can be any naturally occuring amino acid
VARIANT          9
                 note = X can be any naturally occuring amino acid
VARIANT          10
                 note = X can be any naturally occuring amino acid
VARIANT          11
                 note = X can be any naturally occuring amino acid
VARIANT          12
```

```
                    note = X can be any naturally occuring amino acid
VARIANT             13
                    note = X can be any naturally occuring amino acid
VARIANT             14
                    note = X can be any naturally occuring amino acid
VARIANT             16
                    note = X can be any naturally occuring amino acid
VARIANT             17
                    note = X can be any naturally occuring amino acid
VARIANT             18
                    note = X can be any naturally occuring amino acid
VARIANT             19
                    note = X can be any naturally occuring amino acid
VARIANT             20
                    note = X can be any naturally occuring amino acid
VARIANT             21
                    note = X can be any naturally occuring amino acid
VARIANT             22
                    note = X can be any naturally occuring amino acid
VARIANT             23
                    note = X can be any naturally occuring amino acid
VARIANT             24
                    note = X can be any naturally occuring amino acid
source              1..30
                    mol_type = protein
                    organism = synthetic construct
SEQUENCE: 74
XXXXXXXXEXX XXXXDXXXXX XXXXGADVNA                                       30

SEQ ID NO: 75       moltype = AA  length = 30
FEATURE             Location/Qualifiers
REGION              1..30
                    note = N-terminal capping module
source              1..30
                    mol_type = protein
                    organism = synthetic construct
SEQUENCE: 75
DLGKKLLQAA RAGQLDEVRE LLKAGADVNA                                        30

SEQ ID NO: 76       moltype = AA  length = 30
FEATURE             Location/Qualifiers
REGION              1..30
                    note = N-terminal capping module
source              1..30
                    mol_type = protein
                    organism = synthetic construct
SEQUENCE: 76
DLGSKLLQAA RAGQLDTVRT LLQAGADVNA                                        30

SEQ ID NO: 77       moltype = AA  length = 30
FEATURE             Location/Qualifiers
REGION              1..30
                    note = N-terminal capping module
VARIANT             4
                    note = X can be any naturally occuring amino acid
VARIANT             11
                    note = X can be any naturally occuring amino acid
VARIANT             12
                    note = X can be any naturally occuring amino acid
source              1..30
                    mol_type = protein
                    organism = synthetic construct
SEQUENCE: 77
DLGXKLLQAA XXGQLDEVRE LLKAGADVNA                                        30

SEQ ID NO: 78       moltype = AA  length = 30
FEATURE             Location/Qualifiers
REGION              1..30
                    note = N-terminal capping module
VARIANT             4
                    note = X can be any occuring amino acid
VARIANT             11
                    note = X can be any occuring amino acid
VARIANT             12
                    note = X can be any occuring amino acid
VARIANT             17
                    note = X can be any occuring amino acid
VARIANT             20
                    note = X can be any occuring amino acid
```

```
VARIANT                   23
                          note = X can be any occuring amino acid
source                    1..30
                          mol_type = protein
                          organism = synthetic construct
SEQUENCE: 78
DLGXKLLQAA XXGQLDXVRX LLXAGADVNA                                              30

SEQ ID NO: 79             moltype = AA  length = 30
FEATURE                   Location/Qualifiers
REGION                    1..30
                          note = N-terminal capping module
VARIANT                   4
                          note = X can be any naturally occuring amino acid
VARIANT                   5
                          note = X can be any naturally occuring amino acid
VARIANT                   11
                          note = X can be any naturally occuring amino acid
VARIANT                   12
                          note = X can be any naturally occuring amino acid
VARIANT                   17
                          note = X can be any naturally occuring amino acid
VARIANT                   20
                          note = X can be any naturally occuring amino acid
VARIANT                   22
                          note = X can be any naturally occuring amino acid
VARIANT                   23
                          note = X can be any naturally occuring amino acid
VARIANT                   24
                          note = X can be any naturally occuring amino acid
source                    1..30
                          mol_type = protein
                          organism = synthetic construct
SEQUENCE: 79
DLGXXLLQAA XXGQLDXVRX LXXXGADVNA                                              30

SEQ ID NO: 80             moltype = AA  length = 30
FEATURE                   Location/Qualifiers
REGION                    1..30
                          note = N-terminal capping module
VARIANT                   1
                          note = X can be any naturally occuring amino acid
VARIANT                   2
                          note = X can be any naturally occuring amino acid
VARIANT                   3
                          note = X can be any naturally occuring amino acid
VARIANT                   4
                          note = X can be any naturally occuring amino acid
VARIANT                   5
                          note = X can be any naturally occuring amino acid
VARIANT                   11
                          note = X can be any naturally occuring amino acid
VARIANT                   12
                          note = X can be any naturally occuring amino acid
VARIANT                   14
                          note = X can be any naturally occuring amino acid
VARIANT                   16
                          note = X can be any naturally occuring amino acid
VARIANT                   17
                          note = X can be any naturally occuring amino acid
VARIANT                   18
                          note = X can be any naturally occuring amino acid
VARIANT                   19
                          note = X can be any naturally occuring amino acid
VARIANT                   20
                          note = X can be any naturally occuring amino acid
VARIANT                   21
                          note = X can be any naturally occuring amino acid
VARIANT                   22
                          note = X can be any naturally occuring amino acid
VARIANT                   23
                          note = X can be any naturally occuring amino acid
VARIANT                   24
                          note = X can be any naturally occuring amino acid
source                    1..30
                          mol_type = protein
                          organism = synthetic construct
SEQUENCE: 80
XXXXXLLQAA XXGXLXXXXX XXXXGADVNA                                              30
```

```
SEQ ID NO: 81           moltype = AA  length = 30
FEATURE                 Location/Qualifiers
REGION                  1..30
                        note = N-terminal capping module
VARIANT                 1
                        note = X can be any naturally occuring amino acid
VARIANT                 2
                        note = X can be any naturally occuring amino acid
VARIANT                 3
                        note = X can be any naturally occuring amino acid
VARIANT                 4
                        note = X can be any naturally occuring amino acid
VARIANT                 5
                        note = X can be any naturally occuring amino acid
VARIANT                 6
                        note = X can be any naturally occuring amino acid
VARIANT                 7
                        note = X can be any naturally occuring amino acid
VARIANT                 9
                        note = X can be any naturally occuring amino acid
VARIANT                 10
                        note = X can be any naturally occuring amino acid
VARIANT                 11
                        note = X can be any naturally occuring amino acid
VARIANT                 12
                        note = X can be any naturally occuring amino acid
VARIANT                 13
                        note = X can be any naturally occuring amino acid
VARIANT                 14
                        note = X can be any naturally occuring amino acid
VARIANT                 16
                        note = X can be any naturally occuring amino acid
VARIANT                 17
                        note = X can be any naturally occuring amino acid
VARIANT                 18
                        note = X can be any naturally occuring amino acid
VARIANT                 19
                        note = X can be any naturally occuring amino acid
VARIANT                 20
                        note = X can be any naturally occuring amino acid
VARIANT                 21
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
source                  1..30
                        mol_type = protein
                        organism = synthetic construct
SEQUENCE: 81
XXXXXXXQXX XXXXLXXXXX XXXXGADVNA                                          30

SEQ ID NO: 82           moltype = AA  length = 28
FEATURE                 Location/Qualifiers
REGION                  1..28
                        note = C-terminal capping module
source                  1..28
                        mol_type = protein
                        organism = synthetic construct
SEQUENCE: 82
QDKSGKTPAD LAADAGHEDI AEVLQKAA                                            28

SEQ ID NO: 83           moltype = AA  length = 28
FEATURE                 Location/Qualifiers
REGION                  1..28
                        note = C-terminal capping module
VARIANT                 1
                        note = X can be any naturally occuring amino acid
VARIANT                 3
                        note = X can be any naturally occuring amino acid
VARIANT                 4
                        note = X can be any naturally occuring amino acid
VARIANT                 6
                        note = X can be any naturally occuring amino acid
VARIANT                 11
                        note = X can be any naturally occuring amino acid
```

```
VARIANT                 15
                        note = X can be any naturally occuring amino acid
source                  1..28
                        mol_type = protein
                        organism = synthetic construct
SEQUENCE: 83
XDXXGXTPAD XAADXGHEDI AEVLQKAA                                               28

SEQ ID NO: 84           moltype = AA  length = 28
FEATURE                 Location/Qualifiers
REGION                  1..28
                        note = C-terminal capping module
VARIANT                 1
                        note = X can be any naturally occuring amino acid
VARIANT                 3
                        note = X can be any naturally occuring amino acid
VARIANT                 4
                        note = X can be any naturally occuring amino acid
VARIANT                 6
                        note = X can be any naturally occuring amino acid
VARIANT                 11
                        note = X can be any naturally occuring amino acid
VARIANT                 15
                        note = X can be any naturally occuring amino acid
VARIANT                 19
                        note = X can be any naturally occuring amino acid
VARIANT                 22
                        note = X can be any naturally occuring amino acid
VARIANT                 26
                        note = X can be any naturally occuring amino acid
source                  1..28
                        mol_type = protein
                        organism = synthetic construct
SEQUENCE: 84
XDXXGXTPAD XAADXGHEXI AXVLQXAA                                               28

SEQ ID NO: 85           moltype = AA  length = 28
FEATURE                 Location/Qualifiers
REGION                  1..28
                        note = C-terminal capping module
VARIANT                 1
                        note = X can be any naturally occuring amino acid
VARIANT                 3
                        note = X can be any naturally occuring amino acid
VARIANT                 4
                        note = X can be any naturally occuring amino acid
VARIANT                 6
                        note = X can be any naturally occuring amino acid
VARIANT                 9
                        note = X can be any naturally occuring amino acid
VARIANT                 10
                        note = X can be any naturally occuring amino acid
VARIANT                 11
                        note = X can be any naturally occuring amino acid
VARIANT                 15
                        note = X can be any naturally occuring amino acid
VARIANT                 17
                        note = X can be any naturally occuring amino acid
VARIANT                 19
                        note = X can be any naturally occuring amino acid
VARIANT                 20
                        note = X can be any naturally occuring amino acid
VARIANT                 21
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
VARIANT                 25
                        note = X can be any naturally occuring amino acid
VARIANT                 26
                        note = X can be any naturally occuring amino acid
source                  1..28
                        mol_type = protein
                        organism = synthetic construct
SEQUENCE: 85
XDXXGXTPXX XAADXGXEXX XXXXXXAA                                               28
```

```
SEQ ID NO: 86          moltype = AA  length = 28
FEATURE                Location/Qualifiers
REGION                 1..28
                       note = C-terminal capping module
VARIANT                1
                       note = X can be any naturally occuring amino acid
VARIANT                3
                       note = X can be any naturally occuring amino acid
VARIANT                4
                       note = X can be any naturally occuring amino acid
VARIANT                6
                       note = X can be any naturally occuring amino acid
VARIANT                9
                       note = X can be any naturally occuring amino acid
VARIANT                10
                       note = X can be any naturally occuring amino acid
VARIANT                11
                       note = X can be any naturally occuring amino acid
VARIANT                12
                       note = X can be any naturally occuring amino acid
VARIANT                15
                       note = X can be any naturally occuring amino acid
VARIANT                16
                       note = X can be any naturally occuring amino acid
VARIANT                17
                       note = X can be any naturally occuring amino acid
VARIANT                19
                       note = X can be any naturally occuring amino acid
VARIANT                20
                       note = X can be any naturally occuring amino acid
VARIANT                21
                       note = X can be any naturally occuring amino acid
VARIANT                22
                       note = X can be any naturally occuring amino acid
VARIANT                23
                       note = X can be any naturally occuring amino acid
VARIANT                24
                       note = X can be any naturally occuring amino acid
VARIANT                25
                       note = X can be any naturally occuring amino acid
VARIANT                26
                       note = X can be any naturally occuring amino acid
VARIANT                27
                       note = X can be any naturally occuring amino acid
VARIANT                28
                       note = X can be any naturally occuring amino acid
source                 1..28
                       mol_type = protein
                       organism = synthetic construct
SEQUENCE: 86
XDXXGXTPXX XXADXXXEXX XXXXXXXX                                          28

SEQ ID NO: 87          moltype = AA  length = 28
FEATURE                Location/Qualifiers
REGION                 1..28
                       note = C-terminal capping module
VARIANT                1
                       note = X can be any naturally occuring amino acid
VARIANT                3
                       note = X can be any naturally occuring amino acid
VARIANT                4
                       note = X can be any naturally occuring amino acid
VARIANT                6
                       note = X can be any naturally occuring amino acid
VARIANT                9
                       note = X can be any naturally occuring amino acid
VARIANT                10
                       note = X can be any naturally occuring amino acid
VARIANT                11
                       note = X can be any naturally occuring amino acid
VARIANT                12
                       note = X can be any naturally occuring amino acid
VARIANT                13
                       note = X can be any naturally occuring amino acid
VARIANT                15
                       note = X can be any naturally occuring amino acid
VARIANT                16
                       note = X can be any naturally occuring amino acid
```

```
VARIANT              17
                     note = X can be any naturally occuring amino acid
VARIANT              19
                     note = X can be any naturally occuring amino acid
VARIANT              20
                     note = X can be any naturally occuring amino acid
VARIANT              21
                     note = X can be any naturally occuring amino acid
VARIANT              22
                     note = X can be any naturally occuring amino acid
VARIANT              23
                     note = X can be any naturally occuring amino acid
VARIANT              24
                     note = X can be any naturally occuring amino acid
VARIANT              25
                     note = X can be any naturally occuring amino acid
VARIANT              26
                     note = X can be any naturally occuring amino acid
source               1..28
                     mol_type = protein
                     organism = synthetic construct
SEQUENCE: 87
XDXXGXTPXX XXXDXXXEXX XXXXXXAA                                              28

SEQ ID NO: 88        moltype = AA  length = 28
FEATURE              Location/Qualifiers
REGION               1..28
                     note = C-terminal capping module
source               1..28
                     mol_type = protein
                     organism = synthetic construct
SEQUENCE: 88
QDKSGKTPAD LAARAGHQDI AEVLQKAA                                              28

SEQ ID NO: 89        moltype = AA  length = 28
FEATURE              Location/Qualifiers
REGION               1..28
                     note = C-terminal capping module
source               1..28
                     mol_type = protein
                     organism = synthetic construct
SEQUENCE: 89
QDTQGTTPAD LAARAGHQQI ASVLQQAA                                              28

SEQ ID NO: 90        moltype = AA  length = 28
FEATURE              Location/Qualifiers
REGION               1..28
                     note = C-terminal capping module
VARIANT              1
                     note = X can be any naturally occuring amino acid
VARIANT              3
                     note = X can be any naturally occuring amino acid
VARIANT              4
                     note = X can be any naturally occuring amino acid
VARIANT              6
                     note = X can be any naturally occuring amino acid
VARIANT              11
                     note = X can be any naturally occuring amino acid
VARIANT              15
                     note = X can be any naturally occuring amino acid
source               1..28
                     mol_type = protein
                     organism = synthetic construct
SEQUENCE: 90
XDXXGXTPAD XAARXGHQDI AEVLQKAA                                              28

SEQ ID NO: 91        moltype = AA  length = 28
FEATURE              Location/Qualifiers
REGION               1..28
                     note = C-terminal capping module
VARIANT              1
                     note = X can be any naturally occuring amino acid
VARIANT              3
                     note = X can be any naturally occuring amino acid
VARIANT              4
                     note = X can be any naturally occuring amino acid
VARIANT              6
                     note = X can be any naturally occuring amino acid
VARIANT              11
```

```
                        note = X can be any naturally occuring amino acid
VARIANT                 15
                        note = X can be any naturally occuring amino acid
VARIANT                 19
                        note = X can be any naturally occuring amino acid
VARIANT                 22
                        note = X can be any naturally occuring amino acid
VARIANT                 26
                        note = X can be any naturally occuring amino acid
source                  1..28
                        mol_type = protein
                        organism = synthetic construct
SEQUENCE: 91
XDXXGXTPAD XAARXGHQXI AXVLQXAA                                            28

SEQ ID NO: 92           moltype = AA  length = 28
FEATURE                 Location/Qualifiers
REGION                  1..28
                        note = C-terminal capping module
VARIANT                 1
                        note = X can be any naturally occuring amino acid
VARIANT                 3
                        note = X can be any naturally occuring amino acid
VARIANT                 4
                        note = X can be any naturally occuring amino acid
VARIANT                 6
                        note = X can be any naturally occuring amino acid
VARIANT                 9
                        note = X can be any naturally occuring amino acid
VARIANT                 10
                        note = X can be any naturally occuring amino acid
VARIANT                 11
                        note = X can be any naturally occuring amino acid
VARIANT                 15
                        note = X can be any naturally occuring amino acid
VARIANT                 17
                        note = X can be any naturally occuring amino acid
VARIANT                 19
                        note = X can be any naturally occuring amino acid
VARIANT                 20
                        note = X can be any naturally occuring amino acid
VARIANT                 21
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
VARIANT                 25
                        note = X can be any naturally occuring amino acid
VARIANT                 26
                        note = X can be any naturally occuring amino acid
source                  1..28
                        mol_type = protein
                        organism = synthetic construct
SEQUENCE: 92
XDXXGXTPXX XAARXGXQXX XXXXXXAA                                            28

SEQ ID NO: 93           moltype = AA  length = 28
FEATURE                 Location/Qualifiers
REGION                  1..28
                        note = C-terminal capping module
VARIANT                 1
                        note = X can be any naturally occuring amino acid
VARIANT                 3
                        note = X can be any naturally occuring amino acid
VARIANT                 4
                        note = X can be any naturally occuring amino acid
VARIANT                 6
                        note = X can be any naturally occuring amino acid
VARIANT                 9
                        note = X can be any naturally occuring amino acid
VARIANT                 10
                        note = X can be any naturally occuring amino acid
VARIANT                 11
                        note = X can be any naturally occuring amino acid
VARIANT                 12
                        note = X can be any naturally occuring amino acid
```

| | |
|---|---|
| VARIANT | 15 |
| | note = X can be any naturally occuring amino acid |
| VARIANT | 16 |
| | note = X can be any naturally occuring amino acid |
| VARIANT | 17 |
| | note = X can be any naturally occuring amino acid |
| VARIANT | 19 |
| | note = X can be any naturally occuring amino acid |
| VARIANT | 20 |
| | note = X can be any naturally occuring amino acid |
| VARIANT | 21 |
| | note = X can be any naturally occuring amino acid |
| VARIANT | 22 |
| | note = X can be any naturally occuring amino acid |
| VARIANT | 23 |
| | note = X can be any naturally occuring amino acid |
| VARIANT | 24 |
| | note = X can be any naturally occuring amino acid |
| VARIANT | 25 |
| | note = X can be any naturally occuring amino acid |
| VARIANT | 26 |
| | note = X can be any naturally occuring amino acid |
| VARIANT | 27 |
| | note = X can be any naturally occuring amino acid |
| VARIANT | 28 |
| | note = X can be any naturally occuring amino acid |
| source | 1..28 |
| | mol_type = protein |
| | organism = synthetic construct |
| SEQUENCE: 93 | |
| XDXXGXTPXX XXARXXXQXX XXXXXXXX | 28 |
| | |
| SEQ ID NO: 94 | moltype = AA length = 28 |
| FEATURE | Location/Qualifiers |
| REGION | 1..28 |
| | note = C-terminal capping module |
| VARIANT | 1 |
| | note = X can be any naturally occuring amino acid |
| VARIANT | 3 |
| | note = X can be any naturally occuring amino acid |
| VARIANT | 4 |
| | note = X can be any naturally occuring amino acid |
| VARIANT | 6 |
| | note = X can be any naturally occuring amino acid |
| VARIANT | 9 |
| | note = X can be any naturally occuring amino acid |
| VARIANT | 10 |
| | note = X can be any naturally occuring amino acid |
| VARIANT | 11 |
| | note = X can be any naturally occuring amino acid |
| VARIANT | 12 |
| | note = X can be any naturally occuring amino acid |
| VARIANT | 13 |
| | note = X can be any naturally occuring amino acid |
| VARIANT | 15 |
| | note = X can be any naturally occuring amino acid |
| VARIANT | 16 |
| | note = X can be any naturally occuring amino acid |
| VARIANT | 17 |
| | note = X can be any naturally occuring amino acid |
| VARIANT | 19 |
| | note = X can be any naturally occuring amino acid |
| VARIANT | 20 |
| | note = X can be any naturally occuring amino acid |
| VARIANT | 21 |
| | note = X can be any naturally occuring amino acid |
| VARIANT | 22 |
| | note = X can be any naturally occuring amino acid |
| VARIANT | 23 |
| | note = X can be any naturally occuring amino acid |
| VARIANT | 24 |
| | note = X can be any naturally occuring amino acid |
| VARIANT | 25 |
| | note = X can be any naturally occuring amino acid |
| VARIANT | 26 |
| | note = X can be any naturally occuring amino acid |
| source | 1..28 |
| | mol_type = protein |
| | organism = synthetic construct |

```
SEQUENCE: 94
XDXXGXTPXX XXXRXXXQXX XXXXXXAA                                              28

SEQ ID NO: 95           moltype = AA  length = 91
FEATURE                 Location/Qualifiers
REGION                  1..91
                        note = Ankyrin repeat domain
VARIANT                 4
                        note = X can be any naturally occuring amino acid
VARIANT                 11
                        note = X can be any naturally occuring amino acid
VARIANT                 12
                        note = X can be any naturally occuring amino acid
VARIANT                 20
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
VARIANT                 31
                        note = X can be any naturally occuring amino acid
VARIANT                 33
                        note = X can be any naturally occuring amino acid
VARIANT                 34
                        note = X can be any naturally occuring amino acid
VARIANT                 36
                        note = X can be any naturally occuring amino acid
VARIANT                 41
                        note = X can be any naturally occuring amino acid
VARIANT                 44
                        note = X can be any naturally occuring amino acid
VARIANT                 45
                        note = X can be any naturally occuring amino acid
VARIANT                 57
                        note = X can be any naturally occuring amino acid
VARIANT                 64
                        note = X can be any naturally occuring amino acid
VARIANT                 66
                        note = X can be any naturally occuring amino acid
VARIANT                 67
                        note = X can be any naturally occuring amino acid
VARIANT                 69
                        note = X can be any naturally occuring amino acid
VARIANT                 74
                        note = X can be any naturally occuring amino acid
VARIANT                 78
                        note = X can be any naturally occuring amino acid
VARIANT                 90
                        note = X can be any naturally occuring amino acid
VARIANT                 91
                        note = X can be any naturally occuring amino acid
source                  1..91
                        mol_type = protein
                        organism = synthetic construct
SEQUENCE: 95
DLGXKLLQAA XXGQLDEVRX LXXXGADVNA XDXXGXTPLH XAAXXGHLEI VEVLLKXGAD           60
VNAXDXXGXT PADXAARXGH QDIAEVLQKX X                                          91

SEQ ID NO: 96           moltype = AA  length = 124
FEATURE                 Location/Qualifiers
REGION                  1..124
                        note = Ankyrin repeat domain
VARIANT                 4
                        note = X can be any naturally occuring amino acid
VARIANT                 11
                        note = X can be any naturally occuring amino acid
VARIANT                 12
                        note = X can be any naturally occuring amino acid
VARIANT                 20
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
VARIANT                 31
```

```
VARIANT         33
                note = X can be any naturally occuring amino acid
VARIANT         34
                note = X can be any naturally occuring amino acid
VARIANT         36
                note = X can be any naturally occuring amino acid
VARIANT         41
                note = X can be any naturally occuring amino acid
VARIANT         44
                note = X can be any naturally occuring amino acid
VARIANT         45
                note = X can be any naturally occuring amino acid
VARIANT         57
                note = X can be any naturally occuring amino acid
VARIANT         64
                note = X can be any naturally occuring amino acid
VARIANT         66
                note = X can be any naturally occuring amino acid
VARIANT         67
                note = X can be any naturally occuring amino acid
VARIANT         69
                note = X can be any naturally occuring amino acid
VARIANT         74
                note = X can be any naturally occuring amino acid
VARIANT         77
                note = X can be any naturally occuring amino acid
VARIANT         78
                note = X can be any naturally occuring amino acid
VARIANT         90
                note = X can be any naturally occuring amino acid
VARIANT         97
                note = X can be any naturally occuring amino acid
VARIANT         100
                note = X can be any naturally occuring amino acid
VARIANT         102
                note = X can be any naturally occuring amino acid
VARIANT         107
                note = X can be any naturally occuring amino acid
VARIANT         111
                note = X can be any naturally occuring amino acid
VARIANT         123
                note = X can be any naturally occuring amino acid
VARIANT         124
                note = X can be any naturally occuring amino acid
source          1..124
                mol_type = protein
                organism = synthetic construct
SEQUENCE: 96
DLGXKLLQAA XXGQLDEVRX LXXXGADVNA XDXXGXTPLH XAAXXGHLEI VEVLLKXGAD    60
VNAXDXXGXT PLHXAAXXGH LEIVEVLLKX GADVNAXDXX GXTPADXAAR XGHQDIAEVL   120
QKXX                                                                124

SEQ ID NO: 97   moltype = AA  length = 157
FEATURE         Location/Qualifiers
REGION          1..157
                note = Ankyrin repeat domain
VARIANT         4
                note = X can be any naturally occuring amino acid
VARIANT         11
                note = X can be any naturally occuring amino acid
VARIANT         12
                note = X can be any naturally occuring amino acid
VARIANT         20
                note = X can be any naturally occuring amino acid
VARIANT         22
                note = X can be any naturally occuring amino acid
VARIANT         23
                note = X can be any naturally occuring amino acid
VARIANT         24
                note = X can be any naturally occuring amino acid
VARIANT         31
                note = X can be any naturally occuring amino acid
VARIANT         33
                note = X can be any naturally occuring amino acid
VARIANT         34
                note = X can be any naturally occuring amino acid
VARIANT         36
                note = X can be any naturally occuring amino acid
```

| | |
|---|---|
| VARIANT | 41 |
| | note = X can be any naturally occuring amino acid |
| VARIANT | 44 |
| | note = X can be any naturally occuring amino acid |
| VARIANT | 45 |
| | note = X can be any naturally occuring amino acid |
| VARIANT | 57 |
| | note = X can be any naturally occuring amino acid |
| VARIANT | 64 |
| | note = X can be any naturally occuring amino acid |
| VARIANT | 66 |
| | note = X can be any naturally occuring amino acid |
| VARIANT | 67 |
| | note = X can be any naturally occuring amino acid |
| VARIANT | 69 |
| | note = X can be any naturally occuring amino acid |
| VARIANT | 74 |
| | note = X can be any naturally occuring amino acid |
| VARIANT | 77 |
| | note = X can be any naturally occuring amino acid |
| VARIANT | 78 |
| | note = X can be any naturally occuring amino acid |
| VARIANT | 90 |
| | note = X can be any naturally occuring amino acid |
| VARIANT | 97 |
| | note = X can be any naturally occuring amino acid |
| VARIANT | 99 |
| | note = X can be any naturally occuring amino acid |
| VARIANT | 100 |
| | note = X can be any naturally occuring amino acid |
| VARIANT | 102 |
| | note = X can be any naturally occuring amino acid |
| VARIANT | 107 |
| | note = X can be any naturally occuring amino acid |
| VARIANT | 110 |
| | note = X can be any naturally occuring amino acid |
| VARIANT | 111 |
| | note = X can be any naturally occuring amino acid |
| VARIANT | 123 |
| | note = X can be any naturally occuring amino acid |
| VARIANT | 130 |
| | note = X can be any naturally occuring amino acid |
| VARIANT | 132 |
| | note = X can be any naturally occuring amino acid |
| VARIANT | 133 |
| | note = X can be any naturally occuring amino acid |
| VARIANT | 135 |
| | note = X can be any naturally occuring amino acid |
| VARIANT | 140 |
| | note = X can be any naturally occuring amino acid |
| VARIANT | 144 |
| | note = X can be any naturally occuring amino acid |
| VARIANT | 156 |
| | note = X can be any naturally occuring amino acid |
| VARIANT | 157 |
| | note = X can be any naturally occuring amino acid |
| source | 1..157 |
| | mol_type = protein |
| | organism = synthetic construct |

SEQUENCE: 97

```
DLGXKLLQAA XXGQLDEVRX LXXXGADVNA XDXXGXTPLH XAAXXGHLEI VEVLLKXGAD    60
VNAXDXXGXT PLHXAAXXGH LEIVEVLLKX GADVNAXDXX GXTPLHXAAX XGHLEIVEVL   120
LKXGADVNAX DXXGXTPADX AARXGHQDIA EVLQKXX                            157
```

| | |
|---|---|
| SEQ ID NO: 98 | moltype = AA  length = 190 |
| FEATURE | Location/Qualifiers |
| REGION | 1..190 |
| | note = Ankyrin repeat domain |
| VARIANT | 4 |
| | note = X can be any naturally occuring amino acid |
| VARIANT | 11 |
| | note = X can be any naturally occuring amino acid |
| VARIANT | 12 |
| | note = X can be any naturally occuring amino acid |
| VARIANT | 20 |
| | note = X can be any naturally occuring amino acid |
| VARIANT | 22 |
| | note = X can be any naturally occuring amino acid |
| VARIANT | 23 |

-continued

| | | |
|---|---|---|
| VARIANT | 24 | note = X can be any naturally occuring amino acid |
| VARIANT | 31 | note = X can be any naturally occuring amino acid |
| VARIANT | 33 | note = X can be any naturally occuring amino acid |
| VARIANT | 34 | note = X can be any naturally occuring amino acid |
| VARIANT | 36 | note = X can be any naturally occuring amino acid |
| VARIANT | 41 | note = X can be any naturally occuring amino acid |
| VARIANT | 44 | note = X can be any naturally occuring amino acid |
| VARIANT | 45 | note = X can be any naturally occuring amino acid |
| VARIANT | 57 | note = X can be any naturally occuring amino acid |
| VARIANT | 64 | note = X can be any naturally occuring amino acid |
| VARIANT | 66 | note = X can be any naturally occuring amino acid |
| VARIANT | 67 | note = X can be any naturally occuring amino acid |
| VARIANT | 69 | note = X can be any naturally occuring amino acid |
| VARIANT | 74 | note = X can be any naturally occuring amino acid |
| VARIANT | 77 | note = X can be any naturally occuring amino acid |
| VARIANT | 78 | note = X can be any naturally occuring amino acid |
| VARIANT | 90 | note = X can be any naturally occuring amino acid |
| VARIANT | 97 | note = X can be any naturally occuring amino acid |
| VARIANT | 99 | note = X can be any naturally occuring amino acid |
| VARIANT | 100 | note = X can be any naturally occuring amino acid |
| VARIANT | 102 | note = X can be any naturally occuring amino acid |
| VARIANT | 107 | note = X can be any naturally occuring amino acid |
| VARIANT | 110 | note = X can be any naturally occuring amino acid |
| VARIANT | 111 | note = X can be any naturally occuring amino acid |
| VARIANT | 123 | note = X can be any naturally occuring amino acid |
| VARIANT | 130 | note = X can be any naturally occuring amino acid |
| VARIANT | 132 | note = X can be any naturally occuring amino acid |
| VARIANT | 133 | note = X can be any naturally occuring amino acid |
| VARIANT | 135 | note = X can be any naturally occuring amino acid |
| VARIANT | 140 | note = X can be any naturally occuring amino acid |
| VARIANT | 143 | note = X can be any naturally occuring amino acid |
| VARIANT | 144 | note = X can be any naturally occuring amino acid |
| VARIANT | 156 | note = X can be any naturally occuring amino acid |
| VARIANT | 163 | note = X can be any naturally occuring amino acid |
| VARIANT | 165 | note = X can be any naturally occuring amino acid |
| VARIANT | 166 | note = X can be any naturally occuring amino acid |
| VARIANT | 168 | note = X can be any naturally occuring amino acid |
| VARIANT | 173 | note = X can be any naturally occuring amino acid |
| VARIANT | 177 | note = X can be any naturally occuring amino acid |

```
VARIANT                 189
                        note = X can be any naturally occuring amino acid
VARIANT                 190
                        note = X can be any naturally occuring amino acid
source                  1..190
                        mol_type = protein
                        organism = synthetic construct
SEQUENCE: 98
DLGXKLLQAA XXGQLDEVRX LXXXGADVNA XDXXGXTPLH XAAXXGHLEI VEVLLKXGAD  60
VNAXDXXGXT PLHXAAXXGH LEIVEVLLKX GADVNAXDXX GXTPLHXAAX XGHLEIVEVL  120
LKXGADVNAX DXXGXTPLHX AAXXGHLEIV EVLLKXGADV NAXDXXGXTP ADXAARXGHQ  180
DIAEVLQKXX                                                         190

SEQ ID NO: 99           moltype = AA  length = 91
FEATURE                 Location/Qualifiers
REGION                  1..91
                        note = Ankyrin repeat domain
VARIANT                 11
                        note = X can be any naturally occuring amino acid
VARIANT                 12
                        note = X can be any naturally occuring amino acid
VARIANT                 22
                        note = X can be any naturally occuring amino acid
VARIANT                 24
                        note = X can be any naturally occuring amino acid
VARIANT                 31
                        note = X can be any naturally occuring amino acid
VARIANT                 33
                        note = X can be any naturally occuring amino acid
VARIANT                 34
                        note = X can be any naturally occuring amino acid
VARIANT                 36
                        note = X can be any naturally occuring amino acid
VARIANT                 41
                        note = X can be any naturally occuring amino acid
VARIANT                 44
                        note = X can be any naturally occuring amino acid
VARIANT                 45
                        note = X can be any naturally occuring amino acid
VARIANT                 57
                        note = X can be any naturally occuring amino acid
VARIANT                 64
                        note = X can be any naturally occuring amino acid
VARIANT                 74
                        note = X can be any naturally occuring amino acid
VARIANT                 78
                        note = X can be any naturally occuring amino acid
VARIANT                 90
                        note = X can be any naturally occuring amino acid
VARIANT                 91
                        note = X can be any naturally occuring amino acid
source                  1..91
                        mol_type = protein
                        organism = synthetic construct
SEQUENCE: 99
DLGSKLLQAA XXGQLDTVRT LXQXGADVNA XDXXGXTPLH XAAXXGHLEI VEVLLKXGAD  60
VNAXDTQGTT PADXAARXGH QQIASVLQQX X                                 91

SEQ ID NO: 100          moltype = AA  length = 124
FEATURE                 Location/Qualifiers
REGION                  1..124
                        note = Ankyrin repeat domain
VARIANT                 11
                        note = X can be any naturally occuring amino acid
VARIANT                 12
                        note = X can be any naturally occuring amino acid
VARIANT                 22
                        note = X can be any naturally occuring amino acid
VARIANT                 24
                        note = X can be any naturally occuring amino acid
VARIANT                 31
                        note = X can be any naturally occuring amino acid
VARIANT                 33
                        note = X can be any naturally occuring amino acid
VARIANT                 34
                        note = X can be any naturally occuring amino acid
VARIANT                 36
                        note = X can be any naturally occuring amino acid
VARIANT                 41
```

```
                           note = X can be any naturally occuring amino acid
VARIANT                    44
                           note = X can be any naturally occuring amino acid
VARIANT                    45
                           note = X can be any naturally occuring amino acid
VARIANT                    57
                           note = X can be any naturally occuring amino acid
VARIANT                    64
                           note = X can be any naturally occuring amino acid
VARIANT                    66
                           note = X can be any naturally occuring amino acid
VARIANT                    67
                           note = X can be any naturally occuring amino acid
VARIANT                    69
                           note = X can be any naturally occuring amino acid
VARIANT                    74
                           note = X can be any naturally occuring amino acid
VARIANT                    77
                           note = X can be any naturally occuring amino acid
VARIANT                    78
                           note = X can be any naturally occuring amino acid
VARIANT                    90
                           note = X can be any naturally occuring amino acid
VARIANT                    97
                           note = X can be any naturally occuring amino acid
VARIANT                    107
                           note = X can be any naturally occuring amino acid
VARIANT                    111
                           note = X can be any naturally occuring amino acid
VARIANT                    123
                           note = X can be any naturally occuring amino acid
VARIANT                    124
                           note = X can be any naturally occuring amino acid
source                     1..124
                           mol_type = protein
                           organism = synthetic construct
SEQUENCE: 100
DLGSKLLQAA XXGQLDTVRT LXQXGADVNA XDXXGXTPLH XAAXXGHLEI VEVLLKXGAD    60
VNAXDXXGXT PLHXAAXXGH LEIVEVLLKX GADVNAXDTQ GTTPADXAAR XGHQQIASVL   120
QQXX                                                                124

SEQ ID NO: 101             moltype = AA  length = 157
FEATURE                    Location/Qualifiers
REGION                     1..157
                           note = Ankyrin repeat domain
VARIANT                    11
                           note = X can be any naturally occuring amino acid
VARIANT                    12
                           note = X can be any naturally occuring amino acid
VARIANT                    22
                           note = X can be any naturally occuring amino acid
VARIANT                    24
                           note = X can be any naturally occuring amino acid
VARIANT                    31
                           note = X can be any naturally occuring amino acid
VARIANT                    33
                           note = X can be any naturally occuring amino acid
VARIANT                    34
                           note = X can be any naturally occuring amino acid
VARIANT                    36
                           note = X can be any naturally occuring amino acid
VARIANT                    41
                           note = X can be any naturally occuring amino acid
VARIANT                    44
                           note = X can be any naturally occuring amino acid
VARIANT                    45
                           note = X can be any naturally occuring amino acid
VARIANT                    57
                           note = X can be any naturally occuring amino acid
VARIANT                    64
                           note = X can be any naturally occuring amino acid
VARIANT                    66
                           note = X can be any naturally occuring amino acid
VARIANT                    67
                           note = X can be any naturally occuring amino acid
VARIANT                    74
                           note = X can be any naturally occuring amino acid
VARIANT                    77
                           note = X can be any naturally occuring amino acid
```

```
VARIANT         78
                note = X can be any naturally occuring amino acid
VARIANT         90
                note = X can be any naturally occuring amino acid
VARIANT         97
                note = X can be any naturally occuring amino acid
VARIANT         99
                note = X can be any naturally occuring amino acid
VARIANT         100
                note = X can be any naturally occuring amino acid
VARIANT         102
                note = X can be any naturally occuring amino acid
VARIANT         107
                note = X can be any naturally occuring amino acid
VARIANT         110
                note = X can be any naturally occuring amino acid
VARIANT         111
                note = X can be any naturally occuring amino acid
VARIANT         123
                note = X can be any naturally occuring amino acid
VARIANT         130
                note = X can be any naturally occuring amino acid
VARIANT         140
                note = X can be any naturally occuring amino acid
VARIANT         144
                note = X can be any naturally occuring amino acid
VARIANT         156
                note = X can be any naturally occuring amino acid
VARIANT         157
                note = X can be any naturally occuring amino acid
source          1..157
                mol_type = protein
                organism = synthetic construct
SEQUENCE: 101
DLGSKLLQAA XXGQLDTVRT LXQXGADVNA XDXXGXTPLH XAAXXGHLEI VEVLLKXGAD   60
VNAXDXXGXT PLHXAAXXGH LEIVEVLLKX GADVNAXDXX GXTPLHXAAX XGHLEIVEVL  120
LKXGADVNAX DTQGTTPADX AARXGHQQIA SVLQQXX                           157

SEQ ID NO: 102      moltype = AA   length = 190
FEATURE             Location/Qualifiers
REGION              1..190
                note = Ankyrin repeat domain
VARIANT         11
                note = X can be any naturally occuring amino acid
VARIANT         12
                note = X can be any naturally occuring amino acid
VARIANT         22
                note = X can be any naturally occuring amino acid
VARIANT         24
                note = X can be any naturally occuring amino acid
VARIANT         31
                note = X can be any naturally occuring amino acid
VARIANT         33
                note = X can be any naturally occuring amino acid
VARIANT         34
                note = X can be any naturally occuring amino acid
VARIANT         36
                note = X can be any naturally occuring amino acid
VARIANT         41
                note = X can be any naturally occuring amino acid
VARIANT         44
                note = X can be any naturally occuring amino acid
VARIANT         45
                note = X can be any naturally occuring amino acid
VARIANT         57
                note = X can be any naturally occuring amino acid
VARIANT         64
                note = X can be any naturally occuring amino acid
VARIANT         66
                note = X can be any naturally occuring amino acid
VARIANT         67
                note = X can be any naturally occuring amino acid
VARIANT         74
                note = X can be any naturally occuring amino acid
VARIANT         77
                note = X can be any naturally occuring amino acid
VARIANT         78
                note = X can be any naturally occuring amino acid
VARIANT         90
```

```
                          note = X can be any naturally occuring amino acid
VARIANT                   97
                          note = X can be any naturally occuring amino acid
VARIANT                   99
                          note = X can be any naturally occuring amino acid
VARIANT                   100
                          note = X can be any naturally occuring amino acid
VARIANT                   102
                          note = X can be any naturally occuring amino acid
VARIANT                   107
                          note = X can be any naturally occuring amino acid
VARIANT                   110
                          note = X can be any naturally occuring amino acid
VARIANT                   111
                          note = X can be any naturally occuring amino acid
VARIANT                   123
                          note = X can be any naturally occuring amino acid
VARIANT                   130
                          note = X can be any naturally occuring amino acid
VARIANT                   132
                          note = X can be any naturally occuring amino acid
VARIANT                   133
                          note = X can be any naturally occuring amino acid
VARIANT                   135
                          note = X can be any naturally occuring amino acid
VARIANT                   140
                          note = X can be any naturally occuring amino acid
VARIANT                   143
                          note = X can be any naturally occuring amino acid
VARIANT                   144
                          note = X can be any naturally occuring amino acid
VARIANT                   156
                          note = X can be any naturally occuring amino acid
VARIANT                   163
                          note = X can be any naturally occuring amino acid
VARIANT                   173
                          note = X can be any naturally occuring amino acid
VARIANT                   177
                          note = X can be any naturally occuring amino acid
VARIANT                   189
                          note = X can be any naturally occuring amino acid
VARIANT                   190
                          note = X can be any naturally occuring amino acid
source                    1..190
                          mol_type = protein
                          organism = synthetic construct
SEQUENCE: 102
DLGSKLLQAA XXGQLDTVRT LXQXGADVNA XDXXGXTPLH XAAXXGHLEI VEVLLKXGAD    60
VNAXDXXGXT PLHXAAXXGH LEIVEVLLKX GADVNAXDXX GXTPLHXAAX XGHLEIVEVL   120
LKXGADVNAX DXXGXTPLHX AAXXGHLEIV EVLLKXGADV NAXDTQGTTP ADXAARXGHQ   180
QIASVLQQXX                                                         190

SEQ ID NO: 103            moltype = AA  length = 91
FEATURE                   Location/Qualifiers
REGION                    1..91
                          note = Ankyrin repeat domain
VARIANT                   4
                          note = X can be any naturally occuring amino acid
VARIANT                   11
                          note = X can be any naturally occuring amino acid
VARIANT                   12
                          note = X can be any naturally occuring amino acid
VARIANT                   20
                          note = X can be any naturally occuring amino acid
VARIANT                   22
                          note = X can be any naturally occuring amino acid
VARIANT                   23
                          note = X can be any naturally occuring amino acid
VARIANT                   24
                          note = X can be any naturally occuring amino acid
VARIANT                   31
                          note = X can be any naturally occuring amino acid
VARIANT                   33
                          note = X can be any naturally occuring amino acid
VARIANT                   34
                          note = X can be any naturally occuring amino acid
VARIANT                   36
                          note = X can be any naturally occuring amino acid
VARIANT                   41
```

```
                         note = X can be any naturally occuring amino acid
VARIANT                  44
                         note = X can be any naturally occuring amino acid
VARIANT                  45
                         note = X can be any naturally occuring amino acid
VARIANT                  57
                         note = X can be any naturally occuring amino acid
VARIANT                  64
                         note = X can be any naturally occuring amino acid
VARIANT                  66
                         note = X can be any naturally occuring amino acid
VARIANT                  67
                         note = X can be any naturally occuring amino acid
VARIANT                  69
                         note = X can be any naturally occuring amino acid
VARIANT                  74
                         note = X can be any naturally occuring amino acid
VARIANT                  77
                         note = X can be any naturally occuring amino acid
VARIANT                  78
                         note = X can be any naturally occuring amino acid
VARIANT                  90
                         note = X can be any naturally occuring amino acid
VARIANT                  91
                         note = X can be any naturally occuring amino acid
source                   1..91
                         mol_type = protein
                         organism = synthetic construct
SEQUENCE: 103
DLGXKLLEAA XXGQDDEVRX LXXXGADVNA XDXXGXTPLH XAAXXGHLEI VEVLLKXGAD    60
VNAXDXXGXT PADXAAXXGH EDIAEVLQKX X                                   91

SEQ ID NO: 104           moltype = AA  length = 124
FEATURE                  Location/Qualifiers
REGION                   1..124
                         note = Ankyrin repeat domain
VARIANT                  4
                         note = X can be any naturally occuring amino acid
VARIANT                  11
                         note = X can be any naturally occuring amino acid
VARIANT                  12
                         note = X can be any naturally occuring amino acid
VARIANT                  20
                         note = X can be any naturally occuring amino acid
VARIANT                  22
                         note = X can be any naturally occuring amino acid
VARIANT                  23
                         note = X can be any naturally occuring amino acid
VARIANT                  24
                         note = X can be any naturally occuring amino acid
VARIANT                  31
                         note = X can be any naturally occuring amino acid
VARIANT                  33
                         note = X can be any naturally occuring amino acid
VARIANT                  34
                         note = X can be any naturally occuring amino acid
VARIANT                  36
                         note = X can be any naturally occuring amino acid
VARIANT                  41
                         note = X can be any naturally occuring amino acid
VARIANT                  44
                         note = X can be any naturally occuring amino acid
VARIANT                  45
                         note = X can be any naturally occuring amino acid
VARIANT                  57
                         note = X can be any naturally occuring amino acid
VARIANT                  64
                         note = X can be any naturally occuring amino acid
VARIANT                  66
                         note = X can be any naturally occuring amino acid
VARIANT                  67
                         note = X can be any naturally occuring amino acid
VARIANT                  69
                         note = X can be any naturally occuring amino acid
VARIANT                  74
                         note = X can be any naturally occuring amino acid
VARIANT                  77
                         note = X can be any naturally occuring amino acid
VARIANT                  78
```

```
                        note = X can be any naturally occuring amino acid
VARIANT                 90
                        note = X can be any naturally occuring amino acid
VARIANT                 97
                        note = X can be any naturally occuring amino acid
VARIANT                 99
                        note = X can be any naturally occuring amino acid
VARIANT                 100
                        note = X can be any naturally occuring amino acid
VARIANT                 102
                        note = X can be any naturally occuring amino acid
VARIANT                 107
                        note = X can be any naturally occuring amino acid
VARIANT                 110
                        note = X can be any naturally occuring amino acid
VARIANT                 111
                        note = X can be any naturally occuring amino acid
VARIANT                 123
                        note = X can be any naturally occuring amino acid
VARIANT                 124
                        note = X can be any naturally occuring amino acid
source                  1..124
                        mol_type = protein
                        organism = synthetic construct
SEQUENCE: 104
DLGXKLLEAA XXGQDDEVRX LXXXGADVNA XDXXGXTPLH XAAXXGHLEI VEVLLKXGAD    60
VNAXDXXGXT PLHXAAXXGH LEIVEVLLKX GADVNAXDXX GXTPADXAAX XGHEDIAEVL   120
QKXX                                                                124

SEQ

```
VARIANT                 97
                        note = X can be any naturally occuring amino acid
VARIANT                 99
                        note = X can be any naturally occuring amino acid
VARIANT                 100
                        note = X can be any naturally occuring amino acid
VARIANT                 102
                        note = X can be any naturally occuring amino acid
VARIANT                 107
                        note = X can be any naturally occuring amino acid
VARIANT                 110
                        note = X can be any naturally occuring amino acid
VARIANT                 111
                        note = X can be any naturally occuring amino acid
VARIANT                 123
                        note = X can be any naturally occuring amino acid
VARIANT                 130
                        note = X can be any naturally occuring amino acid
VARIANT                 132
                        note = X can be any naturally occuring amino acid
VARIANT                 133
                        note = X can be any naturally occuring amino acid
VARIANT                 135
                        note = X can be any naturally occuring amino acid
VARIANT                 140
                        note = X can be any naturally occuring amino acid
VARIANT                 143
                        note = X can be any naturally occuring amino acid
VARIANT                 144
                        note = X can be any naturally occuring amino acid
VARIANT                 156
                        note = X can be any naturally occuring amino acid
VARIANT                 157
                        note = X can be any naturally occuring amino acid
source                  1..157
                        mol_type = protein
                        organism = synthetic construct
SEQUENCE: 105
DLGXKLLEAA XXGQDDEVRX LXXXGADVNA XDXXGXTPLH XAAXXGHLEI VEVLLKXGAD  60
VNAXDXXGXT PLHXAAXXGH LEIVEVLLKX GADVNAXDXX GXTPLHXAAX XGHLEIVEVL  120
LKXGADVNAX DXXGXTPADX AAXXGHEDIA EVLQKXX                           157

SEQ ID NO: 106          moltype = AA  length = 190
FEATURE                 Location/Qualifiers
REGION                  1..190
                        note = Ankyrin repeat domain
VARIANT                 4
                        note = X can be any naturally occuring amino acid
VARIANT                 11
                        note = X can be any naturally occuring amino acid
VARIANT                 12
                        note = X can be any naturally occuring amino acid
VARIANT                 20
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
VARIANT                 31
                        note = X can be any naturally occuring amino acid
VARIANT                 33
                        note = X can be any naturally occuring amino acid
VARIANT                 34
                        note = X can be any naturally occuring amino acid
VARIANT                 36
                        note = X can be any naturally occuring amino acid
VARIANT                 41
                        note = X can be any naturally occuring amino acid
VARIANT                 44
                        note = X can be any naturally occuring amino acid
VARIANT                 45
                        note = X can be any naturally occuring amino acid
VARIANT                 57
                        note = X can be any naturally occuring amino acid
VARIANT                 64
                        note = X can be any naturally occuring amino acid
VARIANT                 66
```

|  |  |
|---|---|
| VARIANT | note = X can be any naturally occuring amino acid<br>67 |
| VARIANT | note = X can be any naturally occuring amino acid<br>69 |
| VARIANT | note = X can be any naturally occuring amino acid<br>74 |
| VARIANT | note = X can be any naturally occuring amino acid<br>77 |
| VARIANT | note = X can be any naturally occuring amino acid<br>78 |
| VARIANT | note = X can be any naturally occuring amino acid<br>90 |
| VARIANT | note = X can be any naturally occuring amino acid<br>97 |
| VARIANT | note = X can be any naturally occuring amino acid<br>99 |
| VARIANT | note = X can be any naturally occuring amino acid<br>100 |
| VARIANT | note = X can be any naturally occuring amino acid<br>102 |
| VARIANT | note = X can be any naturally occuring amino acid<br>107 |
| VARIANT | note = X can be any naturally occuring amino acid<br>110 |
| VARIANT | note = X can be any naturally occuring amino acid<br>111 |
| VARIANT | note = X can be any naturally occuring amino acid<br>123 |
| VARIANT | note = X can be any naturally occuring amino acid<br>130 |
| VARIANT | note = X can be any naturally occuring amino acid<br>132 |
| VARIANT | note = X can be any naturally occuring amino acid<br>133 |
| VARIANT | note = X can be any naturally occuring amino acid<br>135 |
| VARIANT | note = X can be any naturally occuring amino acid<br>140 |
| VARIANT | note = X can be any naturally occuring amino acid<br>143 |
| VARIANT | note = X can be any naturally occuring amino acid<br>144 |
| VARIANT | note = X can be any naturally occuring amino acid<br>156 |
| VARIANT | note = X can be any naturally occuring amino acid<br>163 |
| VARIANT | note = X can be any naturally occuring amino acid<br>165 |
| VARIANT | note = X can be any naturally occuring amino acid<br>166 |
| VARIANT | note = X can be any naturally occuring amino acid<br>168 |
| VARIANT | note = X can be any naturally occuring amino acid<br>173 |
| VARIANT | note = X can be any naturally occuring amino acid<br>176 |
| VARIANT | note = X can be any naturally occuring amino acid<br>177 |
| VARIANT | note = X can be any naturally occuring amino acid<br>189 |
| VARIANT | note = X can be any naturally occuring amino acid<br>190 |
| source | note = X can be any naturally occuring amino acid<br>1..190<br>mol_type = protein<br>organism = synthetic construct |

SEQUENCE: 106
```
DLGXKLLEAA XXGQDDEVRX LXXXGADVNA XDXXGXTPLH XAAXXGHLEI VEVLLKXGAD    60
VNAXDXXGXT PLHXAAXXGH LEIVEVLLKX GADVNAXDXX GXTPLHXAAX XGHLEIVEVL   120
LKXGADVNAX DXXGXTPLHX AAXXGHLEIV EVLLKXGADV NAXDXXGXTP ADXAAXXGHE   180
DIAEVLQKXX                                                          190
```

|  |  |
|---|---|
| SEQ ID NO: 107 | moltype = AA  length = 24 |
| FEATURE | Location/Qualifiers |
| REGION | 1..24<br>note = N-terminal capping module sequence motif |
| source | 1..24<br>mol_type = protein<br>organism = synthetic construct |

```
SEQUENCE: 107
DLGKKLLQAA RAGQLDEVRE LLKA                                              24

SEQ ID NO: 108          moltype = AA  length = 24
FEATURE                 Location/Qualifiers
REGION                  1..24
                        note = N-terminal capping module sequence motif
source                  1..24
                        mol_type = protein
                        organism = synthetic construct
SEQUENCE: 108
DLGSKLLQAA RAGQLDTVRT LLQA                                              24

SEQ ID NO: 109          moltype = AA  length = 24
FEATURE                 Location/Qualifiers
REGION                  1..24
                        note = N-terminal capping module sequence motif
VARIANT                 4
                        note = X can be any naturally occuring amino acid
VARIANT                 11
                        note = X can be any naturally occuring amino acid
VARIANT                 12
                        note = X can be any naturally occuring amino acid
source                  1..24
                        mol_type = protein
                        organism = synthetic construct
SEQUENCE: 109
DLGXKLLQAA XXGQLDEVRE LLKA                                              24

SEQ ID NO: 110          moltype = AA  length = 24
FEATURE                 Location/Qualifiers
REGION                  1..24
                        note = N-terminal capping module sequence motif
VARIANT                 4
                        note = X can be any naturally occuring amino acid
VARIANT                 11
                        note = X can be any naturally occuring amino acid
VARIANT                 12
                        note = X can be any naturally occuring amino acid
VARIANT                 17
                        note = X can be any naturally occuring amino acid
VARIANT                 20
                        note = X can be any naturally occuring amino acid
VARIANT                 23
                        note = X can be any naturally occuring amino acid
source                  1..24
                        mol_type = protein
                        organism = synthetic construct
SEQUENCE: 110
DLGXKLLQAA XXGQLDXVRX LLXA                                              24

SEQ ID NO: 111          moltype = AA  length = 24
FEATURE                 Location/Qualifiers
REGION                  1..24
                        note = N-terminal capping module sequence motif
VARIANT                 4
                        note = X can be any naturally occuring amino acid
VARIANT                 5
                        note = X can be any naturally occuring amino acid
VARIANT                 11
                        note = X can be any naturally occuring amino acid
VARIANT                 12
                        note = X can be any naturally occuring amino acid
VARIANT                 17
                        note = X can be any naturally occuring amino acid
VARIANT                 20
                        note = X can be any naturally occuring amino acid
VARIANT                 22
                        note = X can be any naturally occuring amino acid
VARIANT                 23
                        note = X can be any naturally occuring amino acid
VARIANT                 24
                        note = X can be any naturally occuring amino acid
source                  1..24
                        mol_type = protein
                        organism = synthetic construct
SEQUENCE: 111
DLGXXLLQAA XXGQLDXVRX LXXX                                              24
```

```
SEQ ID NO: 112            moltype = AA   length = 32
FEATURE                   Location/Qualifiers
REGION                    1..32
                          note = N-terminal capping module
source                    1..32
                          mol_type = protein
                          organism = synthetic construct
SEQUENCE: 112
GSDLGKKLLQ AARAGQLDEV RELLKAGADV NA                                       32

SEQ ID NO: 113            moltype = AA   length = 32
FEATURE                   Location/Qualifiers
REGION                    1..32
                          note = N-terminal capping module
source                    1..32
                          mol_type = protein
                          organism = synthetic construct
SEQUENCE: 113
GSDLGKKLLQ AARAGQLDEV RILLKAGADV NA                                       32

SEQ ID NO: 114            moltype = AA   length = 32
FEATURE                   Location/Qualifiers
REGION                    1..32
                          note = N-terminal capping module
source                    1..32
                          mol_type = protein
                          organism = synthetic construct
SEQUENCE: 114
GSDLGKKLLQ AARAGQLDEV RILLAAGADV NA                                       32

SEQ ID NO: 115            moltype = AA   length = 340
FEATURE                   Location/Qualifiers
REGION                    1..340
                          note = Ankyrin repeat protein specific for NY-ESO-1 pMHC
source                    1..340
                          mol_type = protein
                          organism = synthetic construct
SEQUENCE: 115
GSDLGKKLLQ AARAGQLDEV RELLKAGADV NAKDLIGVTP LHLAAFSGHL EIVEVLLKAS          60
ADVNAKDVSG RTPLHVAAKH GHLEIVEVLL KAGADVNAKD LIGFTPLHLA AQFGHLEIVE         120
VLLKAGADVN AQDKSGKTPA DLAARAGHQD IAEVLQKAAG SPTPTPTTPT PTPTTPTPTP         180
TGSDLGKKLL QAARAGQLDE VRELLKAGAD VNAKDLIGVT PLHLAAFSGH LEIVEVLLKA         240
SADVNAKDVS GRTPLHVAAK HGHLEIVEVL LKAGADVNAK DLIGFTPLHL AAQFGHLEIV         300
EVLLKAGADV NAQDKSGKTP ADLAARAGHQ DIAEVLQKAA                               340

SEQ ID NO: 116            moltype = AA   length = 340
FEATURE                   Location/Qualifiers
REGION                    1..340
                          note = Ankyrin repeat protein specific for NY-ESO-1 pMHC
source                    1..340
                          mol_type = protein
                          organism = synthetic construct
SEQUENCE: 116
GSDLGKKLLQ AARAGQLDEV RELLKAGADV NAKDQSGATP LHLAAFRGHL EIVEVLLKAG          60
ADVNAKDAAG YTPLHIAAVY GHLEIVEVLL KAGADVNAKD SAGETPLHLA AYAGHLEIVE         120
VLLKAGADVN AQDKSGKTPA DLAARAGHQD IAEVLQKAAG SPTPTPTTPT PTPTTPTPTP         180
TGSDLGKKLL QAARAGQLDE VRELLKAGAD VNAKDLIGVT PLHLAAFSGH LEIVEVLLKA         240
SADVNAKDVS GRTPLHVAAK HGHLEIVEVL LKAGADVNAK DLIGFTPLHL AAQFGHLEIV         300
EVLLKAGADV NAQDKSGKTP ADLAARAGHQ DIAEVLQKAA                               340

SEQ ID NO: 117            moltype = AA   length = 340
FEATURE                   Location/Qualifiers
REGION                    1..340
                          note = Ankyrin repeat protein specific for NY-ESO-1 pMHC
source                    1..340
                          mol_type = protein
                          organism = synthetic construct
SEQUENCE: 117
GSDLGKKLLQ AARAGQLDEV RELLKAGADV NAKDLIGVTP LHLAAFSGHL EIVEVLLKAS          60
ADVNAKDVSG RTPLHVAAKH GHLEIVEVLL KAGADVNAKD LIGFTPLHLA AQFGHLEIVE         120
VLLKAGADVN AQDKSGKTPA DLAARAGHQD IAEVLQKAAG SPTPTPTTPT PTPTTPTPTP         180
TGSDLGKKLL QAARAGQLDE VRELLKAGAD VNAKDAIGFT PLHLAAFSGH LEIVEVLLKA         240
GADVNAKDVA GYTPLHVAAL YGHLVIVEVL LKAGADVNAK DKAGETPLHL AAFAGHLEIV         300
EVLLKAGADV NAQDKSGKTP ADLAARAGHQ DIAEVLQKAA                               340

SEQ ID NO: 118            moltype = AA   length = 159
FEATURE                   Location/Qualifiers
REGION                    1..159
                          note = Ankyrin repeat domain specific for NY-ESO-1 pMHC
```

-continued

```
source                  1..159
                        mol_type = protein
                        organism = synthetic construct
SEQUENCE: 118
GSDLGKKLLQ AARAGQLDEV RELLKAGADV NAKDQSGATP LHLAAFRGHL EIVEVLLKAG    60
ADVNAKDAAG YTPLHIAAVY GHLEIVEVLL KAGADVNAKD SAGETPLHLA AYAGHLEIVE   120
VLLKAGADVN AQDKSGKTPA DLAARAGHQD IAEVLQKAA                          159

SEQ ID NO: 119          moltype = AA  length = 159
FEATURE                 Location/Qualifiers
REGION                  1..159
                        note = Ankyrin repeat domain specific for NY-ESO-1 pMHC
source                  1..159
                        mol_type = protein
                        organism = synthetic construct
SEQUENCE: 119
GSDLGKKLLQ AARAGQLDEV RELLKAGADV NAKDLIGVTP LHLAAFSGHL EIVEVLLKAS    60
ADVNAKDVSG RTPLHVAAKH GHLEIVEVLL KAGADVNAKD LIGFTPLHLA AQFGHLEIVE   120
VLLKAGADVN AQDKSGKTPA DLAARAGHQD IAEVLQKAA                          159

SEQ ID NO: 120          moltype = AA  length = 159
FEATURE                 Location/Qualifiers
REGION                  1..159
                        note = Ankyrin repeat domain specific for NY-ESO-1 pMHC
source                  1..159
                        mol_type = protein
                        organism = synthetic construct
SEQUENCE: 120
GSDLGKKLLQ AARAGQLDEV RELLKAGADV NAKDAIGFTP LHLAAFSGHL EIVEVLLKAG    60
ADVNAKDVAG YTPLHVAALY GHLVIVEVLL KAGADVNAKD KAGETPLHLA AFAGHLEIVE   120
VLLKAGADVN AQDKSGKTPA DLAARAGHQD IAEVLQKAA                          159

SEQ ID NO: 121          moltype = AA  length = 159
FEATURE                 Location/Qualifiers
REGION                  1..159
                        note = Ankyrin repeat domain specific for NY-ESO-1 pMHC
source                  1..159
                        mol_type = protein
                        organism = synthetic construct
SEQUENCE: 121
GSDLGKKLLQ AARAGQLDEV RELLKAGADV NAKDRAGSTP LHLAAFRGHL EIVEVLLKAG    60
ADVNAKDAAG YTPLHLAALY GHLEIVEVLL KAGADVNAKD HAGSTPLHLA ALAGHLEIVE   120
VLLKAGADVN AQDKSGKTPA DLAARAGHQD IAEVLQKAA                          159

SEQ ID NO: 122          moltype = AA  length = 158
FEATURE                 Location/Qualifiers
REGION                  1..158
                        note = Ankyrin repeat domain specific for NY-ESO-1 pMHC
source                  1..158
                        mol_type = protein
                        organism = synthetic construct
SEQUENCE: 122
GSDLGKKLLQ AARAGQLDEV RELLKAGADV NAKDRFGIPL HIAASQGHLE IVEVLLKAGA    60
DVNAKDHWGE TPLHLAAVFG HLEIVEVLLK AGADVNAKDH TGQTPLHLAA YLGHLEIVEV   120
LLKAGADVNA QDKSGKTPAD LAARAGHQDI AEVLQKAA                           158

SEQ ID NO: 123          moltype = AA  length = 159
FEATURE                 Location/Qualifiers
REGION                  1..159
                        note = Ankyrin repeat domain specific for NY-ESO-1 pMHC
source                  1..159
                        mol_type = protein
                        organism = synthetic construct
SEQUENCE: 123
GSDLGKKLLQ AARAGQLDEV RELLKAGADV NAKDATGQTP LHVAAFRGHL EIVEVLLKAG    60
ADVNAKDKAG YTPLHIAAYA GHLEIVEVLL KAGADVNAKD HAGWTPLHLA AILGHLEIVE   120
VLLKAGADVN AQDKSGKTPA DLAARAGHQD IAEVLQKAA                          159

SEQ ID NO: 124          moltype = AA  length = 158
FEATURE                 Location/Qualifiers
REGION                  1..158
                        note = Ankyrin repeat domain specific for NY-ESO-1 pMHC
source                  1..158
                        mol_type = protein
                        organism = synthetic construct
SEQUENCE: 124
GSDLGKKLLQ AARAGQLDEV RELLKAGADV NAKDYFGSTP LHLAQLGHLE IVEVLLKAGA    60
DVNAKDYQGH TPLHVDAFHG HLEIVEVLLK AGADVNAKDQ WGVTPLHLAA EWGHLEIVEV   120
LLKAGADVNA QDKSGKTPAD LAARAGHQDI AEVLQKAA                           158
```

```
SEQ ID NO: 125          moltype = AA   length = 159
FEATURE                 Location/Qualifiers
REGION                  1..159
                        note = Ankyrin repeat domain specific for NY-ESO-1 pMHC
source                  1..159
                        mol_type = protein
                        organism = synthetic construct
SEQUENCE: 125
GSDLGKKLLQ AARAGQLDEV RELLKAGADV NAKDAIGQTP LHLAAFRGHL EIVEVLLKAG    60
ADVNAKDVAG WTPLHIAAAY GHLEIVEVLL KAGADVNAKD AYGQTPLHLA AFQGHLEIVE   120
VLLKAGADVN AQDKSGKTPA DLAARAGHQD IAEVLQKAA                          159

SEQ ID NO: 126          moltype = AA   length = 159
FEATURE                 Location/Qualifiers
REGION                  1..159
                        note = Ankyrin repeat domain specific for EBNA-1 pMHC
source                  1..159
                        mol_type = protein
                        organism = synthetic construct
SEQUENCE: 126
GSDLGKKLLQ AARAGQLDEV RELLKAGADV NAKDLTGITP LHIAAREGHL EIVEVLLKAG    60
ADVNAKDAWG FTPLHVAAWT GHLEIVEVLL KAGADVNAKD LLGETPLHLA AEAGHLEIVE   120
VLLKAGADVN AQDKSGKTPA DLAARAGHQD IAEVLQKAA                          159

SEQ ID NO: 127          moltype = AA   length = 159
FEATURE                 Location/Qualifiers
REGION                  1..159
                        note = Ankyrin repeat domain specific for EBNA-1 pMHC
source                  1..159
                        mol_type = protein
                        organism = synthetic construct
SEQUENCE: 127
GSDLGKKLLQ AARAGQLDEV RELLKADADV NAKDTWGYTP LHLAAFHGHL EIVEVLLKAG    60
ADVNAKDELG KTPLHLAAYV GPLEIVEVLL KAGADVNAKD QHGYTPLHIA AAYGHLEIVE   120
VLLKAGADVN AQDKSGKTPA DLAARAGHQD IAEVLQKAA                          159

SEQ ID NO: 128          moltype = AA   length = 159
FEATURE                 Location/Qualifiers
REGION                  1..159
                        note = Ankyrin repeat domain specific for EBNA-1 pMHC
source                  1..159
                        mol_type = protein
                        organism = synthetic construct
SEQUENCE: 128
GSDLGKKLLQ AARAGQLDEV RELLKAGADV NAKDQEGRTP LHIAAAHGHL EIVEVLLKAG    60
ADVNAKDAYG YTPLHLAAFI GHLEIVEVLL KAGAEVNAKD KYGETPLHIA ALTGHLEIVE   120
VLLKAGADVN AQDKSGKTPA DLAARAGHQD IAEVLQKAA                          159

SEQ ID NO: 129          moltype = AA   length = 159
FEATURE                 Location/Qualifiers
REGION                  1..159
                        note = Ankyrin repeat domain specific for EBNA-1 pMHC
source                  1..159
                        mol_type = protein
                        organism = synthetic construct
SEQUENCE: 129
GSDLGKKLLQ AARAGQLDEV RELLKAGADV NAKDLAGVTP LHVAARAGHL EIVEVLLKAG    60
ADVNAKDAWG FTPLHIAAYQ GHLEIVEVLL KAGADVNAKD LLGSTPLHVA AETGHLEIVE   120
VLLKAGADVN AQDKSGKTPA DLAARAGHLD IAEVLQKAA                          159

SEQ ID NO: 130          moltype = AA   length = 159
FEATURE                 Location/Qualifiers
REGION                  1..159
                        note = Ankyrin repeat domain specific for EBNA-1 pMHC
source                  1..159
                        mol_type = protein
                        organism = synthetic construct
SEQUENCE: 130
GSDLGKKLLQ AARAGQLDEV RELLKAGADV NAKDLTGITP LHVAARSGHP EIVEVLLKAG    60
ADVNAKDAWG FTPLHVAAYK GHLEIVEVLL KAGADVNAKD QLGETPLHLA AAEGHLEIVE   120
VLLKAGADVN AQDKSGKTPA DLAARAGHQD IAEVLQKAA                          159

SEQ ID NO: 131          moltype = AA   length = 159
FEATURE                 Location/Qualifiers
REGION                  1..159
                        note = Ankyrin repeat domain specific for EBNA-1 pMHC
source                  1..159
                        mol_type = protein
```

```
                                organism = synthetic construct
SEQUENCE: 131
GSDLGKKLLQ AARAGQLDEV RELLKAGADV NAKDQTGWTP LHIAAHTGHL EIVEVLLKAG    60
ADVNAKDAVG FTPLHVAAWS GHLEIVEVLL KDGADVNAKD TSGATPLHLA AEWGHLEIVE   120
VLLKAGADVN AQDKSGKTPA DLAARAGHQD IAEVLQKAA                          159

SEQ ID NO: 132              moltype = AA   length = 159
FEATURE                     Location/Qualifiers
REGION                      1..159
                            note = Ankyrin repeat domain specific for EBNA-1 pMHC
source                      1..159
                            mol_type = protein
                            organism = synthetic construct
SEQUENCE: 132
GSDLGKKLLQ AARAGQLDEV RELLKAGADV NAKDLSGVTP LHIAARSGHL EIVEVLLKAG    60
ADVNAKDAWG YTPLHVAAEH GHLEIVEVLL KAGADVNAKD HLGSTPLHIA ASHGHLEIVE   120
VLLKAGADVN AQDKSGKTPA DLAARAGHQD IAEVLQKAA                          159

SEQ ID NO: 133              moltype = AA   length = 159
FEATURE                     Location/Qualifiers
REGION                      1..159
                            note = Ankyrin repeat domain specific for EBNA-1 pMHC
source                      1..159
                            mol_type = protein
                            organism = synthetic construct
SEQUENCE: 133
GSDLGKKLLQ AARAGQLDE

```
FEATURE                 Location/Qualifiers
REGION                  1..159
                        note = Ankyrin repeat domain specific for MAGE-A3 pMHC
source                  1..159
                        mol_type = protein
                        organism = synthetic construct
SEQUENCE: 138
GSDLGKKLLQ AARAGQLDEV RELLKAGADV NAKDTVGWTP LHIAAYTGHL EIVEVLLKAG   60
ADVNAKDEWG VTPLHLAALE GHLEIVEVLL KAGADVNAKD EAGETPLHIA AWHGHLEIVE  120
VLLKAGADVN AQDKSGKTPA DLAARAGHQD IAEVLQKAA                         159

SEQ ID NO: 139          moltype = AA  length = 159
FEATURE                 Location/Qualifiers
REGION                  1..159
                        note = Ankyrin repeat domain specific for MAGE-A3 pMHC
source                  1..159
                        mol_type = protein
                        organism = synthetic construct
SEQUENCE: 139
GSDLGKKLLQ AARAGQLDEV RELLKAGADV NAKDEWGATP LHLAAYAGHL EIVEVLLKAG   60
ADVNAKDRWG LTPLHVAAVE GHLEIVEVLL KAGADVNAKD IEGETPLHIA AFTGHLEIVE  120
VLLKAGADVN AQDKSGKTPA DLAARAGHQD VAEVLQKAA                         159

SEQ ID NO: 140          moltype = AA  length = 159
FEATURE                 Location/Qualifiers
REGION                  1..159
                        note = Ankyrin repeat domain specific for MAGE-A3 pMHC
source                  1..159
                        mol_type = protein
                        organism = synthetic construct
SEQUENCE: 140
GSDLGKKLLQ AARAGQLDEV RELLKAGADV NAKDSSGWTP LHLAAYHGHL EIVEVLLKAG   60
ADVNAKDEWG LTPLHLAAIE GHLEIVEVLL KAGADVNAKD VTGYTPLHIA AATGHLEIVE  120
VLLKVGVDVN AQDKSGKTPA DLAARAGHQD IAEVLQKAA                         159

SEQ ID NO: 141          moltype = AA  length = 159
FEATURE                 Location/Qualifiers
REGION                  1..159
                        note = Ankyrin repeat domain specific for HBVc18 pMHC
source                  1..159
                        mol_type = protein
                        organism = synthetic construct
SEQUENCE: 141
GSDLGKKLLS AAQSGQDDEV RILLGAGADV NAKDKWGHTP LHLAAVKGHL EIAEVLLKAG   60
ADVNAKDEWG STPLHLAASQ GHLEIVEVLL KAGADVNAKD KKGATPLHLA ALVGHLEIVE  120
VLLKAVADVN AQDKSGKTPA DLAARAGHQD IAEVLQKAA                         159

SEQ ID NO: 142          moltype = AA  length = 159
FEATURE                 Location/Qualifiers
REGION                  1..159
                        note = Ankyrin repeat domain specific for HBVc18 pMHC
source                  1..159
                        mol_type = protein
                        organism = synthetic construct
SEQUENCE: 142
GSDLGKKLLQ AARAGQLDEV HELLKAGADV NAKDQHGKTP MHLAAQIGHL EIVEVLLKAG   60
ADVNAKDHIG WTPLHLAASV GHLEIVEVLL KAGADVNAKD QEGWTPLHVA AQLGHLEIVE  120
VLLKAGADVN AQDKSGKTPA DLAARAGHQD SAEVLQKAA                         159
```

DESIGNED ANKYRIN REPEAT DOMAINS WITH ALTERED SURFACE RESIDUES

CROSS-REFERENCE TO RELATED APPLICATIONS

The present application is a continuation of U.S. patent application Ser. No. 17/400,471 filed on Aug. 12, 2021, which is a continuation of International Application No. PCT/EP2020/085855 filed on Dec. 11, 2020, which claims the benefit of priority to EP19215433.4, filed on Dec. 11, 2019; EP19215434.2, filed on Dec. 11, 2019; EP19215435.9, filed on Dec. 11, 2019; EP19215436.7, filed on Dec. 11, 2019; EP20161059.9, filed on Mar. 4, 2020; and EP20181234.4, filed on Jun. 19, 2020. The disclosures of all forgoing patent applications are incorporated herein for all purposes by reference in their entirety.

SEQUENCE LISTING

The Sequence Listing provided in the XML file named SL13081.0021-01000.xml with a size of 470,714 bytes, which was created on Jan. 11, 2023 and is filed herewith, is incorporated by reference in its entirety.

FIELD OF THE INVENTION

The present invention relates to designed ankyrin repeat domains with altered surface residues, as well as to proteins comprising such a designed ankyrin repeat domain, nucleic acids encoding such domains or proteins, methods of preparing such proteins, pharmaceutical compositions comprising such proteins or nucleic acids, and the use of such proteins, nucleic acids or pharmaceutical compositions in the treatment of diseases.

BACKGROUND OF THE INVENTION

Designed ankyrin repeat domains are useful for the creation of drug candidates (WO2002020565; WO2011135067; WO2016156596; WO2018054971) for the treatment of disease. The designed ankyrin repeat domains comprised in such drug candidates typically bind target molecules with high affinity, thereby acting pharmacodynamically on the target, e.g. antagonizing target activity. To achieve a long systemic half-life of drug candidates based on designed ankyrin repeat domains, the drug candidate typically needs to comprise a moiety conferring long half-life, which can be achieved, e.g., by chemical modification with polyethylene glycol (PEG; WO2011135067) or by including one or more genetically fused designed ankyrin repeat domains with binding specificity for serum albumin (WO2012069654). Using the latter approach, drug candidates having long terminal half-life have been generated and described (WO2016156596; WO2018054971). Such designed ankyrin repeat domains with binding specificity for serum albumin can prolong the terminal half-life of proteins, e.g., to a terminal half-life similar to that of serum albumin (Steiner et al., *Protein Eng Des Sel.* 30(9):583-591 (2017)). As described in more detail below, Applicant has observed, however, that some designed ankyrin repeat domains exhibit fast clearance and thus short terminal half-life despite the fact that they are genetically fused to a designed ankyrin repeat domain with binding specificity for serum albumin. The importance of good pharmacokinetic properties of biologic drugs is well known in the art (see, e.g., Strohl, *BioDrugs* 29:215-239 (2015)).

Thus, there still remains a need for new methods or approaches of improving the pharmacokinetic properties (including prolonging the terminal half-life) of proteins, such as designed ankyrin repeat domains and proteins comprising one or more designed ankyrin repeat domain(s).

SUMMARY OF THE INVENTION

Applicant has unexpectedly observed that some designed ankyrin repeat domains exhibit fast clearance and thus short terminal half-life despite the fact that they are genetically fused to a designed ankyrin repeat domain with binding specificity for serum albumin (See e.g. Example 6 and FIG. 5 for Proteins #24, #27, #31, and #35). In efforts to understand this observation, the inventors have surprisingly discovered that altering certain amino acid residues in the N-terminal capping module and/or the C-terminal capping module of the designed ankyrin repeat domain results in improved pharmacokinetic properties, including a prolonged terminal half-life, of the designed ankyrin repeat domain and of proteins comprising the designed ankyrin repeat domain. The altered amino acid residues are mostly surface exposed residues. Thus, the present invention provides amino acid sequences that lead to improved pharmacokinetic properties of a designed ankyrin repeat domain and of proteins comprising the designed ankyrin repeat domain.

The invention provides designed ankyrin repeat domains comprising novel amino acid sequences. In one embodiment said designed ankyrin repeat domains comprise an amino acid sequence selected from the group consisting of SEQ ID NOs: 75 to 81, 88 to 94, and 107 to 111, wherein X represents any amino acid. In one embodiment, said designed ankyrin repeat domain comprises (i) an amino acid sequence selected from the group consisting of SEQ ID NOs: 75 to 81 and 107 to 111, wherein X represents any amino acid, and (ii) an amino acid sequence selected from the group consisting of SEQ ID NOs: 88 to 94, wherein X represents any amino acid. In one embodiment, said designed ankyrin repeat domain comprises (i) the amino acid sequence of SEQ ID NO: 78, wherein X represents any amino acid, and (ii) the amino acid sequence of SEQ ID NOs: 91, wherein X represents any amino acid. In one embodiment, said designed ankyrin repeat domain comprises an amino acid sequence selected from the group consisting of SEQ ID NOs: 95 to 102, wherein X represents any amino acid. The invention further provides a protein comprising (i) at least one designed ankyrin repeat domain of the invention, and (ii) at least one moiety for half-life extension. In one embodiment, said moiety for half-life extension is a designed ankyrin repeat domain with binding specificity for serum albumin. In one embodiment, said ankyrin repeat domain with binding specificity for serum albumin comprises an amino acid sequence with at least 80% amino acid sequence identity with any one of SEQ ID NOs: 4 to 8. In one embodiment, said protein further comprises at least one polypeptide linker. In one embodiment, said polypeptide linker is a glycine-serine (GS)-rich linker or a proline-threonine (PT)-rich linker, wherein preferably said polypeptide linker has the amino acid sequence of SEQ ID NO: 2 or 3, or of variants thereof. In one embodiment, said protein is a recombinant binding protein. The invention also provides a protein comprising (i) at least one, two, or three designed ankyrin repeat domains of the invention, and (ii) at least one or two designed ankyrin repeat domains with binding specificity for serum albumin, wherein preferably each of said designed ankyrin repeat domain(s) with binding specificity for serum albumin independently comprises an amino acid sequence with at least 80% amino acid sequence identity with any one of SEQ ID NOs: 4 to 8. In one embodiment, said protein is a recombinant binding protein. FIG. 1 further illustrates the invention schematically. The invention further provides nucleic acids encoding a designed ankyrin repeat of the invention or a protein of the invention. The invention further provides a pharmaceutical composition comprising a designed ankyrin repeat domain of the invention, a protein of the invention, or a nucleic acid of the invention. The invention further provides a method of treating a medical condition, the method comprising the step of administering, to a patient in need of such treatment, a therapeutically effective amount of a pharmaceutical composition of the invention. The invention further provides a method for preparing a protein, the method comprising the steps of (A) preparing a nucleic acid that encodes in one open reading frame (i) at least one designed ankyrin repeat domain of the invention, and (ii) at least one designed ankyrin repeat domain with binding specificity for serum albumin, and (B) transferring said nucleic acid into an expression host. In one embodiment, the expression host is *E. coli*.

BRIEF DESCRIPTION OF THE FIGURES

FIGS. 1A to 1F. Schematic illustration of the invention. FIG. 1A. Schematic representation of a designed ankyrin repeat domain of the invention. The designed ankyrin repeat domain (rectangle) comprises certain amino acids at defined positions, illustrated by the vertical black lines. FIG. 1B. Schematic representation of a comparator designed ankyrin repeat domain. The comparator designed ankyrin repeat domain comprises different amino acids than FIG. 1A in the corresponding positions. For example, FIG. 1A may include SEQ ID NO: 75 (of the present invention), whereas FIG. 1B may include SEQ ID NO: 69 (i.e. a sequence known in the art). FIG. 1C. Schematic illustration of a designed ankyrin repeat domain with binding specificity for serum albumin. A designed ankyrin repeat domain consisting of SEQ ID NO: 4 is an example of such a designed ankyrin repeat domain with binding specificity for serum albumin. FIG. 1D. Schematic illustration of a polypeptide linker. SEQ ID NOs: 2 and 3 are examples of such polypeptide linkers. FIG. 1E. Schematic illustration of the pharmacokinetic profile of a designed ankyrin repeat domain (covalently bound to a designed ankyrin repeat domain with binding specificity for serum albumin via a polypeptide linker) in comparison to a comparator designed ankyrin repeat domain (covalently bound to an identical designed ankyrin repeat domain with binding specificity for serum albumin via an identical polypeptide linker). The pharmacokinetic traces are schematically shown on the left, the respective construct is shown schematically on the right, with arrows indicating which curve is observed with which protein. C: Concentration, t: time. FIG. 1F. Schematic representation of an example of a protein of the invention. The protein comprises, from N terminus (left) to C terminus (right), a first designed ankyrin repeat domain with binding specificity for serum albumin, a first polypeptide linker, a first designed ankyrin repeat domain of the invention, a second polypeptide linker, a second designed ankyrin repeat domain of the invention, a third polypeptide linker, and a second designed ankyrin repeat domain with binding specificity for serum albumin. The designed ankyrin repeat domains of the invention may be binding domains with specificity for one target or for different targets. The order and number of the different domains may vary in the proteins of the invention.

FIG. 2. Sequence alignment of amino acid sequences present in N-terminal capping modules. SEQ ID NOs: 69 to 74 correspond to amino acid sequences found in N-terminal capping modules of designed ankyrin repeat domains known in the art (see, e.g., WO2012069655). SEQ ID NOs: 75 to 81 and 107 to 111 correspond to amino acid sequences of the present invention. Residue numbers are indicated above the sequences.

FIG. 3. Sequence alignment of amino acid sequences present in C-terminal capping modules. SEQ ID NOs: 82 to 87 correspond to amino acid sequences found in C-terminal capping modules of designed ankyrin repeat domains known in the art (see, e.g., WO2014001442 or WO2016156596). SEQ ID NOs: 88 to 94 correspond to amino acid sequences of the present invention. Residue numbers are indicated above the sequences.

FIGS. 4A and 4B. FIG. 4A: SDS-PAGE of Proteins #9 to #23; FIG. 4B: SDS-PAGE of Proteins #24 to #38. Proteins #9 to 38 (corresponding to SEQ ID NOs: 9 to 38, additionally having a His-tag (SEQ ID NO: 1) at the N-terminus) were expressed and purified as described in Example 2, subjected to a stability study as described in Example 3, and subjected to SDS-PAGE analysis as described in Example 4. All proteins were highly pure. M: molecular weight marker, molecular weight is indicated at the left of each figure; −: −80° C. control; +: Protein sample incubated at 60° C. for 1 week.

FIG. 5A: Pharmacokinetic profile in mouse of Protein #24, and variant Proteins #25 and #26. FIG. 5B: Pharmacokinetic profile in mouse of Protein #27, and variant Proteins #28, #29, and #30. FIG. 5C: Pharmacokinetic profile in mouse of Protein #31, and variant Proteins #32 #33, and #34. FIG. 5D: Pharmacokinetic profile in mouse of Protein #35, and variant Proteins #36, #37, and #38. The experiment was performed as described in Example 6 using Balb/c mice and 1 mg/kg intravenous dosing. Proteins #24 to #38 (comprising SEQ ID NOs: 24 to 38, respectively, with each having a His-tag (SEQ ID NO: 1) at the N terminus; symbol indicated in the figure) were produced and purified as described in Example 2. C: concentration in [nM]; t: time in [hours].

DETAILED DESCRIPTION OF THE INVENTION

Figure 5B:
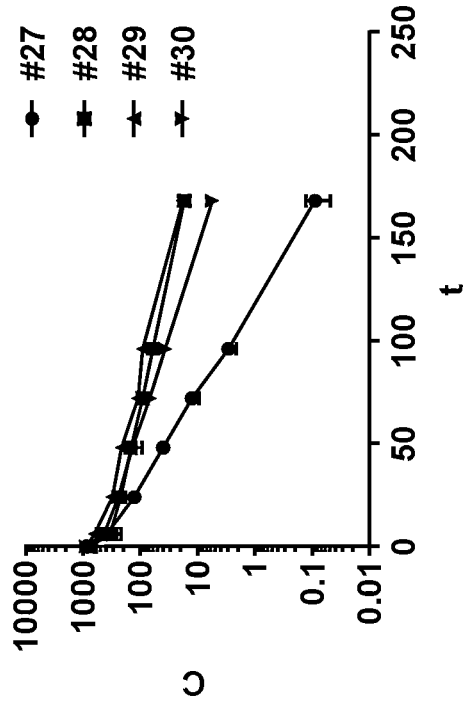
FIGS. 5A to 5D. Pharmacokinetic profiles in mouse of variants of designed ankyrin repeat domains (each genetically linked to an identical designed ankyrin repeat domain with binding specificity for serum albumin via an identical polypeptide linker).

In a first aspect, the present invention provides a designed ankyrin repeat domain comprising novel amino acid sequence motifs in the N-terminal capping module and/or the C-terminal capping module.

In one embodiment, the designed ankyrin repeat domain of the invention comprises an amino acid sequence selected from the group consisting of SEQ ID NOs: 75 to 81, 88 to 94, and 107 to 111, wherein X represents any amino acid. Amino acid sequences SEQ ID NOs: 75 to 81 and 107 to 111 are examples of sequences of the invention present in N-terminal capping modules of designed ankyrin repeat domains of the invention. These sequences are further illustrated in FIG. 2. Amino acid sequences SEQ ID NOs: 69 to 74 are examples of sequences present in N-terminal capping modules of designed ankyrin repeat domains known in the art (see also FIG. 2). Amino acid sequences SEQ ID NOs: 88 to 94 are examples of sequences of the invention present in C-terminal capping modules of designed ankyrin repeat domains of the invention. These sequences are further illustrated in FIG. 3. Amino acid sequences SEQ ID NOs: 82 to 87 are examples of sequences present in C-terminal capping modules of designed ankyrin repeat domains known in the art (see also FIG. 3). In one embodiment, any of the amino acid sequences selected from SEQ ID NOs: 75 to 81 and 107 to 111 is present in the N-terminal capping module of a designed ankyrin repeat domain. In one embodiment, any of the amino acid sequences selected from SEQ ID NOs: 88 to 94 is present in the C-terminal capping module of a designed ankyrin repeat domain.

In one embodiment, said designed ankyrin repeat domain comprises an amino acid sequence selected from the group consisting of SEQ ID NOs: 75 to 81, more preferably SEQ ID NOs: 77 to 81, more preferably SEQ ID NOs: 78 to 81, more preferably SEQ ID NOs: 79 to 81, more preferably SEQ ID NOs: 80 to 81, most preferably SEQ ID NO: 81, wherein X represents any amino acid. In one embodiment, said designed ankyrin repeat domain comprises the amino acid sequence of SEQ ID NO: 81, wherein X represents any amino acid. In one embodiment, said designed ankyrin repeat domain comprises the amino acid sequence of SEQ ID NO: 80, wherein X represents any amino acid. In one embodiment, said designed ankyrin repeat domain comprises the amino acid sequence of SEQ ID NO: 79, wherein X represents any amino acid. In one embodiment, said designed ankyrin repeat domain comprises the amino acid sequence of SEQ ID NO: 78, wherein X represents any amino acid. In one embodiment, said designed ankyrin repeat domain comprises the amino acid sequence of SEQ ID NO: 77, wherein X represents any amino acid. In one embodiment, said designed ankyrin repeat domain comprises the amino acid sequence of SEQ ID NO: 75 or 76. In one embodiment, said designed ankyrin repeat domain comprises the amino acid sequence of SEQ ID NO: 75. In one embodiment, said designed ankyrin repeat domain comprises the amino acid sequence of SEQ ID NO: 76.

In another embodiment, said designed ankyrin repeat domain comprises an amino acid sequence selected from the group consisting of SEQ ID NOs: 107 to 111, more preferably 108 to 111, more preferably 109 to 111, more preferably 110 to 111, most preferably 111, wherein X represents any amino acid. In one embodiment, said designed ankyrin repeat domain comprises the amino acid sequence of SEQ ID NO: 111, wherein X represents any amino acid. In one embodiment, said designed ankyrin repeat domain comprises the amino acid sequence of SEQ ID NO: 110, wherein X represents any amino acid. In one embodiment, said designed ankyrin repeat domain comprises the amino acid sequence of SEQ ID NO: 109, wherein X represents any amino acid. In one embodiment, said designed ankyrin repeat domain comprises the amino acid sequence of SEQ ID NO: 107 or 108. In one embodiment, said designed ankyrin repeat domain comprises the amino acid sequence of SEQ ID NO: 107. In one embodiment, said designed ankyrin repeat domain comprises the amino acid sequence of SEQ ID NO: 108.

In a further embodiment, said designed ankyrin repeat domain comprises an amino acid sequence selected from the group consisting of SEQ ID NOs: 88 to 94, more preferably 90 to 94, more preferably 91 to 94, more preferably 92 to 94, more preferably 93 to 94, most preferably 94, wherein X represents any amino acid. In one embodiment, said designed ankyrin repeat domain comprises the amino acid sequence of SEQ ID NO: 94, wherein X represents any amino acid. In one embodiment, said designed ankyrin repeat domain comprises the amino acid sequence of SEQ ID NO: 93, wherein X represents any amino acid. In one embodiment, said designed ankyrin repeat domain comprises the amino acid sequence of SEQ ID NO: 92, wherein X represents any amino acid. In one embodiment, said designed ankyrin repeat domain comprises the amino acid sequence of SEQ ID NO: 91, wherein X represents any amino acid. In one embodiment, said designed ankyrin repeat domain comprises the amino acid sequence of SEQ ID NO: 90, wherein X represents any amino acid. In one embodiment, said designed ankyrin repeat domain comprises the amino acid sequence of SEQ ID NOs: 88 or 89. In one embodiment, said designed ankyrin repeat domain comprises the amino acid sequence of SEQ ID NO: 88. In one embodiment, said designed ankyrin repeat domain comprises the amino acid sequence of SEQ ID NO: 89.

In a further embodiment, the designed ankyrin repeat domain of the invention comprises (i) an amino acid sequence selected from the group consisting of SEQ ID NOs: 75 to 81 and 107 to 111, wherein X represents any amino acid, and (ii) an amino acid sequence selected from the group consisting of SEQ ID NOs: 88 to 94, wherein X represents any amino acid. In one embodiment, said designed ankyrin repeat domain comprises (i) the amino acid sequence of SEQ ID NO: 81, wherein X represents any amino acid, and (ii) the amino acid sequence of SEQ ID NO: 93, wherein X represents any amino acid.

In one embodiment, said designed ankyrin repeat domain comprises (i) the amino acid sequence of SEQ ID NO: 81, wherein X represents any amino acid, and (ii) the amino acid sequence of SEQ ID NO: 94, wherein X represents any amino acid.

In one embodiment, said designed ankyrin repeat domain comprises (i) the amino acid sequence of SEQ ID NO: 80, wherein X represents any amino acid, and (ii) the amino acid sequence of SEQ ID NO: 93, wherein X represents any amino acid.

In one embodiment, said designed ankyrin repeat domain comprises (i) the amino acid sequence of SEQ ID NO: 80, wherein X represents any amino acid, and (ii) the amino acid sequence of SEQ ID NO: 94, wherein X represents any amino acid.

In one embodiment, said designed ankyrin repeat domain comprises (i) the amino acid sequence of SEQ ID NO: 79, wherein X represents any amino acid, and (ii) the amino acid sequence of SEQ ID NO: 92, wherein X represents any amino acid.

In one embodiment, said designed ankyrin repeat domain comprises (i) the amino acid sequence of SEQ ID NO: 78, wherein X represents any amino acid, and (ii) the amino acid sequence of SEQ ID NO: 91, wherein X represents any amino acid.

In one embodiment, said designed ankyrin repeat domain comprises (i) the amino acid sequence of SEQ ID NO: 77, wherein X represents any amino acid, and (ii) the amino acid sequence of SEQ ID NO: 90, wherein X represents any amino acid.

In one embodiment, said designed ankyrin repeat domain comprises (i) the amino acid sequence of SEQ ID NO: 76, wherein X represents any amino acid, and (ii) the amino acid sequence of SEQ ID NO: 89, wherein X represents any amino acid.

In one embodiment, said designed ankyrin repeat domain comprises (i) the amino acid sequence of SEQ ID NO: 75, wherein X represents any amino acid, and (ii) the amino acid sequence of SEQ ID NO: 88, wherein X represents any amino acid.

In one embodiment, said designed ankyrin repeat domain comprises (i) the amino acid sequence of SEQ ID NO: 111, wherein X represents any amino acid, and (ii) the amino acid sequence of SEQ ID NO: 94, wherein X represents any amino acid.

In one embodiment, said designed ankyrin repeat domain comprises (i) the amino acid sequence of SEQ ID NO: 111, wherein X represents any amino acid, and (ii) the amino acid sequence of SEQ ID NO: 93, wherein X represents any amino acid.

In one embodiment, said designed ankyrin repeat domain comprises (i) the amino acid sequence of SEQ ID NO: 111, wherein X represents any amino acid, and (ii) the amino acid sequence of SEQ ID NO: 92, wherein X represents any amino acid.

In one embodiment, said designed ankyrin repeat domain comprises (i) the amino acid sequence of SEQ ID NO: 110, wherein X represents any amino acid, and (ii) the amino acid sequence of SEQ ID NO: 91, wherein X represents any amino acid.

In one embodiment, said designed ankyrin repeat domain comprises (i) the amino acid sequence of SEQ ID NO: 109, wherein X represents any amino acid, and (ii) the amino acid sequence of SEQ ID NO: 90, wherein X represents any amino acid.

In one embodiment, said designed ankyrin repeat domain comprises (i) the amino acid sequence of SEQ ID NO: 108, wherein X represents any amino acid, and (ii) the amino acid sequence of SEQ ID NO: 89, wherein X represents any amino acid.

In one embodiment, said designed ankyrin repeat domain comprises (i) the amino acid sequence of SEQ ID NO: 108, wherein X represents any amino acid, and (ii) the amino acid sequence of SEQ ID NO: 88, wherein X represents any amino acid.

In one embodiment, said designed ankyrin repeat domain comprises (i) the amino acid sequence of SEQ ID NO: 107, wherein X represents any amino acid, and (ii) the amino acid sequence of SEQ ID NO: 88, wherein X represents any amino acid.

In one embodiment, said designed ankyrin repeat domain comprises (i) the amino acid sequence of SEQ ID NO: 107, wherein X represents any amino acid, and (ii) the amino acid sequence of SEQ ID NO: 89, wherein X represents any amino acid.

In a further embodiment, the designed ankyrin repeat domain of the invention comprises an N-terminal capping module having an amino acid sequence wherein the amino acid at position 8 is Q and/or the amino acid at position 15 is L. In one embodiment, said designed ankyrin repeat domain comprises a N-terminal capping module having an amino acid sequence wherein the amino acid at position 4 is S, the amino acid at position 8 is Q, the amino acid at position 15 is L, the amino acid at position 17 is T, the amino acid at position 20 is T, and/or the amino acid at position 23 is Q. In a preferred embodiment, said N-terminal capping module comprises an amino acid sequence of 30 amino acids. In a further preferred embodiment, said N-terminal capping module consists of an amino acid sequence of 30 amino acids. Preferably, said position numbers of positions of the N-terminal capping module are determined by alignment to SEQ ID NO: 69 using the position numbers of SEQ ID NO: 69. Preferably, said alignment comprises no amino acid gaps. Sequence alignment generation is a procedure well known in the art.

In one embodiment, the designed ankyrin repeat domain of the invention comprises a C-terminal capping module having an amino acid sequence wherein the amino acid at position 14 is R and/or the amino acid at position 18 is Q. In one embodiment, said designed ankyrin repeat domain comprises a C-terminal capping module having an amino acid sequence wherein the amino acid at position 3 is T, the amino acid at position 4 is Q, the amino acid Substitute Specification (Marked) at position 6 is T, the amino acid at position 14 is R, the amino acid at position 18 is Q, the amino acid at position 19 is Q, the amino acid at position 22 is S, and/or the amino acid at position 26 is Q. In a preferred embodiment, said C-terminal capping module comprises an amino acid sequence of 28 amino acids. In a further preferred embodiment, said C-terminal capping module consists of an amino acid sequence of 28 amino acids. Preferably, said position numbers of positions of the C-terminal capping module are determined by alignment to SEQ ID NO: 82 using the position numbers of SEQ ID NO: 82. Preferably, said alignment comprises no amino acid gaps.

In one embodiment, the designed ankyrin repeat domain of the invention comprises (i) an N-terminal capping module having an amino acid sequence wherein the amino acid at position 8 is Q and/or the amino acid at position 15 is L, and/or (ii) a C-terminal capping module having an amino acid sequence wherein the amino acid at position 14 is R and/or the amino acid at position 18 is Q. In one embodiment, the designed ankyrin repeat domain of the invention comprises (i) an N-terminal capping module having an amino acid sequence wherein the amino acid at position 8 is Q and/or the amino acid at position 15 is L, and (ii) a C-terminal capping module having an amino acid sequence wherein the amino acid at position 14 is R and/or the amino acid at position 18 is Q. In one embodiment, said designed ankyrin repeat domain of the invention comprises (i) an N-terminal capping module having an amino acid sequence wherein the amino acid at position 8 is Q, and (ii) a C-terminal capping module having an amino acid sequence wherein the amino acid at position 14 is R and/or the amino acid at position 18 is Q. In one embodiment, said designed ankyrin repeat domain of the invention comprises (i) an N-terminal capping module having an amino acid sequence wherein the amino acid at position 15 is L, and (ii) a C-terminal capping module having an amino acid sequence wherein the amino acid at position 14 is R and/or the amino acid at position 18 is Q. In one embodiment, said designed ankyrin repeat domain of the invention comprises (i) an N-terminal capping module having an amino acid sequence wherein the amino acid at position 8 is Q and/or the amino acid at position 15 is L, and (ii) a C-terminal capping module having an amino acid sequence wherein the amino acid at position 14 is R. In one embodiment, said designed ankyrin repeat domain of the invention comprises (i) an N-terminal capping module having an amino acid sequence wherein the amino acid at position 8 is Q and/or the amino acid at position 15 is L, and (ii) a C-terminal capping module having an amino acid sequence wherein the amino acid at position 18 is Q. In one embodiment, said designed ankyrin repeat domain of the invention comprises (i) an N-terminal capping module having an amino acid sequence wherein the amino acid at position 8 is Q and the amino acid at position 15 is L, and (ii) a C-terminal capping module having an amino acid sequence wherein the amino acid at position 14 is R and the amino acid at position 18 is Q. In a preferred embodiment, said N-terminal capping module comprises an amino acid sequence of 30 amino acids and said C-terminal capping module comprises an amino acid sequence of 28 amino acids. In a further preferred embodiment, said N-terminal capping module consists of an amino acid sequence of 30 amino acids and said C-terminal capping module consists of an amino acid sequence of 28 amino acids.

Preferably, said position numbers of positions of the N-terminal capping module are determined by alignment to SEQ ID NO: 69 using the position numbers of SEQ ID NO: 69, and said position numbers of positions of the C-terminal capping module are determined by alignment to SEQ ID NO: 82 using the position numbers of SEQ ID NO: 82. Preferably, said alignments comprise no amino acid gaps.

In a further embodiment, the designed ankyrin repeat domain of the invention comprises an N-terminal capping module having an amino acid sequence DLGKKLLQAARAGQLDEVRELLKAGADVNA (SEQ ID NO: 75), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 75 in positions other than position 8 and position 15 are optionally exchanged by other amino acids.

In a further embodiment, the designed ankyrin repeat domain of the invention comprises an N-terminal capping module having an amino acid sequence DLGSKLLQAARAGQLDTVRTLLQAGADVNA (SEQ ID NO: 76), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 76 in positions other than positions 4, 8, 15, 17, 20 and 23 are optionally exchanged by other amino acids.

In one embodiment, the designed ankyrin repeat domain of the invention comprises a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In one embodiment, the designed ankyrin repeat domain of the invention comprises a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids.

In one embodiment, the designed ankyrin repeat domain of the invention comprises (i) an N-terminal capping module having an amino acid sequence DLGKKLLQAARAGQLDEVRELLKAGADVNA (SEQ ID NO: 75), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 10 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 9 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 8 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 7 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 6 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids. In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 5 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids. In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 4 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids. In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 3 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids. In one embodiment, said designed ankyrin repeat domain comprises (i) an N-terminal capping module having an amino acid sequence DLGKKLLQAARAGQLDEVRELLKAGADVNA (SEQ ID NO: 75), wherein up to 2 amino acids of SEQ ID NO: 75 in positions other than position 8 and position 15 are optionally exchanged by other amino acids, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids. In one embodiment, said designed ankyrin repeat domain comprises (i) an N-terminal capping module having an amino acid sequence DLGKKLLQAARAGQLDEVRELLKAGADVNA (SEQ ID NO: 75), wherein up to one amino acid of SEQ ID NO: 75 in a position other than position 8 and position 15 is optionally exchanged by another amino acid, and (ii) a C-terminal capping module having an amino acid sequence QDKSGKTPADLAARAGHQDIAEVLQKAA (SEQ ID NO: 88), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 88 in positions other than position 14 and position 18 are optionally exchanged by other amino acids.

In a further embodiment, the designed ankyrin repeat domain of the invention comprises (i) an N-terminal capping module having an amino acid sequence DLGSKLLQAARAGQLDTVRTLLQAGADVNA (SEQ ID NO: 76), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 75 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids.

In one embodiment, said designed ankyrin repeat domain comprises (i) an N-terminal capping module having an amino acid sequence DLGSKLLQAARAGQLDTVRTLLQAGADVNA (SEQ ID NO: 76), wherein up to 10 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSKLLQAARAGQLDTVRTLLQAGADVNA (SEQ ID NO: 76), wherein up to 9 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 8 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 7 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 6 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 5 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 4 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 3 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to 2 amino acids of SEQ ID NO: 76 in positions other than positions 4, 8, 15, 17, 20 and 23 are optionally exchanged by other amino acids, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids. In one embodiment, said designed ankyrin repeat domain comprises (i) an N-terminal capping module having an amino acid sequence DLGSK-LLQAARAGQLDTVRTLLQAGADVNA (SEQ ID NO: 76), wherein up to one amino acid of SEQ ID NO: 76 in a position other than positions 4, 8, 15, 17, 20 and 23 is optionally exchanged by another amino acid, and (ii) a C-terminal capping module having an amino acid sequence QDTQGTTPADLAARAGHQQIASVLQQAA (SEQ ID NO: 89), wherein up to 10 amino acids, up to 9 amino acids, up to 8 amino acids, up to 7 amino acids, up to 6 amino acids, up to 5 amino acids, up to 4 amino acids, up to 3 amino acids, up to 2 amino acids, or up to one amino acid of SEQ ID NO: 89 in positions other than positions 3, 4, 6, 14, 18, 19, 22 and 26 are optionally exchanged by other amino acids.

In a further embodiment, the designed ankyrin repeat domain of the invention comprises (i) an N-terminal capping module having an amino acid sequence selected from SEQ ID NOs: 69 to 74, preferably SEQ ID NOs: 70 to 74, more preferably SEQ ID NOs: 71 to 74, more preferably SEQ ID NOs: 72 to 74, more preferably SEQ ID NOs: 73 to 74, most preferably SEQ ID NO: 74, and (ii) a C-terminal capping module having an amino acid sequence selected from SEQ ID NOs: 82 to 87, preferably SEQ ID NOs: 83 to 87, more preferably SEQ ID NOs: 84 to 87, more preferably SEQ ID NOs: 85 to 87, more preferably SEQ ID NOs: 86 to 87, most preferably SEQ ID NO: 87, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X. Amino acid residues comprising a negatively charged side chain include D and E.

In one embodiment, said designed ankyrin repeat domain comprises (i) an N-terminal capping module having the amino acid sequence of SEQ ID NO: 74 and (ii) a C-terminal capping module having the amino acid sequence of SEQ ID NO: 87, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In one embodiment, said designed ankyrin repeat domain comprises (i) an N-terminal capping module having the amino acid sequence of SEQ ID NO: 73 and (ii) a C-terminal capping module having the amino acid sequence of SEQ ID NO: 86, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In one embodiment, said designed ankyrin repeat domain comprises (i) an N-terminal capping module having the amino acid sequence of SEQ ID NO: 72 and (ii) a C-terminal capping module having the amino acid sequence of SEQ ID NO: 85, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In one embodiment, said designed ankyrin repeat domain comprises (i) an N-terminal capping module having the amino acid sequence of SEQ ID NO: 71 and (ii) a C-terminal capping module having the amino acid sequence of SEQ ID NO: 84, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In one embodiment, said designed ankyrin repeat domain comprises (i) an N-terminal capping module having the amino acid sequence of SEQ ID NO: 70 and (ii) a C-terminal capping module having the amino acid sequence of SEQ ID NO: 83, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In one embodiment, said designed ankyrin repeat domain comprises (i) an N-terminal capping module having the amino acid sequence of SEQ ID NO: 71 and (ii) a C-terminal capping module having the amino acid sequence of SEQ ID NO: 83, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In one embodiment, said designed ankyrin repeat domain comprises (i) an N-terminal capping module having the amino acid sequence of SEQ ID NO: 72 and (ii) a C-terminal capping module having the amino acid sequence of SEQ ID NO: 84, wherein 3 or 4, preferably 4, amino acid residues comprising a negatively charged side chain in said N- and C-terminal capping modules of said designed ankyrin repeat domain are exchanged by amino acids selected from the group consisting of L, Q, R, S, and T, more preferably L, Q, and R, in positions other than X.

In a further embodiment, the designed ankyrin repeat domain of the invention comprises an N-terminal capping module consisting of the amino acid sequence of SEQ ID NO: 75. In one embodiment, the designed ankyrin repeat domain of the invention comprises an N-terminal capping module consisting of the amino acid sequence of SEQ ID NO: 76. In one embodiment, the designed ankyrin repeat domain of the invention comprises an N-terminal capping module consisting of the amino acid sequence of SEQ ID NO: 107. In one embodiment, the designed ankyrin repeat domain of the invention comprises an N-terminal capping module consisting of the amino acid sequence of SEQ ID NO: 108. In one embodiment, the designed ankyrin repeat domain of the invention comprises a C-terminal capping module consisting of the amino acid sequence of SEQ ID NO: 88. In one embodiment, the designed ankyrin repeat domain of the invention comprises a C-terminal capping module consisting of the amino acid sequence of SEQ ID NO: 89.

In a further embodiment, the designed ankyrin repeat domain of the invention comprises an amino acid sequence selected from the group consisting of SEQ ID NOs: 95 to 102, wherein X represents any amino acid. In one embodiment, said designed ankyrin repeat domain comprises an amino acid sequence selected from the group consisting of SEQ ID NOs: 95 to 98, wherein X represents any amino acid. In one embodiment, said designed ankyrin repeat domain comprises an amino acid sequence selected from the group consisting of SEQ ID NOs: 99 to 102, wherein X represents any amino acid. In one embodiment, said designed ankyrin repeat domain comprises an amino acid sequence selected from the group consisting of SEQ ID NOs: 96 and 97, wherein X represents any amino acid. In one embodiment, said designed ankyrin repeat domain comprises the amino acid sequence of SEQ ID NO: 96, wherein X represents any amino acid. In one embodiment, said designed ankyrin repeat domain comprises the amino acid sequence of SEQ ID NO: 97, wherein X represents any amino acid. In one embodiment, said designed ankyrin repeat domain comprises the amino acid sequence of SEQ ID NO: 95, wherein X represents any amino acid. In one embodiment, said designed ankyrin repeat domain comprises the amino acid sequence of SEQ ID NO: 98, wherein X represents any amino acid. In one embodiment, said designed ankyrin repeat domain comprises the amino acid sequence of SEQ ID NO: 99, wherein X represents any amino acid. In one embodiment, said designed ankyrin repeat domain comprises the amino acid sequence of SEQ ID NO: 100, wherein X represents any amino acid. In one embodiment, said designed ankyrin repeat domain comprises the amino acid sequence of SEQ ID NO: 101, wherein X represents any amino acid. In one embodiment, said designed ankyrin repeat domain comprises the amino acid sequence of SEQ ID NO: 102, wherein X represents any amino acid.

In a further embodiment, the designed ankyrin repeat domain of the invention comprises the amino acid sequence DLGX$_1$KLLQAAX$_2$X$_3$GQLDEVRX$_4$LX$_5$X$_6$X$_7$GADV NAX$_8$DX$_9$X$_{10}$GX$_{11}$TPLHX$_{12}$AAX$_{13}$X$_{14}$GHLE IVEVLLKX$_{15}$GADVNAX$_{16}$DX$_{17}$X$_{18}$GX$_{19}$TPLHX$_{20}$A AX$_{21}$X$_{22}$GHLEIVEVLLKX$_{23}$GADVNAX$_{24}$DX$_{25}$X$_{26}$G X$_{27}$TPADX$_{28}$AARX$_{29}$GHEDIAEVLQKX$_{30}$X$_{31}$ (SEQ ID NO: 96), wherein
- X$_1$ represents any amino acid, preferably K or S;
- X$_2$ represents any amino acid, preferably R;
- X$_3$ represents any amino acid, preferably A;
- X$_4$ represents any amino acid, preferably E or I;
- X$_5$ represents any amino acid, preferably M, L, I, more preferably L;
- X$_6$ represents any amino acid, preferably A or K; more preferably K;
- X$_7$ represents any amino acid, preferably A or N; more preferably A;
- X$_8$ and X$_{16}$ represent any amino acid, preferably K;
- X$_9$, X$_{10}$, X$_{11}$, X$_{12}$, X$_{13}$, X$_{14}$, X$_{17}$, X$_{18}$, X$_{19}$, X$_{20}$, X$_{21}$, and X$_{22}$ represent any amino acid, preferably any amino acid selected from the group consisting of A, D, E, F, H, I, K, L, N, P, Q, R, S, T, V, W, Y;
- X$_{15}$, and X$_{23}$ represent any amino acid, preferably A, N, H, or Y; more preferably A;
- X$_{24}$ represents any amino acid, preferably K or Q, more preferably Q;
- X$_{25}$ represents any amino acid, preferably K or T, more preferably K;
- X$_{26}$ represents any amino acid, preferably S or Q, more preferably S;
- X$_{27}$ represents any amino acid, preferably K or T, more preferably K;
- X$_{28}$ represents any amino acid, preferably L or I, more preferably L;
- X$_{29}$ represents any amino acid, preferably A or N, more preferably A;
- X$_{30}$ represents any amino acid, L or A, more preferably A; and
- X$_{31}$ represents any amino acid, N or A, more preferably A.

In one embodiment, the designed ankyrin repeat domain of the invention comprises the amino acid sequence DLGX$_1$KLLQAAX$_2$X$_3$GQLDEVRX$_4$LX$_5$X$_6$X$_7$GADV NAX$_8$DX$_9$X$_{10}$GX$_{11}$TPLHX$_{12}$AAX$_{13}$X$_{14}$GHLE IVEVLLKX$_{15}$GADVNAX$_{16}$DX$_{17}$X$_{18}$GX$_{19}$TPLHX$_{20}$A AX$_{21}$X$_{22}$GHLEIVEVLLKX$_{23}$GADVNAX$_{24}$DX$_{25}$X$_{26}$G X$_{27}$TPLHX$_{28}$AAX$_{29}$X$_{30}$GHLEIVEVLLKX$_{31}$GADVN AX$_{32}$DX$_{33}$X$_{34}$GX$_{35}$TPADX$_{36}$AARX$_{37}$G HEDIAEVLQKX$_{38}$X$_{39}$ (SEQ ID NO: 97), wherein
- X$_1$ represents any amino acid, preferably K or S;
- X$_2$ represents any amino acid, preferably R;
- X$_3$ represents any amino acid, preferably A;
- X$_4$ represents any amino acid, preferably E or I;
- X$_5$ represents any amino acid, preferably M, L, I, more preferably L;
- X$_6$ represents any amino acid, preferably A or K; more preferably K;
- X$_7$ represents any amino acid, preferably A or N; more preferably A;
- X$_8$, X$_{16}$, and X$_{24}$ represent any amino acid, preferably K;
- X$_9$, X$_{10}$, X$_{11}$, X$_{12}$, X$_{13}$, X$_{14}$, X$_{17}$, X$_{18}$, X$_{19}$, X$_{20}$, X$_{21}$, X$_{22}$, X$_{25}$, X$_{26}$, X$_{27}$, X$_{28}$, X$_{29}$, and X$_{30}$ represent any amino acid, preferably any amino acid selected from the group consisting of A, D, E, F, H, I, K, L, N, P, Q, R, S, T, V, W, Y;
- X$_{15}$, X$_{23}$, and X$_{31}$ represent any amino acid, preferably A, N, H, or Y; more preferably A;
- X$_{32}$ represents any amino acid, preferably K or Q, more preferably Q;
- X$_{33}$ represents any amino acid, preferably K or T, more preferably K;
- X$_{34}$ represents any amino acid, preferably S or Q, more preferably S;
- X$_{35}$ represents any amino acid, preferably K or T, more preferably K;
- X$_{36}$ represents any amino acid, preferably L or I, more preferably L;
- X$_{37}$ represents any amino acid, preferably A or N, more preferably A;
- X$_{38}$ represents any amino acid, L or A, more preferably A; and
- X$_{39}$ represents any amino acid, N or A, more preferably A.

In a further embodiment, the designed ankyrin repeat domain of the invention consists of an amino acid sequence wherein the amino acid at position 8 is Q, the amino acid at position 15 is L, the amino acid at position 110 is R, and the amino acid at position 114 is Q. In a preferred embodiment, said designed ankyrin repeat domain consists of an amino acid sequence with a length of 124 amino acids. Preferably, said position numbers are determined by alignment to SEQ ID NO: 96 using the position numbers of SEQ ID NO: 96. Preferably, said alignment comprises no amino acid gaps. Sequence alignment generation is a procedure well known in the art.

In one embodiment, the designed ankyrin repeat domain of the invention consists of an amino acid sequence wherein the amino acid at position 8 is Q, the amino acid at position 15 is L, the amino acid at position 143 is R, and the amino acid at position 147 is Q. In a preferred embodiment, said designed ankyrin repeat domain consists of an amino acid sequence of 157 amino acids. Preferably, said position numbers are determined by alignment to SEQ ID NO: 97 using the position numbers of SEQ ID NO: 97. Preferably, said alignment comprises no amino acid gaps. Sequence alignment generation is a procedure well known in the art.

In one embodiment, the designed ankyrin repeat domain of the invention consists of an amino acid sequence wherein the amino acid at position 8 is Q, the amino acid at position 15 is L, the amino acid at position 77 is R, and the amino acid at position 81 is Q. In a preferred embodiment, said designed ankyrin repeat domain consists of an amino acid sequence of 91 amino acids. Preferably, said position numbers are determined by alignment to SEQ ID NO: 95 using the position numbers of SEQ ID NO: 95. Preferably, said alignment comprises no amino acid gaps. Sequence alignment generation is a procedure well known in the art.

In one embodiment, the designed ankyrin repeat domain of the invention consists of an amino acid sequence wherein the amino acid at position 8 is Q, the amino acid at position 15 is L, the amino acid at position 176 is R, and the amino acid at position 180 is Q. In a preferred embodiment, said designed ankyrin repeat domain consists of an amino acid sequence of 190 amino acids. Preferably, said position numbers are determined by alignment to SEQ ID NO: 98 using the position numbers of SEQ ID NO: 98. Preferably, said alignment comprises no amino acid gaps. Sequence alignment generation is a procedure well known in the art.

In a further embodiment, the designed ankyrin repeat domain of the invention has an amino acid sequence which differs from SEQ ID NO: 104 by at least one, preferably at least two, more preferably at least three amino acids, and by up to 30, up to 25, up to 20, up to 15, up to 14, up to 13, up to 12, up to 11, up to ten, up to 9, up to 8, up to 7, up to 6, up to 5, preferably up to 4 amino acids, outside the positions comprising X, and wherein X represents any amino acid. In one embodiment, said designed ankyrin repeat domain has an amino acid sequence which differs from SEQ ID NO: 104 by the amino acids at positions 15 and 114, more preferably positions 8, 15, and 114, more preferably positions 8, 15, 110, and 114, and wherein X represents any amino acid. In one embodiment, said designed ankyrin repeat domain has an amino acid sequence which differs from SEQ ID NO: 104 by the amino acids at positions 15 and 114, more preferably positions 8, 15, and 114, more preferably positions 8, 15, 110, and 114, and wherein said amino acid at position 8 is Q, said amino acid at position 15 is L, said amino acid at position 110 is R, and said amino acid at position 114 is Q, and wherein X represents any amino acid. In one embodiment, said designed ankyrin repeat domain has an amino acid sequence which differs from SEQ ID NO: 104 by the amino acids at positions 4, 8, 15, 17, 20, 23, 99, 100, 102, 110, 114, 115, 118, and 122, and wherein X represents any amino acid. In one embodiment, said designed ankyrin repeat domain has an amino acid sequence which differs from SEQ ID NO: 104 by the amino acids at positions 4, 8, 15, 17, 20, 23, 99, 100, 102, 110, 114, 115, 118, and 122, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 99 is T, said amino acid at position 100 is Q, said amino acid at position 102 is T, said amino acid at position 110 is R, said amino acid at position 114 is Q, said amino acid at position 115 is Q, said amino acid at position 118 is S, and said amino acid at position 122 is Q, and wherein X represents any amino acid.

In one embodiment, the designed ankyrin repeat domain of the invention has an amino acid sequence which differs from SEQ ID NO: 105 by at least one, preferably at least two, more preferably at least three amino acids, and by up to 30, up to 25, up to 20, up to 15, up to 14, up to 13, up to 12, up to 11, up to ten, up to 9, up to 8, up to 7, up to 6, up to 5, preferably up to 4 amino acids, outside the positions comprising X, and wherein X represents any amino acid. In one embodiment, said designed ankyrin repeat domain has an amino acid sequence which differs from SEQ ID NO: 105 by the amino acids at positions 15 and 147, more preferably positions 8, 15, and 147, more preferably positions 8, 15, 143, and 147, and wherein X represents any amino acid. In one embodiment, said designed ankyrin repeat domain has an amino acid sequence which differs from SEQ ID NO: 105 by the amino acids at positions 15 and 147, more preferably positions 8, 14, and 147, more preferably positions 8, 15, 143, and 147, and wherein said amino acid at position 8 is Q, said amino acid at position 15 is L, said amino acid at position 143 is R, and said amino acid at position 147 is Q, and wherein X represents any amino acid. In one embodiment, said designed ankyrin repeat domain has an amino acid sequence which differs from SEQ ID NO: 105 by the amino acids at positions 4, 8, 15, 17, 20, 23, 132, 133, 135, 143, 147, 148, 151, and 155, and wherein X represents any amino acid. In one embodiment, said designed ankyrin repeat domain has an amino acid sequence which differs from SEQ ID NO: 105 by the amino acids at positions 4, 8, 15, 17, 20, 23, 132, 133, 135, 143, 147, 148, 151, and 155, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 132 is T, said amino acid at position 133 is Q, said amino acid at position 135 is T, said amino acid at position 143 is R, said amino acid at position 147 is Q, said amino acid at position 148 is Q, said amino acid at position 151 is S, and said amino acid at position 155 is Q, and wherein X represents any amino acid.

In one embodiment, the designed ankyrin repeat domain of the invention has an amino acid sequence which differs from SEQ ID NO: 103 by at least one, preferably at least two, more preferably at least three amino acids, and by up to 30, up to 25, up to 20, up to 15, up to 14, up to 13, up to 12, up to 11, up to ten, up to 9, up to 8, up to 7, up to 6, up to 5, preferably up to 4 amino acids, outside the positions comprising X, and wherein X represents any amino acid. In one embodiment, said designed ankyrin repeat domain has an amino acid sequence which differs from SEQ ID NO: 103 by the amino acids at positions 15 and 81, more preferably positions 8, 15, and 81, more preferably positions 8, 15, 77, and 81, and wherein X represents any amino acid. In one embodiment, said designed ankyrin repeat domain has an amino acid sequence which differs from SEQ ID NO: 103 by the amino acids at positions 15 and 81, more preferably positions 8, 15, and 81, more preferably positions 8, 15, 77, and 81, and wherein said amino acid at position 8 is Q, said amino acid at position 15 is L, said amino acid at position 77 is R, and said amino acid at position 81 is Q, and wherein X represents any amino acid. In one embodiment, said designed ankyrin repeat domain has an amino acid sequence which differs from SEQ ID NO: 103 by the amino acids at positions 4, 8, 15, 17, 20, 23, 66, 67, 69, 77, 81, 82, 85, and 89, and wherein X represents any amino acid. In one embodiment, said designed ankyrin repeat domain has an amino acid sequence which differs from SEQ ID NO: 103 by the amino acids at 4, 8, 15, 17, 20, 23, 66, 67, 69, 77, 81, 82, 85, and 89, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 66 is T, said amino acid at position 67 is Q, said amino acid at position 69 is T, said amino acid at position 77 is R, said amino acid at position 81 is Q, said amino acid at position 82 is Q, said amino acid at position 85 is S, and said amino acid at position 89 is Q, and wherein X represents any amino acid.

In one embodiment, the designed ankyrin repeat domain of the invention has an amino acid sequence which differs from SEQ ID NO: 106 by at least one, preferably at least two, more preferably at least three amino acids, and by up to 30, up to 25, up to 20, up to 15, up to 14, up to 13, up to 12, up to 11, up to ten, up to 9, up to 8, up to 7, up to 6, up to 5, preferably up to 4 amino acids, outside the positions comprising X, and wherein X represents any amino acid. In one embodiment, said designed ankyrin repeat domain has an amino acid sequence which differs from SEQ ID NO: 106 by the amino acids at positions 15 and 180, more preferably positions 8, 15, and 180, more preferably positions 8, 15, 176, and 180, and wherein X represents any amino acid. In one embodiment, said designed ankyrin repeat domain has an amino acid sequence which differs from SEQ ID NO: 106 by the amino acids at positions 15 and 180, more preferably positions 8, 15, and 180, more preferably positions 8, 15, 176, and 180, and wherein said amino acid at position 8 is Q, said amino acid at position 15 is L, said amino acid at position 176 is R, and said amino acid at position 180 is Q, and wherein X represents any amino acid. In one embodiment, said designed ankyrin repeat domain has an amino acid sequence which differs from SEQ ID NO: 106 by the amino acids at positions 4, 8, 15, 17, 20, 23, 66, 67, 69, 77, 81, 82, 85, and 89, and wherein X represents any amino acid. In one embodiment, said designed ankyrin repeat domain has an amino acid sequence which differs from SEQ ID NO: 106 by the amino acids at 4, 8, 15, 17, 20, 23, 165, 166, 168, 176, 180, 181, 184, and 188, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 165 is T, said amino acid at position 166 is Q, said amino acid at position 168 is T, said amino acid at position 176 is R, said amino acid at position 180 is Q, said amino acid at position 181 is Q, said amino acid at position 184 is S, and said amino acid at position 188 is Q, and wherein X represents any amino acid.

In a further embodiment, the designed ankyrin repeat domain of the invention has an amino acid sequence which is identical to SEQ ID NO: 104, with the exception of the amino acids at positions 15 and 114. In one embodiment, said designed ankyrin repeat domain has an amino acid sequence which is identical to SEQ ID NO: 104, with the exception of the amino acids at positions 8, 15, and 114. In one embodiment, said designed ankyrin repeat domain has an amino acid sequence which is identical to SEQ ID NO: 104, with the exception of the amino acids at positions 8, 15, 110 and 114. In one embodiment, said designed ankyrin repeat domain has an amino acid sequence which is identical to SEQ ID NO: 104, with the exception of the amino acids at positions 4, 8, 15, 17, 20, 23, 99, 100, 102, 110, 114, 115, 118, and 122. In one embodiment, said designed ankyrin repeat domain has an amino acid sequence which is identical to SEQ ID NO: 104, with the exception of the amino acids at positions 4, 8, 15, 17, 20, 23, 99, 100, 102, 110, 114, 115, 118, and 122, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 99 is T, said amino acid at position 100 is Q, said amino acid at position 102 is T, said amino acid at position 110 is R, said amino acid at position 114 is Q, said amino acid at position 115 is Q, said amino acid at position 118 is S, and said amino acid at position 122 is Q, and wherein X represents any amino acid. In one embodiment, said designed ankyrin repeat domain has an amino acid sequence which is identical to SEQ ID NO: 104, with the exception of the amino acids at positions 8, 15, 110 and 114, and wherein said amino acid at position 8 is Q, said amino acid at position 15 is L, said amino acid at position 110 is R, and said amino acid at position 114 is Q, and wherein X represents any amino acid. In one embodiment, said designed ankyrin repeat domain has an amino acid sequence which is identical to SEQ ID NO: 104, with the exception of the amino acids at positions 8, 15, and 114, and wherein said amino acid at position 8 is Q, said amino acid at position 15 is L, and said amino acid at position 114 is Q, and wherein X represents any amino acid. In one embodiment, said designed ankyrin repeat domain has an amino acid sequence which is identical to SEQ ID NO: 104, with the exception of the amino acids at positions 15 and 114, and wherein said amino acid at position 15 is L, and said amino acid at position 114 is Q, and wherein X represents any amino acid.

In one embodiment, the designed ankyrin repeat domain of the invention has an amino acid sequence which is identical to SEQ ID NO: 105, with the exception of the amino acids at positions 15 and 147. In one embodiment, said designed ankyrin repeat domain has an amino acid sequence which is identical to SEQ ID NO: 105, with the exception of the amino acids at positions 8, 15 and 147. In one embodiment, said designed ankyrin repeat domain has an amino acid sequence which is identical to SEQ ID NO: 105, with the exception of the amino acids at positions 8, 15, 143 and 147. In one embodiment, said designed ankyrin repeat domain has an amino acid sequence which is identical to SEQ ID NO: 105, with the exception of the amino acids at positions 4, 8, 15, 17, 20, 23, 132, 133, 135, 143, 147, 148, 151, and 155. In one embodiment, said designed ankyrin repeat domain has an amino acid sequence which is identical to SEQ ID NO: 105, with the exception of the amino acids at positions 4, 8, 15, 17, 20, 23, 132, 133, 135, 143, 147, 148, 151, and 155, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 132 is T, said amino acid at position 133 is Q, said amino acid at position 135 is T, said amino acid at position 143 is R, said amino acid at position 147 is Q, said amino acid at position 148 is Q, said amino acid at position 151 is S, and said amino acid at position 155 is Q, and wherein X represents any amino acid. In one embodiment, said designed ankyrin repeat domain has an amino acid sequence which is identical to SEQ ID NO: 105, with the exception of the amino acids at positions 8, 15, 143 and 147, and wherein said amino acid at position 8 is Q, said amino acid at position 15 is L, said amino acid at position 143 is R, and said amino acid at position 147 is Q, and wherein X represents any amino acid. In one embodiment, said designed ankyrin repeat domain is identical to SEQ ID NO: 105, with the exception of the amino acids at positions 8, 15 and 147 and wherein said amino acid at position 8 is Q, said amino acid at position 15 is L, and said amino acid at position 147 is Q, and wherein X represents any amino acid. In one embodiment, said designed ankyrin repeat domain is identical to SEQ ID NO: 105, with the exception of the amino acids at positions 15 and 147, and wherein said amino acid at position 15 is L, and said amino acid at position 147 is Q, and wherein X represents any amino acid.

In one embodiment, the designed ankyrin repeat domain of the invention has an amino acid sequence which is identical to SEQ ID NO: 103, with the exception of the amino acids at positions 15 and 81. In one embodiment, said designed ankyrin repeat domain has an amino acid sequence which is identical to SEQ ID NO: 103, with the exception of the amino acids at positions 8, 15 and 81. In one embodiment, said designed ankyrin repeat domain has an amino acid sequence which is identical to SEQ ID NO: 103, with the exception of the amino acids at positions 8, 15, 77 and 81. In one embodiment, said designed ankyrin repeat domain has an amino acid sequence which is identical to SEQ ID NO: 103, with the exception of the amino acids at positions 4, 8, 15, 17, 20, 23, 66, 67, 69, 77, 81, 82, 85, and 89. In one embodiment, said designed ankyrin repeat domain has an amino acid sequence which is identical to SEQ ID NO: 103, with the exception of the amino acids at positions 4, 8, 15, 17, 20, 23, 66, 67, 69, 77, 81, 82, 85, and 89, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 66 is T, said amino acid at position 67 is Q, said amino acid at position 69 is T, said amino acid at position 77 is R, said amino acid at position 81 is Q, said amino acid at position 82 is Q, said amino acid at position 85 is S, and said amino acid at position 89 is Q, and wherein X represents any amino acid. In one embodiment, said designed ankyrin repeat domain has an amino acid sequence which is identical to SEQ ID NO: 103, with the exception of the amino acids at positions 8, 15, 77 and 81, and wherein said amino acid at position 8 is Q, said amino acid at position 15 is L, said amino acid at position 77 is R, and said amino acid at position 81 is Q, and wherein X represents any amino acid. In one embodiment, said designed ankyrin repeat domain is identical to SEQ ID NO: 103, with the exception of the amino acids at positions 8, 15 and 81, and wherein said amino acid at position 8 is Q, said amino acid at position 15 is L, and said amino acid at position 81 is Q, and wherein X represents any amino acid. In one embodiment, said designed ankyrin repeat domain is identical to SEQ ID NO: 103, with the exception of the amino acids at positions 15 and 81, and wherein said amino acid at position 15 is L, and said amino acid at position 81 is Q, and wherein X represents any amino acid.

In one embodiment, the designed ankyrin repeat domain of the invention has an amino acid sequence which is identical to SEQ ID NO: 106, with the exception of the amino acids at positions 15 and 180. In one embodiment, said designed ankyrin repeat domain has an amino acid sequence which is identical to SEQ ID NO: 106, with the exception of the amino acids at positions 8, 15 and 180. In one embodiment, said designed ankyrin repeat domain has an amino acid sequence which is identical to SEQ ID NO: 106, with the exception of the amino acids at positions 8, 15, 176 and 180. In one embodiment, said designed ankyrin repeat domain has an amino acid sequence which is identical to SEQ ID NO: 106, with the exception of the amino acids at positions 4, 8, 15, 17, 20, 23, 165, 166, 168, 176, 180, 181, 184, and 188. In one embodiment, said designed ankyrin repeat domain has an amino acid sequence which is identical to SEQ ID NO: 106, with the exception of the amino acids at positions 4, 8, 15, 17, 20, 23, 165, 166, 168, 176, 180, 181, 184, and 188, and wherein said amino acid at position 4 is S, said amino acid at position 8 is Q, said amino acid at position 15 is L, said amino acid at position 17 is T, said amino acid at position 20 is T, said amino acid at position 23 is Q, said amino acid at position 165 is T, said amino acid at position 166 is Q, said amino acid at position 168 is T, said amino acid at position 176 is R, said amino acid at position 180 is Q, said amino acid at position 181 is Q, said amino acid at position 184 is S, and said amino acid at position 188 is Q, and wherein X represents any amino acid. In one embodiment, said designed ankyrin repeat domain has an amino acid sequence which is identical to SEQ ID NO: 106, with the exception of the amino acids at positions 8, 15, 176 and 180, and wherein said amino acid at position 8 is Q, said amino acid at position 15 is L, said amino acid at position 176 is R, and said amino acid at position 180 is Q, and wherein X represents any amino acid. In one embodiment, said designed ankyrin repeat domain is identical to SEQ ID NO: 106, with the exception of the amino acids at positions 8, 15 and 180, and wherein said amino acid at position 8 is Q, said amino acid at position 15 is L, and said amino acid at position 180 is Q, and wherein X represents any amino acid. In one embodiment, said designed ankyrin repeat domain is identical to SEQ ID NO: 106, with the exception of the amino acids at positions 15 and 180, and wherein said amino acid at position 15 is L, and said amino acid at position 180 is Q, and wherein X represents any amino acid.

In a further embodiment, the designed ankyrin repeat domain of the invention comprises an N-terminal capping module having the amino acid sequence $X_1X_2X_3X_4X_5X_6X_7X_8X_9X_{10}X_{11}X_{12}X_{13}LX_{14}X_{15}X_{16}X_{17}X_{18}X_{19}X_{20}X_{21}X_{22}GADVNA$ (SEQ ID NO: 81), wherein $X_1$ represents any amino acid, preferably D;
$X_2$ represents any amino acid, preferably L;
$X_3$ represents any amino acid, preferably G;
$X_4$ represents any amino acid, preferably K or S;
$X_5$ represents any amino acid, preferably K;
$X_6$ represents any amino acid, preferably L;
$X_7$ represents any amino acid, preferably L;
$X_8$ represents any amino acid, preferably A;
$X_9$ represents any amino acid, preferably A;
$X_{10}$ represents any amino acid, preferably R;
$X_{11}$ represents any amino acid, preferably A;
$X_{12}$ represents any amino acid, preferably G;
$X_{13}$ represents any amino acid, preferably Q;
$X_{14}$ represents any amino acid, preferably D;
$X_{15}$ represents any amino acid, preferably E or T;
$X_{16}$ represents any amino acid, preferably V;
$X_{17}$ represents any amino acid, preferably R;
$X_{18}$ represents any amino acid, preferably E or T;
$X_{19}$ represents any amino acid, preferably L;
$X_{20}$ represents any amino acid, preferably L;
$X_{21}$ represents any amino acid, preferably K or Q; and
$X_{22}$ represents any amino acid, preferably A.

In one embodiment, $X_4$ is S. In one embodiment, $X_{15}$ is T. In one embodiment, $X_{18}$ is T. In one embodiment, $X_{21}$ is Q. In one embodiment, $X_4$ is S, $X_{15}$ is T, $X_{18}$ is T, and $X_{21}$ is Q. In a preferred embodiment, $X_6$ is L, $X_7$ is L, $X_8$ is A, $X_9$ is A, and $X_{12}$ is G (SEQ ID NO: 80). In a more preferred embodiment, $X_1$ is D, $X_2$ is L, $X_3$ is G, $X_6$ is L, $X_7$ is L, $X_8$ is A, $X_9$ is A, $X_{12}$ is G, $X_{13}$ is Q, $X_{14}$ is D, $X_{16}$ is V, $X_{17}$ is R and $X_{19}$ is L (SEQ ID NO: 79). In an even more preferred embodiment $X_1$ is D, $X_2$ is L, $X_3$ is G, $X_5$ is K, $X_6$ is L, $X_7$ is L, $X_8$ is A, $X_9$ is A, $X_{12}$ is G, $X_{13}$ is Q, $X_{14}$ is D, $X_{16}$ is V, $X_{17}$ is R, $X_{19}$ is L, $X_{20}$ is L and $X_{22}$ is A (SEQ ID NO: 78). In another even more preferred embodiment $X_1$ is D, $X_2$ is L, $X_3$ is G, $X_5$ is K, $X_6$ is L, $X_7$ is L, $X_8$ is A, $X_9$ is A, $X_{12}$ is G, $X_{13}$ is Q, $X_{14}$ is D, $X_{15}$ is E, $X_{16}$ is V, $X_{17}$ is R, $X_{18}$ is E, $X_{19}$ is L, $X_{20}$ is L, $X_{21}$ is K and $X_{22}$ is A (SEQ ID NO: 77). In a most preferred embodiment, $X_1$ is D, $X_2$ is L, $X_3$ is G, $X_4$ is S, $X_5$ is K, $X_6$ is L, $X_7$ is L, $X_8$ is A, $X_9$ is A, $X_{10}$ is R, $X_{11}$ is A, $X_{12}$ is G, $X_{13}$ is Q, $X_{14}$ is D, $X_{15}$ is T, $X_{16}$ is V, $X_{17}$ is R, $X_{18}$ is T, $X_{19}$ is L, $X_{20}$ is L, $X_{21}$ is Q, and $X_{22}$ is A (SEQ ID NO: 76). In an alternative most preferred embodiment, $X_1$ is D, $X_2$ is L, $X_3$ is G, $X_4$ is K, $X_5$ is K, $X_6$ is L, $X_7$ is L, $X_8$ is A, $X_9$ is A, $X_{10}$ is R, $X_{11}$ is A, $X_{12}$ is G, $X_{13}$ is Q, $X_{14}$ is D, $X_{15}$ is E, $X_{16}$ is V, $X_{17}$ is R, $X_{18}$ is E, $X_{19}$ is L, $X_{20}$ is L, $X_{21}$ is K, and $X_{22}$ is A (SEQ ID NO: 75).

In a further embodiment, the designed ankyrin repeat domain of the invention comprises an N-terminal capping module comprising the amino acid sequence DLGX$_1$X$_2$LLQAAX$_3$X$_4$GQLDX$_5$VRX$_6$LX$_7$X$_8$X$_9$ (SEQ ID NO: 111), wherein $X_1$ represents any amino acid, preferably K or S;
$X_2$ represents any amino acid, preferably K;
$X_3$ represents any amino acid, preferably R;
$X_4$ represents any amino acid, preferably A;
$X_5$ represents any amino acid, preferably E or T;
$X_6$ represents any amino acid, preferably E or T;
$X_7$ represents any amino acid, preferably L;
$X_8$ represents any amino acid, preferably K or Q; and
$X_9$ represents any amino acid, preferably A.

In one embodiment, $X_1$ is S. In one embodiment, $X_5$ is T. In one embodiment, $X_6$ is T. In one embodiment, $X_8$ is Q. In one embodiment, $X_1$ is S, $X_5$ is T, $X_6$ is T, and $X_8$ is Q. In a preferred embodiment, $X_2$ is K, $X_7$ is L, and $X_9$ is A (SEQ ID NO: 110). In a more preferred embodiment, $X_2$ is K, $X_5$ is E, $X_6$ is E, $X_7$ is L, and $X_9$ is A (SEQ ID NO: 109). In a most preferred embodiment $X_1$ is S, $X_2$ is K, $X_3$ is R, $X_4$ is A, $X_5$ is T, $X_6$ is T, $X_7$ is L, $X_8$ is Q, and $X_9$ is A (SEQ ID NO: 108). In an alternative most preferred embodiment, $X_1$ is K, $X_2$ is K, $X_3$ is R, $X_4$ is A, $X_5$ is E, $X_6$ is E, $X_7$ is L, $X_8$ is K, and $X_9$ is A (SEQ ID NO: 107).

In a further embodiment, the designed ankyrin repeat domain of the invention comprises a C-terminal capping module having the amino acid sequence $X_1DX_2X_3GX_4TPX_5X_6X_7X_8X_9RX_{10}X_{11}X_{12}QX_{13}X_{14}X_{15}X_{16}X_{17}X_{18}X_{19}X_{20}X_{21}X_{22}$, wherein $X_1$ represents any amino acid, preferably Q;
$X_2$ represents any amino acid, preferably K or T;
$X_3$ represents any amino acid, preferably S or Q;
$X_4$ represents any amino acid, preferably K or T;
$X_5$ represents any amino acid, preferably A;
$X_6$ represents any amino acid, preferably D;
$X_7$ represents any amino acid, preferably L;
$X_8$ represents any amino acid, preferably A;
$X_9$ represents any amino acid, preferably A;
$X_{10}$ represents any amino acid, preferably A;
$X_{11}$ represents any amino acid, preferably G;
$X_{12}$ represents any amino acid, preferably H;
$X_{13}$ represents any amino acid, preferably D or Q;
$X_{14}$ represents any amino acid, preferably I;
$X_{15}$ represents any amino acid, preferably A;
$X_{16}$ represents any amino acid, preferably E or S;
$X_{17}$ represents any amino acid, preferably V;
$X_{18}$ represents any amino acid, preferably L;
$X_{19}$ represents any amino acid, preferably Q;
$X_{20}$ represents any amino acid, preferably K or Q;
$X_{21}$ represents any amino acid, preferably A; and
$X_{22}$ represents any amino acid, preferably A.

In one embodiment, $X_2$ is T. In one embodiment, $X_3$ is Q. In one embodiment, $X_4$ is T. In one embodiment, $X_{13}$ is Q. In one embodiment, $X_{16}$ is S. In one embodiment, $X_{20}$ is Q. In one embodiment, $X_2$ is T, $X_3$ is Q, $X_4$ is T, $X_{13}$ is Q, $X_{16}$ is S, and $X_{20}$ is Q. In a preferred embodiment, $X_{21}$ is A and $X_{22}$ is A (SEQ ID NO: 94). In another preferred embodiment, $X_9$ is A (SEQ ID NO: 93). In a more preferred embodiment, $X_8$ is A, $X_9$ is A, $X_{11}$ is G, $X_{21}$ is A and $X_{22}$ is A (SEQ ID NO: 92). In an even more preferred embodiment $X_5$ is A, $X_6$ is D, $X_8$ is A, $X_9$ is A, $X_{11}$ is G, $X_{12}$ is H, $X_{14}$ is I, $X_{15}$ is A, $X_{17}$ is V, $X_{18}$ is L, $X_{19}$ is Q, $X_{21}$ is A and $X_{22}$ is A (SEQ ID NO: 91). In another even more preferred embodiment $X_5$ is A, $X_6$ is D, $X_8$ is A, $X_9$ is A, $X_{11}$ is G, $X_{12}$ is H, $X_{13}$ is D, $X_{14}$ is I, $X_{15}$ is A, $X_{16}$ is E, $X_{17}$ is V, $X_{18}$ is L, $X_{19}$ is Q, $X_{20}$ is K, $X_{21}$ is A and $X_{22}$ is A (SEQ ID NO: 90). In a most preferred embodiment, $X_1$ is Q, $X_2$ is T, $X_3$ is Q, $X_4$ is T, $X_5$ is A, $X_6$ is D, $X_7$ is L, $X_8$ is A, $X_9$ is A, $X_{10}$ is A, $X_{11}$ is G, $X_{12}$ is H, $X_{13}$ is Q, $X_{14}$ is I, $X_{15}$ is A, $X_{16}$ is S, $X_{17}$ is V, $X_{18}$ is L, $X_{19}$ is Q, $X_{20}$ is Q, $X_{21}$ is A and $X_{22}$ is A (SEQ ID NO: 89). In an alternative most preferred embodiment, $X_1$ is Q, $X_2$ is K, $X_3$ is S, $X_4$ is K, $X_5$ is A, $X_6$ is D, $X_7$ is L, $X_8$ is A, $X_9$ is A, $X_{10}$ is A, $X_{11}$ is G, $X_{12}$ is H, $X_{13}$ is D, $X_{14}$ is I, $X_{15}$ is A, $X_{16}$ is E, $X_{17}$ is V, $X_{18}$ is L, $X_{19}$ is Q, $X_{20}$ is K, $X_{21}$ is A and $X_{22}$ is A (SEQ ID NO: 88).

The designed ankyrin repeat domains consisting of SEQ ID NOs: 10, 11, 13, 14, 15, 17, 18, 19, 21, 22, and 23 are examples of such designed ankyrin repeat domains of the invention.

In a second aspect, the invention provides a protein comprising one or more designed ankyrin repeat domains of the invention. In a preferred embodiment, said protein is a recombinant binding protein. In one embodiment, said protein comprises one, two, three, four or five designed ankyrin repeat domains of the invention. In the context of the present invention, when the protein of the invention comprises more than one designed ankyrin repeat domain of the invention, each of said designed ankyrin repeat domains may be independently selected among any one of the designed ankyrin repeat domains of the invention described herein. In one embodiment, said protein further comprises at least one moiety for half-life extension. In one preferred embodiment, said moiety for half-life extension is a designed ankyrin repeat domain with binding specificity for serum albumin.

In one embodiment, said protein further comprises one, two or three designed ankyrin repeat domains with binding specificity for serum albumin. In the context of the present invention, when the protein of the invention comprises more than one designed ankyrin repeat domains with binding specificity for serum albumin, each of said designed ankyrin repeat domains may be independently selected among any one of the designed ankyrin repeat domains with binding specificity for serum albumin described herein.

In one embodiment, said protein comprises (i) at least one designed ankyrin repeat domain of the invention, and (ii) at least one moiety for half-life extension. Such moieties for half-life extension are well-known in the art and comprise, amongst others, polyethylene-glycol (PEG), serum albumin-binding polypeptides, serum albumin-binding proteins, serum albumin, and immunoglobulin Fc fragments. In one preferred embodiment, a moiety for half-life extension is a designed ankyrin repeat domain with binding specificity for serum albumin.

In one embodiment, said protein comprises (i) at least one designed ankyrin repeat domain of the invention, and (ii) at least one designed ankyrin repeat domain with binding specificity for serum albumin.

In one embodiment, said protein comprises (i) at least one designed ankyrin repeat domain of the invention, and (ii) at least one designed ankyrin repeat domain with binding specificity for serum albumin, wherein said designed ankyrin repeat domain with binding specificity for serum albumin comprises an amino acid sequence with at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 80% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 85% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 90% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 92% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 94% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 96% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence with at least 98% amino acid sequence identity with any one of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin comprises an amino acid sequence consisting of anyone of SEQ ID NOs: 4 to 8, preferably SEQ ID NOs: 4 to 7, more preferably SEQ ID NOs: 4 to 6. In one embodiment, said designed ankyrin repeat domain with binding specificity for serum albumin does not comprise an amino acid sequence selected from the group consisting of SEQ ID NOs: 75 to 81, and 88 to 94, wherein X represents any amino acid.

In one embodiment, said protein further comprises at least one peptide linker. In one particular embodiment, the protein of the invention comprises (i) at least one designed ankyrin repeat domain of the invention, (ii) at least one designed ankyrin repeat domain with binding specificity for serum albumin as described herein, and (iii) at least one peptide linker. In one embodiment, said peptide linker is a proline-threonine rich peptide linker or a glycine-serine rich peptide linker. In one embodiment, said peptide linker is a proline-threonine rich peptide linker. In one embodiment, said peptide linker is a glycine-serine rich peptide linker.

In one preferred embodiment, said peptide linker has the amino acid sequence of SEQ ID NO: 2 or 3. In one embodiment, said peptide linker has the amino acid sequence of SEQ ID NO: 2. In one embodiment, said peptide linker has the amino acid sequence of SEQ ID NO: 3.

The proteins consisting of SEQ ID NOs: 25, 26, 28, 29, 30, 32, 33, 34, 36, 37, 38, 40, 41, 43, 44, 45, 47, 48, 49, 51, 52, 53, 55, 56, 58, 59, 60, 62, 63, 64, 66, 67, and 68 are examples of such proteins of the invention.

In one embodiment, said protein comprises at least two designed ankyrin repeat domains of the invention. In one embodiment, said protein comprises (i) at least two designed ankyrin repeat domains of the invention, and (ii) at least one designed ankyrin repeat domain with binding specificity for serum albumin. In a preferred embodiment, said protein comprises (i) at least two designed ankyrin repeat domains of the invention, and (ii) at least one designed ankyrin repeat domain with binding specificity for serum albumin as described herein. In a preferred embodiment, said protein comprises (i) at least two designed ankyrin repeat domains of the invention, and (ii) at least one designed ankyrin repeat domain with binding specificity for serum albumin, wherein said designed ankyrin repeat domain with binding specificity for serum albumin has an amino acid sequence with at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with any one of SEQ ID NOs: 4 to 8, more preferably 4 to 6. In one embodiment, said protein comprises (i) at least two designed ankyrin repeat domains of the invention, and (ii) at least two designed ankyrin repeat domains with binding specificity for serum albumin. In a preferred embodiment, said recombinant binding protein comprises (i) at least two designed ankyrin repeat domains of the invention, and (ii) at least two designed ankyrin repeat domains with binding specificity for serum albumin as described herein. In a preferred embodiment, said recombinant binding protein comprises (i) at least two designed ankyrin repeat domains of the invention, and (ii) at least two designed ankyrin repeat domains with binding specificity for serum albumin, wherein each of said designed ankyrin repeat domains with binding specificity for serum albumin independently has an amino acid sequence with at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with any one of SEQ ID NOs: 4 to 8, more preferably 4 to 6. In one preferred embodiment, the protein of the invention is a recombinant binding protein.

The designed ankyrin repeat domain provided by the present invention and described herein comprises sequence modifications that lead to improved pharmacokinetic properties of said designed ankyrin repeat domain compared to the designed ankyrin repeat domain not comprising said sequence modifications. Moreover, said sequences modifications lead to improved pharmacokinetic properties of a protein comprising said designed ankyrin repeat domain, compared to a comparator protein which comprises the designed ankyrin repeat domain not comprising said sequence modifications and which is otherwise identical to said protein. The designed ankyrin repeat domains consisting of SEQ ID NOs: 10, 11, 13, 14, 15, 17, 18, 19, 21, 22, and 23 are examples of such designed ankyrin repeat domains with improved pharmacokinetic properties. The proteins consisting of SEQ ID NOs: 25, 26, 28, 29, 30, 32, 33, 34, 36, 37, 38, 40, 41, 43, 44, 45, 47, 48, 49, 51, 52, 53, 55, 56, 58, 59, 60, 62, 63, 64, 66, 67, and 68 are examples of proteins comprising such designed ankyrin repeat domains with improved pharmacokinetic properties.

The designed ankyrin repeat domains consisting of SEQ ID NOs: 10 and 11 are examples of designed ankyrin repeat domains comprising such sequence modifications (compared to the designed ankyrin repeat domain consisting of SEQ ID NO: 9, which does not comprise such sequence modifications), which exhibit improved pharmacokinetic properties, as shown by the pharmacokinetic profiles of Proteins #25 and #26 (comprising SEQ ID NOs: 10 and 11, respectively) in comparison to Protein #24 (comprising SEQ ID NO: 9). Likewise, the designed ankyrin repeat domains consisting of SEQ ID NOs: 13 to 15 are examples of designed ankyrin repeat domains comprising such sequence modifications (compared to the designed ankyrin repeat domain consisting of SEQ ID NO: 12, which does not comprise such sequence modifications), which exhibit improved pharmacokinetic properties, as shown by the pharmacokinetic profiles of Proteins #28, #29 and #30 (comprising SEQ ID NOs: 13, 14 and 15, respectively) in comparison to Protein #27 (comprising SEQ ID NO: 12). Likewise, the designed ankyrin repeat domains consisting of SEQ ID NOs: 17 to 19 are examples of designed ankyrin repeat domains comprising such sequence modifications (compared to the designed ankyrin repeat domain consisting of SEQ ID NO: 16, which does not comprise such sequence modifications), which exhibit improved pharmacokinetic properties, as shown by the pharmacokinetic profiles of Proteins #32, #33 and #34 (comprising SEQ ID NOs: 17, 18 and 19, respectively) in comparison to Protein #31 (comprising SEQ ID NO: 16). Likewise, the designed ankyrin repeat domains consisting of SEQ ID NOs: 21 to 23 are examples of designed ankyrin repeat domains comprising such sequence modifications (compared to the designed ankyrin repeat domain consisting of SEQ ID NO: 20, which does not comprise such sequence modifications), which exhibit improved pharmacokinetic properties, as shown by the pharmacokinetic profiles of Proteins #36, #37 and #38 (comprising SEQ ID NOs: 21, 22 and 23, respectively) in comparison to Protein #35 (comprising SEQ ID NO: 20). These examples are described in detail in the Examples.

In one embodiment, the term improved pharmacokinetic properties refers to an increased area under the curve, a reduced clearance, or an increased terminal half-life.

In one embodiment, the term improved pharmacokinetic properties refers to an increased area under the curve. In one embodiment, said increase in area under the curve is at least 5%, 10%, 15%, 20%, 25%, 30%, 35%, 40%, 45%, 50%, 55%, 60%, 65%, 70%, 75%, 80%, most preferably 85%.

In one embodiment, the term improved pharmacokinetic properties refers to a reduced clearance. In one embodiment, said reduction in clearance is at least 5%, 10%, 15%, 20%, 25%, 30%, 35%, 40%, most preferably 45%.

In one embodiment, the term improved pharmacokinetic properties refers to an increased terminal half-life. In one embodiment, said increase in terminal half-life is at least 5%, 10%, 15%, 20%, 25%, 30%, 35%, 40%, 45%, 50%, 55%, 60%, 65%, 70%, 75%, 80%, most preferably 85%.

In one embodiment the pharmacokinetic parameters are determined in mouse. Preferably, said pharmacokinetic parameters in mouse are determined by applying a protein at a dose of 1 mg/kg by intravenous injection into the tail vein of Balb/c mice. This procedure is described in Example 6.

In one embodiment the pharmacokinetic parameters are determined in cynomolgus monkey. Preferably, said pharmacokinetic parameters in cynomolgus monkey are determined by applying a protein at a dose of 1 mg/kg by 30 min intravenous injection. This procedure is described in Example 7.

In one embodiment, the pharmacokinetic properties of a designed ankyrin repeat domain of the invention are assessed by measuring the pharmacokinetic properties of a protein comprising (i) said designed ankyrin repeat domain of the invention, and (ii) a moiety for half-life extension, and by comparing the pharmacokinetic properties of said protein with a comparator protein as described herein. Preferably, said moiety for half-life extension is a designed ankyrin repeat domain with binding specificity for serum albumin. Proteins #25, #26, #28, #29, #30, #32, #33, #34, #36, #37, #38, #40, #41, #43, #44, #45, #47, #48, #49, #51, #52, #53, #55, #56, #58, #59, #60, #62, #63, #64, #66, #67, and #68 are examples of such proteins. Proteins #24, #27, #31, #35, #39, #42, #46, #46, #50, #54, #57, #61, and #65 are examples of such comparator proteins. Examples of designed ankyrin repeat domains with binding specificity for serum albumin are the designed ankyrin repeat domains consisting of SEQ ID NOs: 4 to 8. In one embodiment, the designed ankyrin repeat domain with binding specificity for serum albumin is N-terminal of the designed ankyrin repeat domain of the invention. In one embodiment, said improved pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of an amino acid sequence with at least 80% amino acid sequence identify with any of SEQ ID NOs: 4 to 8, preferably 4 to 6, more preferably 4, and by comparing the pharmacokinetic properties of said protein with a comparator protein as described herein.

In one embodiment, said pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of the amino acid sequence of SEQ ID NO: 4 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% amino acid sequence identify with SEQ ID NO: 4, and by comparing the pharmacokinetic properties of said protein with a comparator protein as described herein. In one embodiment, said pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of the amino acid sequence of SEQ ID NO: 4 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% amino acid sequence identify with SEQ ID NO: 4, and (iii) a polypeptide linker consisting of the amino acid sequence of SEQ ID NO: 3, and by comparing the pharmacokinetic properties of said protein with a comparator protein as described herein. In one embodiment, said pharmacokinetic properties are assessed by measuring the pharmacokinetic properties of a protein comprising from N-terminus to C-terminus (i) SEQ ID NO: 4, (ii) SEQ ID NO: 3, and (iii) a designed ankyrin repeat domain of the invention, and by comparing the pharmacokinetic properties of said protein with a comparator protein as described herein.

In one embodiment, said pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of the amino acid sequence of SEQ ID NO: 5 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% amino acid sequence identify with SEQ ID NO: 5, and by comparing the pharmacokinetic properties of said protein with a comparator protein as described herein. In one embodiment, said pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of the amino acid sequence of SEQ ID NO: 5 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% amino acid sequence identify with SEQ ID NO: 5, and (iii) a polypeptide linker consisting of the amino acid sequence of SEQ ID NO: 3, and by comparing the pharmacokinetic properties of said protein with a comparator protein as described herein. In one embodiment, said pharmacokinetic properties are assessed by measuring the pharmacokinetic properties of a protein comprising from N to C terminus (i) SEQ ID NO: 5, (ii) SEQ ID NO: 3, (iii) a designed ankyrin repeat domain of the invention.

In one embodiment, said pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of the amino acid sequence of SEQ ID NO: 6 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% amino acid sequence identify with SEQ ID NO: 6, and by comparing the pharmacokinetic properties of said protein with a comparator protein as described herein. In one embodiment, said pharmacokinetic properties are assessed by measuring the pharmacokinetic properties of a protein comprising (i) a designed ankyrin repeat domain of the invention, and (ii) a designed ankyrin repeat domain with binding specificity for serum albumin, wherein said designed ankyrin repeat domain with binding specificity for serum albumin consists of the amino acid sequence of SEQ ID NO: 6 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% amino acid sequence identify with SEQ ID NO: 6, and (iii) a polypeptide linker consisting of the amino acid sequence of SEQ ID NO: 3, and by comparing the pharmacokinetic properties of said protein with a comparator protein as described herein. In one embodiment, said pharmacokinetic properties are assessed by measuring the pharmacokinetic properties of a protein comprising from N to C terminus (i) SEQ ID NO: 6, (ii) SEQ ID NO: 3, (iii) a designed ankyrin repeat domain of the invention.

In a further embodiment, the designed ankyrin repeat domain of the invention, exhibits improved pharmacokinetic properties compared to a comparator designed ankyrin repeat domain,
  wherein said designed ankyrin repeat domain and said comparator designed ankyrin repeat domain have the identical amino acid sequence with the exception that said designed ankyrin repeat domain comprises (i) in the N-terminal capping module the amino acid Q at position 8 and the amino acid L at position 15, and (ii) in the C-terminal capping module the amino acid R at position 14 and the amino acid Q at position 18, and said comparator designed ankyrin repeat domain comprises (i) in the N-terminal capping module amino acids different from Q at position 8 and D at position 15, and (ii) in the C-terminal capping module amino acids different from R at position 14 and E at position 18,
  wherein said position numbers of positions of the N-terminal capping module are determined by alignment to SEQ ID NO: 69 using the position numbers of SEQ ID NO: 69, wherein said position numbers of positions of the C-terminal capping module are determined by alignment to SEQ ID NO: 82 using the position numbers of SEQ ID NO: 82, and wherein said alignment comprises no amino acid gaps, and
  wherein said pharmacokinetic properties are assessed by measuring the pharmacokinetic properties of a protein and a comparator protein,
    wherein said protein from N to C terminus consists of (i) a designed ankyrin repeat domain with binding specificity for serum albumin selected from the group consisting of SEQ ID NOs: 4 to 8, (ii) a polypeptide linker selected from the group consisting of SEQ ID NOs: 2 to 3, and (iii) said designed ankyrin repeat domain, and
    wherein said comparator protein from N to C terminus consists of (i) a designed ankyrin repeat domain with binding specificity for serum albumin selected from the group consisting of SEQ ID NOs: 4 to 8, (ii) a polypeptide linker selected from the group consisting of SEQ ID NOs: 2 to 3, and (iii) said comparator designed ankyrin repeat domain, and
    wherein the amino acid sequences of said designed ankyrin repeat domains with binding specificity for serum albumin of said protein and said comparator protein are identical, and wherein the amino acid sequences of said polypeptide linkers of said protein and said comparator protein are identical.

In one embodiment, the designed ankyrin repeat domain of the invention exhibits improved pharmacokinetic properties compared to a comparator designed ankyrin repeat domain,
  wherein said designed ankyrin repeat domain and said comparator designed ankyrin repeat domain have the identical amino acid sequence with the exception that said designed ankyrin repeat domain comprises (i) in the N-terminal capping module the amino acid Q at position 8 and the amino acid L at position 15, and (ii) in the C-terminal capping module the amino acid R at position 14 and the amino acid Q at position 18, and said comparator designed ankyrin repeat domain comprises (i) in the N-terminal capping module the amino acid E at position 8 and the amino acid D at position 15, and (ii) in the C-terminal capping module the amino acid D at position 14 and the amino acid E at position 18,
  wherein said position numbers of positions of the N-terminal capping module are determined by alignment to SEQ ID NO: 69 using the position numbers of SEQ ID NO: 69, wherein said position numbers of positions of the C-terminal capping module are determined by alignment to SEQ ID NO: 82 using the position numbers of SEQ ID NO: 82, and wherein said alignment comprises no amino acid gaps, and
  wherein said pharmacokinetic properties are assessed by measuring the pharmacokinetic properties of a protein and a comparator protein,
    wherein said protein from N to C terminus consists of (i) a designed ankyrin repeat domain with binding specificity for serum albumin selected from the group consisting of SEQ ID NOs: 4 to 8, (ii) a polypeptide linker selected from the group consisting of SEQ ID NOs: 2 to 3, and (iii) said designed ankyrin repeat domain, and
    wherein said comparator protein from N to C terminus consists of (i) a designed ankyrin repeat domain with binding specificity for serum albumin selected from the group consisting of SEQ ID NOs: 4 to 8, (ii) a polypeptide linker selected from the group consisting of SEQ ID NOs: 2 to 3, and (iii) said comparator designed ankyrin repeat domain, and
    wherein the amino acid sequences of said designed ankyrin repeat domains with binding specificity for serum albumin of said protein and said comparator protein are identical, and wherein the amino acid sequences of said polypeptide linkers of said protein and said comparator protein are identical.

In one embodiment, the protein of the invention comprises at least a first moiety and a second moiety,
  wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that the designed ankyrin repeat domain of said comparator protein corresponding to said first moiety has (i) in the N-terminal capping module the amino acid E at position 8 and the amino acid D at position 15, and (ii) in the C-terminal capping module the amino acid D at position 14 and the amino acid E at position 18, wherein said position numbers of positions of the N-terminal capping module are determined by alignment to SEQ ID NO: 69 using the position numbers of SEQ ID NO: 69, wherein said position numbers of positions of the C-terminal capping module are determined by alignment to SEQ ID NO: 82 using the position numbers of SEQ ID NO: 82, and wherein said alignment comprises no amino acid gaps.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and wherein said protein exhibits improved pharmacokinetic properties compared to a comparator protein, wherein said comparator protein consists of an identical amino acid sequence as said protein, with the exception that the designed ankyrin repeat domain of said comparator protein corresponding to said first moiety has (i) in the N-terminal capping module the amino acid E at position 8 and the amino acid D at position 15, and (ii) in the C-terminal capping module the amino acid D at position 14 and the amino acid E at position 18, wherein said position numbers of positions of the N-terminal capping module are determined by alignment to SEQ ID NO: 69 using the position numbers of SEQ ID NO: 69, wherein said position numbers of positions of the C-terminal capping module are determined by alignment to SEQ ID NO: 82 using the position numbers of SEQ ID NO: 82, and wherein said alignment comprises no amino acid gaps.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and wherein said protein exhibits improved pharmacokinetic properties compared to a comparator protein, wherein said comparator protein consists of an identical amino acid sequence as said protein, with the exception that the designed ankyrin repeat domain of said comparator protein corresponding to said first moiety has (i) in the N-terminal capping module the amino acid E at position 8 and the amino acid D at position 15, and (ii) in the C-terminal capping module the amino acid D at position 14 and the amino acid E at position 18, wherein said position numbers of positions of the N-terminal capping module are determined by alignment to SEQ ID NO: 69 using the position numbers of SEQ ID NO: 69, wherein said position numbers of positions of the C-terminal capping module are determined by alignment to SEQ ID NO: 82 using the position numbers of SEQ ID NO: 82, and wherein said alignment comprises no amino acid gaps.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with any one of SEQ ID NOs: 4 to 8, and wherein said protein exhibits improved pharmacokinetic properties compared to a comparator protein, wherein said comparator protein consists of an identical amino acid sequence as said protein, with the exception that said designed ankyrin repeat domain of said first moiety comprises (i) any one of SEQ ID NOs: 75 to 81 and 107 to 111, preferably SEQ ID NOs: 75 to 80 and 107 to 111, more preferably SEQ ID NOs: 75 to 79 and 107 to 111, more preferably SEQ ID NOs: 75 to 78 and 107 to 110, more preferably SEQ ID NOs: 75 to 77 and 107 to 109, more preferably SEQ ID NOs: 75 to 76 and 107 to 108, more preferably SEQ ID NOs: 75 and 107, and (ii) any one of SEQ ID NOs: 88 or 94, preferably SEQ ID NOs: 88 to 93, more preferably SEQ ID NOs: 88 to 92, more preferably SEQ ID NOs: 88 to 91, more preferably SEQ ID NOs: 88 to 90, more preferably SEQ ID NOs: 88 to 89, more preferably SEQ ID NO: 88, whereas the designed ankyrin repeat domain of said comparator protein corresponding to said first moiety comprises SEQ ID NO: 69 instead of any one of SEQ ID NOs: 75 to 81 and 107 to 111 and SEQ ID NO: 82 instead of any one of SEQ ID NOs: 88 to 94.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises (i) any one of SEQ ID NOs: 75 to 81 and 107 to 111, preferably SEQ ID NOs: 75 to 80 and 107 to 111, more preferably SEQ ID NOs: 75 to 79 and 107 to 111, more preferably SEQ ID NOs: 75 to 78 and 107 to 110, more preferably SEQ ID NOs: 75 to 77 and 107 to 109, more preferably SEQ ID NOs: 75 to 76 and 107 to 108, more preferably SEQ ID NO: 75 and 107, and (ii) any one of SEQ ID NOs: 88 or 94, preferably SEQ ID NOs: 88 to 93, more preferably SEQ ID NOs: 88 to 92, more preferably SEQ ID NOs: 88 to 91, more preferably SEQ ID NOs: 88 to 90, more preferably SEQ ID NOs: 88 to 89, more preferably SEQ ID NO: 88, whereas the designed ankyrin repeat domain of said comparator protein corresponding to said first moiety comprises SEQ ID NO: 69 instead of any one of SEQ ID NOs: 75 to 81 and SEQ ID NO: 82 instead of any one of SEQ ID NOs: 88 to 94.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises (i) any one of SEQ ID NOs: 75 to 81 and 107 to 111, preferably SEQ ID NOs: 75 to 80 and 107 to 111, more preferably SEQ ID NOs: 75 to 79 and 107 to 111, more preferably SEQ ID NOs: 75 to 78 and 107 to 110, more preferably SEQ ID NOs: 75 to 77 and 107 to 109, more preferably SEQ ID NOs: 75 to 76 and 107 to 108, more preferably SEQ ID NO: 75 and 107, and (ii) any one of SEQ ID NOs: 88 or 94, preferably SEQ ID NOs: 88 to 93, more preferably SEQ ID NOs: 88 to 92, more preferably SEQ ID NOs: 88 to 91, more preferably SEQ ID NOs: 88 to 90, more preferably SEQ ID NOs: 88 to 89, more preferably SEQ ID NO: 88, whereas the designed ankyrin repeat domain of said comparator protein corresponding to said first moiety comprises SEQ ID NO: 69 instead of any one of SEQ ID NOs: 75 to 81 and SEQ ID NO: 82 instead of any one of SEQ ID NOs: 88 to 94.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises (i) any one of SEQ ID NOs: 75 to 81 and 107 to 111, preferably SEQ ID NOs: 75 to 80 and 107 to 111, more preferably SEQ ID NOs: 75 to 79 and 107 to 111, more preferably SEQ ID NOs: 75 to 78 and 107 to 110, more preferably SEQ ID NOs: 75 to 77 and 107 to 109, more preferably SEQ ID NOs: 75 to 76 and 107 to 108, more preferably SEQ ID NO: 75 and 107, and (ii) any one of SEQ ID NOs: 88 or 94, preferably SEQ ID NOs: 88 to 93, more preferably SEQ ID NOs: 88 to 92, more preferably SEQ ID NOs: 88 to 91, more preferably SEQ ID NOs: 88 to 90, more preferably SEQ ID NOs: 88 to 89, more preferably SEQ ID NO: 88, whereas the designed ankyrin repeat domain of said comparator protein corresponding to said first moiety comprises SEQ ID NO: 69 instead of any one of SEQ ID NOs: 75 to 81 and SEQ ID NO: 82 instead of any one of SEQ ID NOs: 88 to 94.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NOs: 75 or 76, preferably SEQ ID NO: 75, and SEQ ID NOs: 88 or 89, preferably SEQ ID NO: 88, whereas the designed ankyrin repeat domain of said comparator protein corresponding to said first moiety comprises SEQ ID NO: 69 instead of SEQ ID NO: 75 or 76 and SEQ ID NO: 82 instead of SEQ ID NO: 88 or 89.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NOs: 75 or 76, preferably SEQ ID NO: 75, and SEQ ID NOs: 88 or 89, preferably SEQ ID NO: 88, whereas the designed ankyrin repeat domain of said comparator protein corresponding to said first moiety comprises SEQ ID NO: 69 instead of SEQ ID NO: 75 or 76 and SEQ ID NO: 82 instead of SEQ ID NO: 88 or 89.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and wherein said protein exhibits improved pharmacokinetic properties compared to a comparator protein, wherein said comparator protein consists of an identical amino acid sequence as said protein, with the exception that said designed ankyrin repeat domain of said first moiety comprises SEQ ID NOs: 75 or 76, preferably SEQ ID NO: 75, and SEQ ID NOs: 88 or 89, preferably SEQ ID NO: 88, whereas the designed ankyrin repeat domain of said comparator protein corresponding to said first moiety comprises SEQ ID NO: 69 instead of SEQ ID NO: 75 or 76 and SEQ ID NO: 82 instead of SEQ ID NO: 88 or 89.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 81 and any one of SEQ ID NOs: 88 to 94, whereas the designed ankyrin repeat domain of said comparator protein corresponding to said first moiety comprises SEQ ID NO: 69 instead of any one of SEQ ID NOs: 75 to 81 and SEQ ID NO: 82 instead of any one of SEQ ID NOs: 88 to 94.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 80 and any one of SEQ ID NOs: 88 to 93, whereas the designed ankyrin repeat domain of said comparator protein corresponding to said first moiety comprises SEQ ID NO: 69 instead of any one of SEQ ID NOs: 75 to 80 and SEQ ID NO: 82 instead of any one of SEQ ID NOs: 88 to 93.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 79 and any one of SEQ ID NOs: 88 to 92, whereas the designed ankyrin repeat domain of said comparator protein corresponding to said first moiety comprises SEQ ID NO: 69 instead of any one of SEQ ID NOs: 75 to 79 and SEQ ID NO: 82 instead of any one of SEQ ID NOs: 88 to 92.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 78 and any one of SEQ ID NOs: 88 to 91, whereas the designed ankyrin repeat domain of said comparator protein corresponding to said first moiety comprises SEQ ID NO: 69 instead of any one of SEQ ID NOs: 75 to 78 and SEQ ID NO: 82 instead of any one of SEQ ID NOs: 88 to 91.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 77 and any one of SEQ ID NOs: 88 to 90, whereas the designed ankyrin repeat domain of said comparator protein corresponding to said first moiety comprises SEQ ID NO: 69 instead of any one of SEQ ID NOs: 75 to 77 and SEQ ID NO: 82 instead of any one of SEQ ID NOs: 88 to 90.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 76 and any one of SEQ ID NOs: 88 to 89, whereas the designed ankyrin repeat domain of said comparator protein corresponding to said first moiety comprises SEQ ID NO: 69 instead of any one of SEQ ID NOs: 75 to 76 and SEQ ID NO: 82 instead of any one of SEQ ID NOs: 88 to 89.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 81 and any one of SEQ ID NOs: 88 to 94, whereas the designed ankyrin repeat domain of said comparator protein corresponding to said first moiety comprises SEQ ID NO: 69 instead of any one of SEQ ID NOs: 75 to 81 and SEQ ID NO: 82 instead of any one of SEQ ID NOs: 88 to 94.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 80 and any one of SEQ ID NOs: 88 to 93, whereas the designed ankyrin repeat domain of said comparator protein corresponding to said first moiety comprises SEQ ID NO: 69 instead of any one of SEQ ID NOs: 75 to 80 and SEQ ID NO: 82 instead of any one of SEQ ID NOs: 88 to 93.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 79 and any one of SEQ ID NOs: 88 to 92, whereas the designed ankyrin repeat domain of said comparator protein corresponding to said first moiety comprises SEQ ID NO: 69 instead of any one of SEQ ID NOs: 75 to 79 and SEQ ID NO: 82 instead of any one of SEQ ID NOs: 88 to 92.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 78 and any one of SEQ ID NOs: 88 to 91, whereas the designed ankyrin repeat domain of said comparator protein corresponding to said first moiety comprises SEQ ID NO: 69 instead of any one of SEQ ID NOs: 75 to 78 and SEQ ID NO: 82 instead of any one of SEQ ID NOs: 88 to 91.

In one embodiment, the protein of the invention comprises at least a first moiety and a second moiety, wherein said first moiety is a designed ankyrin repeat domain of the present invention, and wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and wherein said protein exhibits improved pharmacokinetic properties compared to a comparator protein, wherein said comparator protein consists of an identical amino acid sequence as said protein, with the exception that said designed ankyrin repeat domain of said first moiety comprises any one of SEQ ID NOs: 75 to 77 and any one of SEQ ID NOs: 88 to 90, whereas the designed ankyrin repeat domain of said comparator protein corresponding to said first moiety comprises SEQ ID NO: 69 instead of any one of SEQ ID NOs: 75 to 77 and SEQ ID NO: 82 instead of any one of SEQ ID NOs: 88 to 90.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 76 and any one of SEQ ID NOs: 88 to 89, whereas the designed ankyrin repeat domain of said comparator protein corresponding to said first moiety comprises SEQ ID NO: 69 instead of any one of SEQ ID NOs: 75 to 76 and SEQ ID NO: 82 instead of any one of SEQ ID NOs: 88 to 89.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 5, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 75 and SEQ ID NO: 88, whereas the designed ankyrin repeat domain of said comparator protein corresponding to said first moiety comprises SEQ ID NO: 69 instead of SEQ ID NO: 75 and SEQ ID NO: 82 instead of SEQ ID NO: 88.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 81 and any one of SEQ ID NOs: 88 to 94, whereas the designed ankyrin repeat domain of said comparator protein corresponding to said first moiety comprises SEQ ID NO: 69 instead of any one of SEQ ID NOs: 75 to 81 and SEQ ID NO: 82 instead of any one of SEQ ID NOs: 88 to 94.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 80 and any one of SEQ ID NOs: 88 to 93, whereas the designed ankyrin repeat domain of said comparator protein corresponding to said first moiety comprises SEQ ID NO: 69 instead of any one of SEQ ID NOs: 75 to 80 and SEQ ID NO: 82 instead of any one of SEQ ID NOs: 88 to 93.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 79 and any one of SEQ ID NOs: 88 to 92, whereas the designed ankyrin repeat domain of said comparator protein corresponding to said first moiety comprises SEQ ID NO: 69 instead of any one of SEQ ID NOs: 75 to 79 and SEQ ID NO: 82 instead of any one of SEQ ID NOs: 88 to 92.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 78 and any one of SEQ ID NOs: 88 to 91, whereas the designed ankyrin repeat domain of said comparator protein corresponding to said first moiety comprises SEQ ID NO: 69 instead of any one of SEQ ID NOs: 75 to 78 and SEQ ID NO: 82 instead of any one of SEQ ID NOs: 88 to 91.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 77 and any one of SEQ ID NOs: 88 to 90, whereas the designed ankyrin repeat domain of said comparator protein corresponding to said first moiety comprises SEQ ID NO: 69 instead of any one of SEQ ID NOs: 75 to 77 and SEQ ID NO: 82 instead of any one of SEQ ID NOs: 88 to 90.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises any one of SEQ ID NOs: 75 to 76 and any one of SEQ ID NOs: 88 to 89, whereas the designed ankyrin repeat domain of said comparator protein corresponding to said first moiety comprises SEQ ID NO: 69 instead of any one of SEQ ID NOs: 75 to 76 and SEQ ID NO: 82 instead of any one of SEQ ID NOs: 88 to 89.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 6, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 75 and SEQ ID NO: 88, whereas the designed ankyrin repeat domain of said comparator protein corresponding to said first moiety comprises SEQ ID NO: 69 instead of SEQ ID NO: 75 and SEQ ID NO: 82 instead of SEQ ID NO: 88.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 75 and SEQ ID NO: 88, whereas the designed ankyrin repeat domain of said comparator protein corresponding to said first moiety comprises SEQ ID NO: 69 instead of SEQ ID NO: 75 and SEQ ID NO: 82 instead of SEQ ID NO: 88.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 76 and SEQ ID NO: 89, whereas the designed ankyrin repeat domain of said comparator protein corresponding to said first moiety comprises SEQ ID NO: 69 instead of SEQ ID NO: 76 and SEQ ID NO: 82 instead of SEQ ID NO: 89.

In one embodiment, the protein of the invention comprises at least a first moiety and a second moiety, wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 77 and SEQ ID NO: 90, whereas the designed ankyrin repeat domain of said comparator protein corresponding to said first moiety comprises SEQ ID NO: 69 instead of SEQ ID NO: 77 and SEQ ID NO: 82 instead of SEQ ID NO: 90.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 78 and SEQ ID NO: 91, whereas the designed ankyrin repeat domain of said comparator protein corresponding to said first moiety comprises SEQ ID NO: 69 instead of SEQ ID NO: 78 and SEQ ID NO: 82 instead of SEQ ID NO: 91.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 79 and SEQ ID NO: 92, whereas the designed ankyrin repeat domain of said comparator protein corresponding to said first moiety comprises SEQ ID NO: 69 instead of SEQ ID NO: 79 and SEQ ID NO: 82 instead of SEQ ID NO: 92.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 79 and SEQ ID NO: 92, whereas the designed ankyrin repeat domain of said comparator protein corresponding to said first moiety comprises SEQ ID NO: 69 instead of SEQ ID NO: 79 and SEQ ID NO: 82 instead of SEQ ID NO: 92.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 80 and SEQ ID NO: 93, whereas the designed ankyrin repeat domain of said comparator protein corresponding to said first moiety comprises SEQ ID NO: 69 instead of SEQ ID NO: 80 and SEQ ID NO: 82 instead of SEQ ID NO: 93.

In one embodiment, the protein of the invention comprises at least a first moiety and a second moiety,
wherein said first moiety is a designed ankyrin repeat domain of the present invention, and
wherein said second moiety is a designed ankyrin repeat domain with binding specificity for serum albumin comprising an amino acid sequence with at least 80%, 81%, 82%, 83%, 84%, 85%, 86%, 87%, 88%, 89%, 90%, 91%, 92%, 93%, 94%, 95%, 96%, 97%, 98%, 99% or 100% amino acid sequence identity with SEQ ID NO: 4, and
wherein said protein exhibits improved pharmacokinetic properties compared to a comparator protein,
wherein said comparator protein consists of an identical amino acid sequence as said protein, with the exception that said designed ankyrin repeat domain of said first moiety comprises SEQ ID NO: 81 and SEQ ID NO: 94, whereas the designed ankyrin repeat domain of said comparator protein corresponding to said first moiety comprises SEQ ID NO: 69 instead of SEQ ID NO: 81 and SEQ ID NO: 82 instead of SEQ ID NO: 94.

In one embodiment, the designed ankyrin repeat domain of the invention, when fused C-terminally to SEQ ID NO: 4 via a polypeptide linker consisting of SEQ ID NO: 3, exhibits improved pharmacokinetic properties compared to a comparator designed ankyrin repeat domain fused C-terminally to SEQ ID NO:4 via a polypeptide linker consisting of SEQ ID NO: 3, and the amino acid sequences of said designed ankyrin repeat domain and said comparator designed ankyrin repeat domain only differ in residues, other than X, that differ between SEQ ID NO: 81 and SEQ ID NO: 74 and between SEQ ID NO: 94 and 87. In one embodiment, the amino acid sequences of said designed ankyrin repeat domain and said comparator designed ankyrin repeat domain only differ in residues, other than X, that differ between SEQ ID NO: 81 and SEQ ID NO: 74 and between SEQ ID NO: 93 and 86. In one embodiment, the amino acid sequences of said designed ankyrin repeat domain and said comparator designed ankyrin repeat domain only differ in residues, other than X, that differ between SEQ ID NO: 80 and SEQ ID NO: 73 and between SEQ ID NO: 92 and 85. In one embodiment, the amino acid sequences of said designed ankyrin repeat domain and said comparator designed ankyrin repeat domain only differ in residues, other than X, that differ between SEQ ID NO: 79 and SEQ ID NO: 72 and between SEQ ID NO: 91 and 84. In one embodiment, the amino acid sequences of said designed ankyrin repeat domain and said comparator designed ankyrin repeat domain only differ in residues, other than X, that differ between SEQ ID NO: 78 and SEQ ID NO: 71 and between SEQ ID NO: 90 and 83. In one embodiment, the amino acid sequences of said designed ankyrin repeat domain and said comparator designed ankyrin repeat domain only differ in residues, other than X, that differ between SEQ ID NO: 77 and SEQ ID NO: 70 and between SEQ ID NO: 90 and 83. In one embodiment, the amino acid sequences of said designed ankyrin repeat domain and said comparator designed ankyrin repeat domain only differ in residues that differ between SEQ ID NO: 76 and SEQ ID NO: 69 and between SEQ ID NO: 89 and 82. In one embodiment, the amino acid sequences of said designed ankyrin repeat domain and said comparator designed ankyrin repeat domain only differ in residues that differ between SEQ ID NO: 75 and SEQ ID NO: 69 and between SEQ ID NO: 88 and 82. In one embodiment, the amino acid sequences of said designed ankyrin repeat domain and said comparator designed ankyrin repeat domain only differ in position 8 and 15 of the N-terminal capping module and in position 14 and 18 of the C-terminal capping module, wherein the position numbers of the N-terminal capping module correspond to the positions in SEQ ID NO: 69 and the position numbers of the C-terminal capping module correspond to the positions in SEQ ID NO: 82.

In a third aspect, the invention provides nucleic acids encoding any designed ankyrin repeat domain and/or protein of the present invention. Furthermore, the invention provides vectors comprising any of said nucleic acids. In one preferred embodiment, said vector is an expression vector. Vectors and expression vectors are known to the person skilled in the art.

In a fourth aspect, the invention provides a pharmaceutical composition comprising a designed ankyrin repeat domain and/or a protein of the present invention, or a nucleic acid encoding a designed ankyrin repeat domain and/or a protein of the present invention, and optionally a pharmaceutically acceptable carrier and/or diluent. Pharmaceutically acceptable carriers and/or diluents are known to the person skilled in the art, and are explained in more detail below. Even further, a diagnostic composition is provided comprising one or more of the herein described designed ankyrin repeat domains and/or proteins of the invention.

In one embodiment, said pharmaceutical composition comprises proteins as described above and a pharmaceutically acceptable carrier, excipient or stabilizer, for example as described in Remington's Pharmaceutical Sciences 16$^{th}$ edition, Osol, A. Ed. [1980].

Suitable carriers, excipients or stabilizers known to the skilled man are saline, Ringer's solution, dextrose solution, Hank's solution, fixed oils, ethyl oleate, 5% dextrose in saline, substances that enhance isotonicity and chemical stability, buffers and preservatives. Other suitable carriers include any carrier that does not itself induce the production of antibodies harmful to the individual receiving the composition such as proteins, polysaccharides, polylactic acids, polyglycolic acids, polymeric amino acids and amino acid copolymers. A pharmaceutical composition may also be a combination formulation, comprising an additional active agent, such as an anti-cancer agent or an anti-angiogenic agent.

The formulations to be used for in vivo administration must be aseptic or sterile. This is readily accomplished by filtration through sterile filtration membranes.

The pharmaceutical composition of the invention may be administered by any suitable method within the knowledge of the skilled man. The preferred route of administration is parenterally. In parenteral administration, the pharmaceutical composition of the invention will be formulated in a unit dosage injectable form such as a solution, suspension or emulsion, in association with the pharmaceutically acceptable excipients as defined above.

The dosage and mode of administration will depend on the individual to be treated and the particular disease.

In one embodiment, said pharmaceutical composition is for use in the treatment of a disorder. Also provided is the use of the designed ankyrin repeat domain of the invention or the protein of the invention for the manufacture of a medicament for the treatment of a disorder.

In a fifth aspect, the invention provides methods of treatment. In one particular aspect, the invention provides a method of treating a medical condition, the method comprising the step of administering, to a patient in need of such treatment, a therapeutically effective amount of a designed ankyrin repeat domain of the invention, a protein of the invention, a nucleic acid of the invention, or a pharmaceutical composition of the invention. In one embodiment, said protein is a recombinant binding protein. In one preferred embodiment, the patient is a mammal, including human. In one preferred embodiment, said medical condition is a cancer, an infectious disease, preferably a viral infectious disease, a metabolic disease, a neurological disease, an eye disease, an immunological disease, an inflammatory disease, or an autoimmune disease. In one embodiment, said medical condition is a cancer. In one embodiment, such cancer is selected from the group consisting of epithelial malignancies (primary and metastatic), including but not limited to lung, colorectal, gastric, bladder, ovarian and breast carcinomas, blood cell malignancies, including but not limited to leukemia, lymphoma, and myeloma, sarcomas, including but not limited to bone and soft tissue sarcomas, and melanoma. In one preferred embodiment, such cancer is selected from the group consisting of liposarcoma, neuroblastoma, synovial sarcoma, melanoma and ovarian cancer. In another preferred embodiment, such cancer is selected from the group consisting of melanoma, lung cancer, liver cancer, stomach cancer, skin cancer, neuroblastoma, soft tissue sarcoma, bladder cancer, testicular cancer and ovarian cancer.

In one embodiment, said medical condition is an infectious disease, preferably a viral infectious disease. In one preferred embodiment, such infectious disease is a viral infection caused by hepatitis B virus (HBV). In another preferred embodiment such infectious disease is a viral infection caused by Epstein-Barr virus (EBV). In one embodiment, said medical condition is an autoimmune disease. In one preferred embodiment, such autoimmune disease is selected from the group consisting of systemic lupus erythematosus, rheumatoid arthritis and type I diabetes.

In a sixth aspect, the invention provides a method for preparing a protein, the method comprising the steps of
(A) preparing a nucleic acid that encodes in one open reading frame
    (i) at least one designed ankyrin repeat domain of the invention, and
    (ii) at least one designed ankyrin repeat domain with binding specificity for serum albumin, and
(B) transferring said nucleic acid into an expression host.

The term "nucleic acid", "DNA", "open reading frame", and "expression host" are well-known to the practitioner in the art. Examples of expression hosts are, amongst others, *Escherichia coli* (*E. coli*; see examples), Chinese hamster ovary cells (CHO cells), HEK293 cells, sf9 insect cells, or yeast (*Saccharomyces cerevisiae*). A preferred expression host is *E. coli*.

The term "transferring" refers to procedures such as transformation of bacteria or transfection of eukaryotic cells, procedures well-known to the practitioner in the art. Preferably said nucleic acid further comprises the elements needed for protein expression in the respective expression host. Like this the expression host is able to express said protein encoded by said open reading frame. The method may additionally comprise the steps of expressing said protein and/or of purifying said protein. Preferably said step of purifying said protein may comprise multiple protein purification methods. Such purification methods like ion-exchange chromatography or hydrophobic-interaction chromatography or diafiltration and alike are well-known to the person skilled in the art. Preferably the protein purity at the end of said step of purifying said protein, is at least 95%, preferably 96%, 97%, 98%, most preferably 99% according to analysis by SDS-PAGE. SDS-PAGE is a method well-known to the person skilled in the art and is described in the examples.

The invention is not restricted to the particular embodiments described in the Examples.

This specification refers to a number of amino acid sequences and SEQ ID NOs that are disclosed in the appended Sequence Listing, which is herewith incorporated by reference in its entirety.

Definitions

Unless defined otherwise herein, all technical and scientific terms used herein shall have the meanings that are commonly understood by those of ordinary skill in the art to which the present invention belongs.

The term "polypeptide" relates to a molecule consisting of one or more chains of multiple, i.e. two or more, amino acids linked via peptide bonds. Preferably, a polypeptide consists of more than eight amino acids linked via peptide bonds. The term "polypeptide" also includes multiple chains of amino acids, linked together by S—S bridges of cysteines. Polypeptides are well-known to the person skilled in the art.

The term "protein" refers to a molecule comprising a polypeptide, wherein at least part of the polypeptide has, or is able to acquire, a defined three-dimensional arrangement by forming secondary, tertiary, and/or quaternary structures within a single polypeptide chain and/or between multiple polypeptide chains. If a protein comprises two or more polypeptide chains, the individual polypeptide chains may be linked non-covalently or covalently, e.g. by a disulfide bond between two polypeptide chains. A part of a protein, which individually has, or is able to acquire, a defined three-dimensional arrangement by forming secondary and/or tertiary structures, is termed "protein domain". Such protein domains are well known to the practitioner skilled in the art.

Patent application WO2002/020565 and Forrer et al., 2003 (Forrer, P., Stumpp, M. T., Binz, H. K., Pluckthun, A., 2003. FEBS Letters 539, 2-6), contain a general description of repeat protein, repeat domain and repeat module features, techniques and applications.

The term "repeat domain" refers to a protein domain comprising two or more consecutive repeat modules as structural units, wherein said repeat modules have structural and sequence homology. Preferably, a repeat domain also comprises an N-terminal and/or a C-terminal capping module. For clarity, a capping module can be a repeat module. Such repeat domains, repeat modules, and capping modules, sequence motives, as well as structural homology and sequence homology are well known to the practitioner in the art from examples of ankyrin repeat domains (Binz et al., *J. Mol. Biol.* 332, 489-503, 2003; Binz et al., 2004, loc. Cit.; WO2002/020565; WO2012/069655), leucine-rich repeat domains (WO2002/020565), tetratricopeptide repeat domains (Main, E. R., Xiong, Y., Cocco, M. J., D'Andrea, L., Regan, L., Structure 11(5), 497-508, 2003), and armadillo repeat domains (WO2009/040338). It is further well known to the practitioner in the art, that such repeat domains are different from proteins comprising repeated amino acid sequences, where every repeated amino acid sequence is able to form an individual domain (for example FN3 domains of Fibronectin).

The term "ankyrin repeat domain" refers to a repeat domain comprising two or more consecutive ankyrin repeat modules as structural units, wherein said ankyrin repeat modules have structural and sequence homology.

The term "repeat modules" refers to the repeated amino acid sequence and structural units of the designed repeat domains, which are originally derived from the repeat units of naturally occurring repeat proteins. Each repeat module comprised in a repeat domain is derived from one or more repeat units of a family or subfamily of naturally occurring repeat proteins, preferably the family of ankyrin repeat proteins.

Accordingly, the term "ankyrin repeat module" refers to a repeat module, which is originally derived from the repeat units of naturally occurring ankyrin repeat proteins. Ankyrin repeat proteins are well known to the person skilled in the art.

For example, SEQ ID NOs: 4 to 8 and 12 to 23 each comprise one repeat domain comprising an N-terminal capping module (residues 1 to 30 of each of SEQ ID NOs: 4 to 8 and 12 to 23), two repeat modules (residues 31 to 63 and residues 64 to 96, respectively, of each of SEQ ID NOs: 4 to 8 and 12 to 23), and a C-terminal capping module (residues 97 to 124 of each of SEQ ID NOs: 4 to 8 and 12 to 23). As further examples, SEQ ID NOs: 9 to 11 each comprise one repeat domain comprising an N-terminal capping module (residues 1 to 30 of each of SEQ ID NOs: 9 to 11), three repeat modules (residues 31 to 63, residues 64 to 96, and residues 97 to 129, respectively, of each of SEQ ID NOs: 9 to 11), and a C-terminal capping module (residues 130 to 157 of each of SEQ ID NOs: 9 to 11). Furthermore, SEQ ID NOs: 69, 75, and 76 are examples of N-terminal capping modules, and SEQ ID NOs: 82, 88, and 89 are examples of C-terminal capping modules.

The term "designed" as used in designed repeat protein, designed repeat domain, designed ankyrin repeat domain, and the like refers to the property that such repeat proteins and repeat domains, respectively, are man-made and do not occur in nature.

The term "recombinant" as used in recombinant protein, recombinant binding protein, recombinant polypeptide, and the like, means that said protein or polypeptide is produced by the use of recombinant DNA technologies well known to the practitioner skilled in the art. For example, a recombinant DNA molecule (e.g. produced by gene synthesis) encoding a polypeptide can be cloned into a bacterial expression plasmid (e.g. pQE30, QIAgen), yeast expression plasmid, mammalian expression plasmid, or plant expression plasmid, or a DNA enabling in vitro expression. If, for example, such a recombinant bacterial expression plasmid is inserted into appropriate bacteria (e.g. *Escherichia coli*), these bacteria can produce the polypeptide(s) encoded by this recombinant DNA. The correspondingly produced polypeptide or protein is called a recombinant polypeptide or recombinant protein. In the context of the present invention, the term "binding protein" refers to a protein comprising a binding domain. A binding protein may also comprise two, three, four, five or more binding domains. Preferably, said binding protein is a recombinant binding protein.

The term "binding domain" means a protein domain exhibiting binding specificity for a target. Preferably, said binding domain is a recombinant binding domain.

The term "target" refers to an individual molecule such as a nucleic acid molecule, a peptide, polypeptide or protein, a carbohydrate, or any other naturally occurring molecule, including any part of such individual molecule, or to complexes of two or more of such molecules, or to a whole cell or a tissue sample, or to any non-natural compound. Preferably, a target is a naturally occurring or non-natural polypeptide or protein, or a polypeptide or protein containing chemical modifications, for example, naturally occurring or non-natural phosphorylation, acetylation, or methylation. For example, the target of each of the designed ankyrin repeat domains consisting of SEQ ID NOs: 4 to 8, is serum albumin.

The term "has binding specificity for a target", "specifically binding to a target", "binding to a target with high specificity", "specific for a target" or "target specificity" and the like means that a binding protein or binding domain binds in PBS to a target with a lower dissociation constant (i.e. it binds with higher affinity) than it binds to an unrelated protein such as the *E. coli* maltose binding protein (MBP). Preferably, the dissociation constant ("Kd") in PBS for the target is at least $10^2$; more preferably, at least $10^3$; even more preferably, at least $10^4$; or most preferably, at least $10^1$ times lower than the corresponding dissociation constant for MBP. Methods to determine dissociation constants of protein-protein interactions, such as surface plasmon resonance (SPR) based technologies (e.g. SPR equilibrium analysis) or isothermal titration calorimetry (ITC) are well known to the person skilled in the art. The measured $K_D$ values of a particular protein-protein interaction can vary if measured under different conditions (e.g., salt concentration, pH). Thus, measurements of $K_D$ values are preferably made with standardized solutions of protein and a standardized buffer, such as PBS.

The term "polypeptide tag" refers to an amino acid sequence attached to a polypeptide/protein, wherein said amino acid sequence is useful for the purification, detection, or targeting of said polypeptide/protein, or wherein said amino acid sequence improves the physicochemical behavior of the polypeptide/protein, or wherein said amino acid sequence possesses an effector function. The individual polypeptide tags, moieties and/or domains of a binding protein may be connected to each other directly or via polypeptide linkers. These polypeptide tags are all well known in the art and are fully available to the person skilled in the art. Examples of polypeptide tags are small polypeptide sequences, for example, His (e.g. the His-tag consisting of SEQ ID NO: 1), myc, FLAG, or Strep-tags or moieties such as enzymes (for example enzymes like alkaline phosphatase), which allow the detection of said polypeptide/protein, or moieties which can be used for targeting (such as immunoglobulins or fragments thereof) and/or as effector molecules.

The term "polypeptide linker" refers to an amino acid sequence, which is able to link, for example, two protein domains, a polypeptide tag and a protein domain, a protein domain and a non-polypeptide moiety such as polyethylene glycol or two polypeptide tags tags. Such additional domains, tags, non-polypeptide moieties and linkers are known to the person skilled in the relevant art. Examples of such polypeptide linkers are the linkers consisting of SEQ ID NOs: 2 and 3.

The terms "nucleic acid" or "nucleic acid molecule" refer to a polynucleotide molecule, which may be a ribonucleic acid (RNA) or deoxyribonucleic acid (DNA) molecule, either single stranded or double stranded, and includes modified and artificial forms of DNA or RNA. A nucleic acid molecule may either be present in isolated form, or be comprised in recombinant nucleic acid molecules or vectors.

In the context of the invention, the terms "medical condition", "disease" and "disorder" are used interchangeably and include but are not limited to autoimmune disorders, inflammatory disorders, retinopathies (particularly proliferative retinopathies), neurodegenerative disorders, infectious diseases, metabolic diseases, and neoplastic diseases. A "medical condition" may be one that is characterized by inappropriate cell proliferation. A medical condition may be a hyperproliferative condition. A medical condition may be a neoplastic disease. The term "neoplastic disease", as used herein, refers to an abnormal state or condition of cells or tissue characterized by rapidly proliferating cell growth or neoplasm. A medical condition may be a malignant neoplastic disease. A medical condition may be a cancer. The terms "cancer" and "cancerous" are used herein to refer to or describe the physiological condition in mammals that is typically characterized by unregulated cell growth. Cancer encompasses solid tumors and liquid tumors, as well as primary tumors and metastases. A "tumor" comprises one or more cancerous cells. Solid tumors typically also comprise tumor stroma. Examples of cancer include, but are not limited to, primary and metastatic carcinoma, lymphoma, blastoma, sarcoma, myeloma, melanoma and leukemia, and any other epithelial and blood cell malignancies. More particular examples of such cancers include brain cancer, bladder cancer, breast cancer, ovarian cancer, kidney cancer, colorectal cancer, gastric cancer, head and neck cancer, lung cancer, pancreatic cancer, prostate cancer, malignant melanoma, osteosarcoma, soft tissue sarcoma, carcinoma, squamous cell carcinoma, clear cell kidney cancer, head/neck squamous cell carcinoma, lung adenocarcinoma, lung squamous cell carcinoma, non-small-cell lung cancer (NSCLC), renal cell carcinoma, small-cell lung cancer (SCLC), triple negative breast cancer, acute lymphoblastic leukemia (ALL), acute myeloid leukemia (AML), chronic lymphocytic leukemia (CLL), chronic myeloid leukemia (CML), diffuse large B-cell lymphoma (DLBCL), follicular lymphoma, Hodgkin's lymphoma (HL), mantle cell lymphoma (MCL), multiple myeloma (MM), myelodysplastic syndrome (MDS), non-Hodgkin's lymphoma (NHL), Squamous Cell Carcinoma of the Head and Neck (SCCHN), chronic myelogenous leukemia (CML), small lymphocytic lymphoma (SLL), malignant mesothelioma, liposarcoma, neuroblastoma, or synovial sarcoma. The terms "autoimmune disease" and "autoimmune disorder" are used herein to refer to or describe disorders wherein the immune system of a mammal mounts a humoral or cellular immune response to the mammal's own tissue or to antigens that are not intrinsically harmful to the mammal, thereby producing tissue injury in such a mammal. Examples of autoimmune disorders are numerous and include, but are not limited to, systemic lupus erythematosus, rheumatoid arthritis and type I diabetes. Autoimmune diseases also include acute glomerulonephritis, Addison's disease, adult onset idiopathic hypoparathyroidism (AOIH), alopecia totalis, amyotrophic lateral sclerosis, ankylosing spondylitis, autoimmune aplastic anemia, autoimmune hemolytic anemia, Behcet's disease, Celiac disease, chronic active hepatitis, CREST syndrome, Crohn's disease, dermatomyositis, dilated cardiomyopathy, eosinophilia-myalgia syndrome, epidernolisis bullosa acquisita (EBA), giant cell arteritis, Goodpasture's syndrome, Graves' disease, Guillain-Barre syndrome, hemochromatosis, Henoch-Schonlein purpura, idiopathic IgA nephropathy, insulin-dependent diabetes mellitus (IDDM), juvenile rheumatoid arthritis, Lambert-Eaton syndrome, linear IgA dermatosis, lupus erythematosus, multiple sclerosis, myasthenia gravis, myocarditis, narcolepsy, necrotizing vasculitis, neonatal lupus syndrome (NLE), nephrotic syndrome, pemphigoid, phemphigus, polymyositis, primary sclerosing cholangitis, psoriasis, rapidly progressive glomerulonephritis (RPGN), Reiter's syndrome, rheumatoid arthritis, scleroderma, Sjogren's syndrome, stiff-man syndrome, thyroiditis, and ulcerative colitis. The terms "infectious disease" and "infection" are used herein to refer to or describe the invasion and multiplication of microorganisms in body tissues, especially causing pathological symptoms. Examples of infectious diseases include without limitation, viral diseases and bacterial diseases, such as, e.g., HIV infection, West Nile virus infection, hepatitis A, B, and C, small pox, tuberculosis, Vesicular Stomatitis Virus (VSV) infection, Respiratory Syncytial Virus (RSV) infection, human papilloma virus (HPV) infection, SARS, influenza, Ebola, viral meningitis, herpes, anthrax, lyme disease, and *E. Coli* infections, among others.

The term "treatment" or "treating" refers to both therapeutic treatment and prophylactic or preventative measures. Those in need of treatment include those who have already the disorder as well as those in which the disorder is to be prevented.

The term "therapeutically effective amount" refers to the amount sufficient to induce a desired biological, pharmacological, or therapeutic outcome in a subject. A therapeutically effective amount in the context of the invention means a sufficient amount of the binding protein to treat or prevent a disease or disorder at a reasonable benefit/risk ratio applicable to any medical treatment.

The term "mammal" for purposes of treatment refers to any animal classified as a mammal, including human, domestic and farm animals, nonhuman primates, and zoo, sports, or pet animals, such as dogs, horses, cats, cows, etc.

The term "incubation" refers to incubation at pH 7.4. In one embodiment, said incubation at pH 7.4 refers to an incubation in PBS.

The term "PBS" means a phosphate buffered water solution containing 137 mM NaCl, 10 mM phosphate and 2.7 mM KCl and having a pH of 7.4.

The term improved pharmacokinetic properties refers to an increased area under the curve, a reduced clearance, or an increased terminal half-life. These parameters of pharmacokinetic properties and ways to determine them are well known in the art (see, e.g., Mahmood, I., Methods to determine pharmacokinetic profiles of therapeutic proteins, *Drug Discov Today: Technol.*, Volume 5, Issue 2-3 Autumn 2008, Pages e65-e69, doi:10.1016/j.ddtec.2008.12.001).

In the context of the present invention, the term "any amino acids" preferably means any of the 20 most often naturally occurring amino acids, namely alanine (ala; A), arginine (arg; R), asparagine (asn, N), aspartic acid (asp, D), cysteine (cys, C), glutamine (gln, Q), glutamic acid (glu, E), glycine (gly, G), histidine (his, H), isoleucine (ile, I), leucine (leu, L), lysine (lys, K), methionine (met, M), phenylalanine (phe, F), proline (pro, P), serine (ser, S), threonine (thr, T), tryptophan (trp, W), tyrosine (tyr, Y), valine (val, V).

EXAMPLES

Proteins used in the examples:
Protein #4 (SEQ ID NO: 4 with a His-tag (SEQ ID NO: 1) fused to its N-terminus);
Protein #5 (SEQ ID NO: 5 with a His-tag (SEQ ID NO: 1) fused to its N-terminus);
Protein #6 (SEQ ID NO: 6 with a His-tag (SEQ ID NO: 1) fused to its N-terminus);
Protein #7 (SEQ ID NO: 7 with a His-tag (SEQ ID NO: 1) fused to its N-terminus);
Protein #8 (SEQ ID NO: 8 with a His-tag (SEQ ID NO: 1) fused to its N-terminus);
Protein #9 (SEQ ID NO: 9 with a His-tag (SEQ ID NO: 1) fused to its N-terminus);
Protein #10 (SEQ ID NO: 10 with a His-tag (SEQ ID NO: 1) fused to its N-terminus);
Protein #11 (SEQ ID NO: 11 with a His-tag (SEQ ID NO: 1) fused to its N-terminus);
Protein #12 (SEQ ID NO: 12 with a His-tag (SEQ ID NO: 1) fused to its N-terminus);
Protein #13 (SEQ ID NO: 13 with a His-tag (SEQ ID NO: 1) fused to its N-terminus);
Protein #14 (SEQ ID NO: 14 with a His-tag (SEQ ID NO: 1) fused to its N-terminus);
Protein #15 (SEQ ID NO: 15 with a His-tag (SEQ ID NO: 1) fused to its N-terminus);
Protein #16 (SEQ ID NO: 16 with a His-tag (SEQ ID NO: 1) fused to its N-terminus);
Protein #17 (SEQ ID NO: 17 with a His-tag (SEQ ID NO: 1) fused to its N-terminus);
Protein #18 (SEQ ID NO: 18 with a His-tag (SEQ ID NO: 1) fused to its N-terminus);
Protein #19 (SEQ ID NO: 19 with a His-tag (SEQ ID NO: 1) fused to its N-terminus);
Protein #20 (SEQ ID NO: 20 with a His-tag (SEQ ID NO: 1) fused to its N-terminus);
Protein #21 (SEQ ID NO: 21 with a His-tag (SEQ ID NO: 1) fused to its N-terminus);
Protein #22 (SEQ ID NO: 22 with a His-tag (SEQ ID NO: 1) fused to its N-terminus);
Protein #23 (SEQ ID NO: 23 with a His-tag (SEQ ID NO: 1) fused to its N-terminus);
Protein #24 (SEQ ID NO: 24 with a His-tag (SEQ ID NO: 1) fused to its N-terminus);
Protein #25 (SEQ ID NO: 25 with a His-tag (SEQ ID NO: 1) fused to its N-terminus);
Protein #26 (SEQ ID NO: 26 with a His-tag (SEQ ID NO: 1) fused to its N-terminus);
Protein #27 (SEQ ID NO: 27 with a His-tag (SEQ ID NO: 1) fused to its N-terminus);
Protein #28 (SEQ ID NO: 28 with a His-tag (SEQ ID NO: 1) fused to its N-terminus);
Protein #29 (SEQ ID NO: 29 with a His-tag (SEQ ID NO: 1) fused to its N-terminus);
Protein #30 (SEQ ID NO: 30 with a His-tag (SEQ ID NO: 1) fused to its N-terminus);
Protein #31 (SEQ ID NO: 31 with a His-tag (SEQ ID NO: 1) fused to its N-terminus);
Protein #32 (SEQ ID NO: 32 with a His-tag (SEQ ID NO: 1) fused to its N-terminus);
Protein #33 (SEQ ID NO: 33 with a His-tag (SEQ ID NO: 1) fused to its N-terminus);

Protein #34 (SEQ ID NO: 34 with a His-tag (SEQ ID NO: 1) fused to its N-terminus);
Protein #35 (SEQ ID NO: 35 with a His-tag (SEQ ID NO: 1) fused to its N-terminus);
Protein #36 (SEQ ID NO: 36 with a His-tag (SEQ ID NO: 1) fused to its N-terminus);
Protein #37 (SEQ ID NO: 37 with a His-tag (SEQ ID NO: 1) fused to its N-terminus);
Protein #38 (SEQ ID NO: 38 with a His-tag (SEQ ID NO: 1) fused to its N-terminus);
Protein #39 (SEQ ID NO: 39 with a His-tag (SEQ ID NO: 1) fused to its N-terminus);
Protein #40 (SEQ ID NO: 40 with a His-tag (SEQ ID NO: 1) fused to its N-terminus);
Protein #41 (SEQ ID NO: 41 with a His-tag (SEQ ID NO: 1) fused to its N-terminus);
Protein #42 (SEQ ID NO: 42 with a His-tag (SEQ ID NO: 1) fused to its N-terminus);
Protein #43 (SEQ ID NO: 43 with a His-tag (SEQ ID NO: 1) fused to its N-terminus);
Protein #44 (SEQ ID NO: 44 with a His-tag (SEQ ID NO: 1) fused to its N-terminus);
Protein #45 (SEQ ID NO: 45 with a His-tag (SEQ ID NO: 1) fused to its N-terminus);
Protein #46 (SEQ ID NO: 46 with a His-tag (SEQ ID NO: 1) fused to its N-terminus);
Protein #47 (SEQ ID NO: 47 with a His-tag (SEQ ID NO: 1) fused to its N-terminus);
Protein #48 (SEQ ID NO: 48 with a His-tag (SEQ ID NO: 1) fused to its N-terminus);
Protein #49 (SEQ ID NO: 49 with a His-tag (SEQ ID NO: 1) fused to its N-terminus);
Protein #50 (SEQ ID NO: 50 with a His-tag (SEQ ID NO: 1) fused to its N-terminus);
Protein #51 (SEQ ID NO: 51 with a His-tag (SEQ ID NO: 1) fused to its N-terminus);
Protein #52 (SEQ ID NO: 52 with a His-tag (SEQ ID NO: 1) fused to its N-terminus);
Protein #53 (SEQ ID NO: 53 with a His-tag (SEQ ID NO: 1) fused to its N-terminus);
Protein #54 (SEQ ID NO: 54 with a His-tag (SEQ ID NO: 1) fused to its N-terminus);
Protein #55 (SEQ ID NO: 55 with a His-tag (SEQ ID NO: 1) fused to its N-terminus);
Protein #56 (SEQ ID NO: 56 with a His-tag (SEQ ID NO: 1) fused to its N-terminus);
Protein #57 (SEQ ID NO: 57 with a His-tag (SEQ ID NO: 1) fused to its N-terminus);
Protein #58 (SEQ ID NO: 58 with a His-tag (SEQ ID NO: 1) fused to its N-terminus);
Protein #59 (SEQ ID NO: 59 with a His-tag (SEQ ID NO: 1) fused to its N-terminus);
Protein #60 (SEQ ID NO: 60 with a His-tag (SEQ ID NO: 1) fused to its N-terminus);
Protein #61 (SEQ ID NO: 61 with a His-tag (SEQ ID NO: 1) fused to its N-terminus);
Protein #62 (SEQ ID NO: 62 with a His-tag (SEQ ID NO: 1) fused to its N-terminus);
Protein #63 (SEQ ID NO: 63 with a His-tag (SEQ ID NO: 1) fused to its N-terminus);
Protein #64 (SEQ ID NO: 64 with a His-tag (SEQ ID NO: 1) fused to its N-terminus);
Protein #65 (SEQ ID NO: 65 with a His-tag (SEQ ID NO: 1) fused to its N-terminus);
Protein #66 (SEQ ID NO: 66 with a His-tag (SEQ ID NO: 1) fused to its N-terminus);
Protein #67 (SEQ ID NO: 67 with a His-tag (SEQ ID NO: 1) fused to its N-terminus); and
Protein #68 (SEQ ID NO: 68 with a His-tag (SEQ ID NO: 1) fused to its N-terminus).

If not described otherwise, experiments were performed according to methods well-known to the person skilled in the art. The experimental conditions for some examples are also further described in WO2012069654 and WO2016156596.

Example 1: Construction of Designed Ankyrin Repeat Domains with Improved Pharmacokinetic Properties Proteins #9, #12, #16, and #20 are different examples of designed ankyrin repeat domains that, when fused to designed ankyrin repeat domains with binding specificity for serum albumin (resulting e.g. in Proteins #24, #27, #31, and #35, respectively) exhibit fast clearance and short terminal half-life. The pharmacokinetic properties are clearly inferior to the ones observed for designed ankyrin repeat domains with binding specificity for serum albumin (Steiner et al., 2017, loc.cit.) For Proteins #24, #27, #31, and #35, there are no known clearance mechanisms involved such as e.g. target mediated clearance.

The present invention provides amino acid sequences for designed ankyrin repeat domains that lead to improved pharmacokinetic profiles (See FIG. 1). We surprisingly found that we can modulate the pharmacokinetic properties by applying certain amino acid mutations in the designed ankyrin repeat domains. We mutated the proteins at different positions.

Substituting every position of a protein of 124 amino acid lengths by the 19 alternative amino acids and generating the combinations thereof would result in a theoretical diversity of $>10^{158}$ variants. As this is not experimentally feasible, we used rational approaches to refine the process. In the first two rounds we selected mostly surface exposed residues and exchanged them for charged/polar/neutral/hydrophobic amino acids and evaluated the impact on pharmacokinetic properties (as fusion proteins to designed ankyrin repeat domains with binding specificity for serum albumin). We combined multiple amino acid changes per construct and could like this identify variants with favorable amino acid compositions. In further three rounds, we analyzed the multiple amino acid changes in detail to identify the critical amino acid changes that lead to favorable pharmacokinetic properties. In the next two rounds we combined the critical amino acid changes again leading to constructs with minimal changes and improved pharmacokinetic properties. These amino acid changes are described in detail in this application. In summary, through a rationally designed process involving several rounds of amino acid changes at a multitude of positions and characterizing the resulting protein variants in vitro and in vivo, novel sequence patterns and motifs were identified which surprisingly led to improved pharmacokinetic properties when introduced in a designed ankyrin repeat domain. These amino acid sequence motifs are comprised in SEQ ID NOs: 75 to 81, 88 to 94, and 107 to 111. Proteins #10, #11, #13, #14, #15, #17, #18, #19, #21, #22, and #23 are examples of designed ankyrin repeat domains comprising such novel amino acid sequence motifs. Similarly, Proteins #25, #26, #28, #29, #30, #32, #33, #34, #36, #37, #38, #40, #41, #43, #44, #45, #47, #48, #49, #51, #52, #53, #55, #56, #58, #59, #60, #62, #63, #64, #66, #67, and #68 are examples of proteins comprising designed ankyrin repeat domains comprising such novel amino acid sequence motifs. The production and characterization as well as the use of these particularly selected sequence motifs is described in the following examples.

Example 2: Expression and Purification of Proteins

The DNA encoding each of the designed ankyrin repeat domain consisting of SEQ ID NOs: 4 to 23 and the DNA encoding each of the proteins consisting of SEQ ID NOs: 24 to 68 was cloned into a pQE (QIAgen, Germany) based expression vector providing an N-terminal His-tag to facilitate simple protein purification as described below. Proteins consisting of SEQ ID NOs: 4 to 68, additionally having a His-tag SEQ ID NO: 1 fused to their N termini, were produced in *E. coli*, purified to homogeneity, and stored in PBS buffer. Methods for the production and purification of proteins are well known to the practitioner in the art. For clarity, proteins #4 to #23 are individual designed ankyrin repeat domains, proteins #24 to #68 are proteins consisting two designed ankyrin repeat domains, of which one is a designed ankyrin repeat domain with binding specificity for serum albumin. Proteins expressed and purified as described in this paragraph were used for the experiments of Examples 3 to 11.

Alternatively, proteins consisting of SEQ ID NOs: 4 to 68, additionally having the amino acids GS at the N terminus, are produced in *E. coli*, purified to homogeneity, and stored in PBS buffer. In case the amino acids GS are at the N terminus, the Met residue additionally encoded by the expression vector is efficiently cleaved off in the cytoplasm of *E. coli* from the expressed polypeptide since the start Met is followed by a small Gly residue. The proteins consisting of SEQ ID NOs: 4 to 68, additionally having the amino acids GS at the N terminus, exhibit equivalent results in Examples 3 to 11 as the proteins consisting of SEQ ID NOs: 4 to 68, additionally having a His-tag (SEQ ID NO: 1) fused to the N terminus.

Example 3: Storage Stability Assessment

Proteins of Example 2 were tested for storage stability by incubating them at 100 micromolar protein concentration at 60° C. at pH 7.4 for 1 week (7 days). Buffer used was PBS (pH 7.4; 137 mM NaCl, 10 mM phosphate and 2.7 mM KCl). Upon mixing the protein with the PBS, the resulting pH value was pH 7.4. In parallel to the incubations at 60° C., aliquots of the proteins were incubated at −80° C. for 1 week (7 days) as controls.

Example 4: SDS-PAGE of Storage Stability Analysis Samples

Samples of proteins of Example 3 (10 microgram protein each lane) were analyzed on NuPAGE 4-12% Bis-Tris sodium dodecyl polyacrylamide gel electrophoresis (SDS-PAGE) gels (Thermo Fisher), stained with instant blue staining (Sigma Aldrich). Results are shown in FIG. 4. The SDS-PAGE analysis indicates high purity of all purified proteins. Similar results are obtained when analyzing proteins #39 to #68.

Example 5: Size-Exclusion Chromatography Analysis

Samples of Example 3 were analyzed on a GE Superdex 200 150/5 column on an Agilent 1200 HPLC system in PBS at 0.5 ml/min flow rate. Of each protein, 0.1 ml at 100 micromolar concentration were analyzed. Proteins #9 to #38 all elute as monomeric peaks with at least 95% of the area under the curve corresponding to monomer fraction. Results are shown in Table 1. These results indicate that the proteins are monomeric. Importantly, proteins #24 to #38, which were used for the pharmacokinetic analyses (Example 6), eluted at monomeric peak both after incubation at −80° C. and at 60° C. as described in Example 3. This indicates that these proteins are stable upon incubation at elevated temperature. Similar results are obtained when analyzing Proteins #39 to #68.

TABLE 1

Size exclusion chromatography of Proteins #9 to #38

| Protein* | Relative area % | Retention time [min] |
|---|---|---|
| #9 | 100.00 | 4.31 |
| #10 | 100.00 | 4.46 |
| #11 | 100.00 | 4.19 |
| #12 | 100.00 | 4.05 |
| #13 | 100.00 | 4.28 |
| #14 | 98.86 | 4.84 |
| #15 | 100.00 | 4.02 |
| #16 | 100.00 | 4.31 |
| #17 | 100.00 | 4.44 |
| #18 | 100.00 | 4.45 |
| #19 | 100.00 | 4.37 |
| #20 | 100.00 | 4.41 |
| #21 | 100.00 | 4.59 |
| #22 | 100.00 | 4.46 |
| #23 | 100.00 | 4.55 |
| #24 | 100.00 | 4.00 |
| #25 | 100.00 | 3.98 |
| #26 | 100.00 | 3.91 |
| #27 | 100.00 | 3.94 |
| #28 | 100.00 | 3.99 |
| #29 | 100.00 | 4.07 |
| #30 | 100.00 | 3.95 |
| #31 | 100.00 | 3.92 |
| #32 | 100.00 | 3.97 |
| #33 | 100.00 | 3.96 |
| #34 | 100.00 | 3.94 |
| #35 | 100.00 | 3.85 |
| #36 | 100.00 | 3.98 |
| #37 | 100.00 | 3.97 |
| #38 | 100.00 | 3.80 |

*Proteins #9 to #38 in this table represent proteins consisting of the corresponding amino acid sequence of SEQ ID NO: 9 to 38, and additionally an N-terminal His-tag (SEQ ID NO: 1).

Example 6: Mouse Pharmacokinetic Profiles of Protein Variants

Figure 5D:
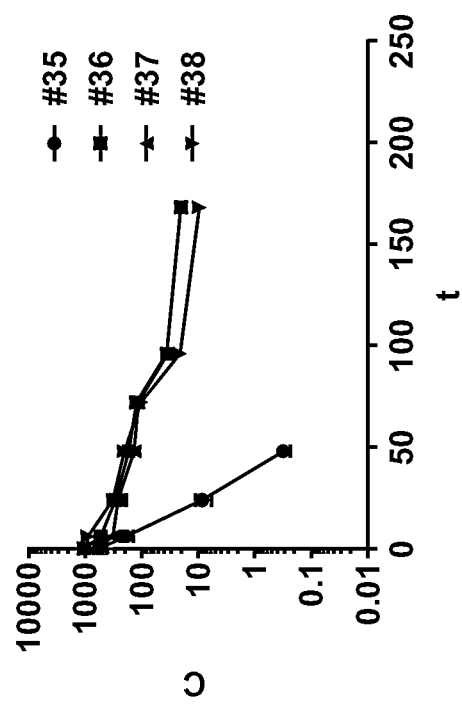
Figure 5A:
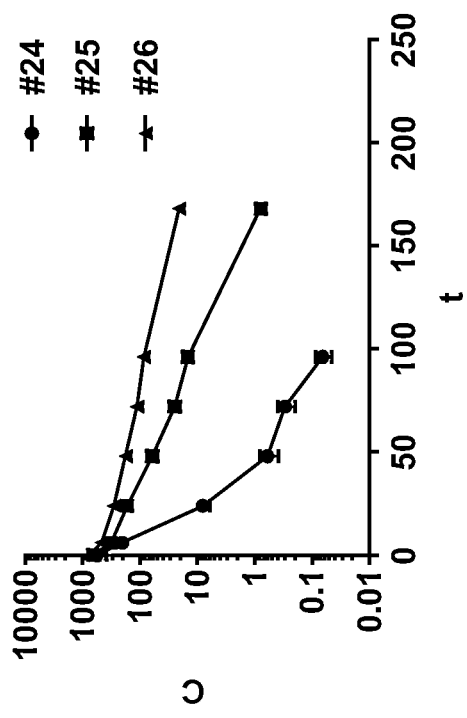
Figure 5C:
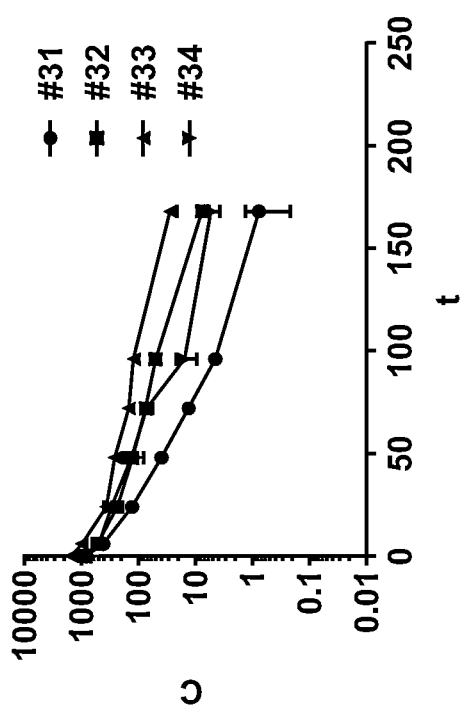

Pharmacokinetic analyses were performed in female Balb/c mice using Proteins #24 to #38, produced as described in Example 2. Proteins were applied at 1 mg/kg by intravenous injection into the tail vein. Six mice, divided in two groups of 3 mice each, were used for each protein. For every protein, blood was collected from the mice of one group 5 min, 24 h, 72 h, and 168 h post injection, and from the mice of the other group 6 h, 48 h, 96 h, and 168 h post injection. The blood samples were allowed to stand at room temperature and were centrifuged to generate serum using procedures well-known to the person skilled in the art, followed by storage at −80° C. pending analyses. Serum concentrations of Proteins #24 to #38 were determined by sandwich ELISA using a rabbit monoclonal anti-DARPin antibody as capture reagent and an anti-RGS-His antibody-HRP conjugate as detection reagent, and using a standard curve. The monoclonal anti-DARPin antibody was generated using conventional rabbit immunization and hybridoma generation techniques well known to the person skilled in the art, and the binding of the monoclonal antibody to Proteins #24 to #38 was verified prior to concentration determination experiments. Briefly, 100 µl of goat-anti-rabbit antibody (10 nM) (Thermo Scientific) in PBS per well were immobilized in a Maxisorp plate (Nunc, Denmark) overnight at 4° C. After washing 5 times with 300 µl PBST (PBS supplemented with 0.1% Tween 20), the wells were blocked with 300 µl PBST-C (PBST supplemented with 0.25% casein) for 1 h at room temperature with shaking at 450 rpm on a Titramax 1000 shaker (Heidolph, Germany). After washing 5 times as described above, 100 µl/well rabbit-anti-DARPin antibody (5 nM) in PBST-C were added for 1 h at room temperature with shaking at 450 rpm. After washing 5 times as described above, different dilutions of serum samples or standard references, diluted in PBST-C, were added for 2 hours at room temperature with shaking at 450 rpm. After washing 5 times as described above, 50 µl mouse anti-RGS-His antibody-HRP conjugate (QIAgen) (100 ng/ml) in PBST-C was added for 30 min at room temperature with shaking at 450 rpm. After washing 5 times as described above, the ELISA was developed using 50 µl TMB substrate. The reaction was stopped after 5 min using 100 µl 1 M $H_2SO_4$. The OD (OD 450 nm-OD 620 nm) was then recorded. Pharmacokinetic parameters were determined using standard software such as Phoenix WinNonLin (Certara, Princeton, USA) or GraphPadPrism (GraphPad Software, La Jolla, USA) and standard analyses such as non-compartmental analyses, all well-known to the person skilled in the art. The resulting pharmacokinetic profiles are shown in FIG. 5. The pharmacokinetic parameters area under the curve, clearance, volume of distribution, and half-life, derived from the measurements, are listed in Table 2, Table 3, Table 4, and Table 5.

TABLE 2

Mouse pharmacokinetic parameters of Proteins #24 to #26

| Parameter Protein | AUCINF_D_pred h*(nmol/L) | Cl_pred L/(h*kg) | Vss_pred L/kg | HL_Lambda_z h |
|---|---|---|---|---|
| #24* | 4398 | 0.0071 | 0.031 | 5.1 |
| #25* | 12221 | 0.0025 | 0.06 | 18.8 |
| #26* | 27102 | 0.0011 | 0.057 | 37.3 |

*Proteins #24 to #26 in this table represent proteins consisting of the corresponding amino acid sequence of SEQ ID NO: 24 to 26, and additionally an N-terminal His-tag (SEQ ID NO: 1).

TABLE 3

Mouse pharmacokinetic parameters of Proteins #27 to #30

| Parameter Protein | AUCINF_D_pred h*(nmol/L) | Cl_pred L/(h*kg) | Vss_pred L/kg | HL_Lambda_z h |
|---|---|---|---|---|
| #27* | 11332 | 0.003 | 0.046 | 13.1 |
| #28* | 21910 | 0.0016 | 0.075 | 36.7 |
| #29* | 30314 | 0.0011 | 0.051 | 33.1 |
| #30* | 22127 | 0.0016 | 0.052 | 25.4 |

*Proteins #27 to #30 in this table represent proteins consisting of the corresponding amino acid sequence of SEQ ID NO: 27 to 30, and additionally an N-terminal His-tag (SEQ ID NO: 1).

TABLE 4

Mouse pharmacokinetic parameters of Proteins #31 to #34

| Parameter Protein | AUCINF_D_pred h*(nmol/L) | Cl_pred L/(h*kg) | Vss_pred L/kg | HL_Lambda_z h |
|---|---|---|---|---|
| #31* | 11619 | 0.003 | 0.046 | 13.9 |
| #32 | 21758 | 0.0016 | 0.057 | 27.9 |
| #33* | 42071 | 0.0008 | 0.036 | 34.5 |
| #34* | 23398 | 0.0015 | 0.043 | 25.8 |

*Proteins #31 to #34 in this table represent proteins consisting of the corresponding amino acid sequence of SEQ ID NO: 31 to 34, and additionally an N-terminal His-tag (SEQ ID NO: 1).

TABLE 5

Mouse pharmacokinetic parameters of Proteins #35 to #38

| Parameter Protein | AUCINF_D_pred h*(nmol/L) | Cl_pred L/(h*kg) | Vss_pred L/kg | HL_Lambda_z h |
|---|---|---|---|---|
| #35* | 4222 | 0.0082 | 0.036 | 4.4 |
| #36* | 28590 | 0.0012 | 0.057 | 36.6 |
| #37* | 23517 | 0.0015 | 0.083 | 42.7 |
| #38* | 30107 | 0.0011 | 0.04 | 27.4 |

*Proteins #35 to #38 in this table represent proteins consisting of the corresponding amino acid sequence of SEQ ID NO: 35 to 38, and additionally an N-terminal His-tag (SEQ ID NO: 1).

These findings indicate that the sequence modifications described here lead to improved pharmacokinetic properties. In particular, Proteins #25 and #26 exhibit slower clearance, larger area under the curve, and longer terminal half-life than Proteins #24. Also, Proteins #28, #29 and #30 exhibit slower clearance, larger area under the curve, and longer terminal half-life than Protein #27. Similarly, Proteins #32, #33 and #34 exhibit slower clearance, larger area under the curve, and longer terminal half-life than Protein #31. And Proteins #36, #37 and #38 exhibit slower clearance, larger area under the curve, and longer terminal half-life than Protein #35.

Similar results are obtained when comparing the mouse pharmacokinetic parameters of Proteins #39 to #53. In particular, Proteins #40 and #41 exhibit slower clearance, larger area under the curve, and longer terminal half-life than Protein #39. Also, Proteins #43, #44 and #45 exhibit slower clearance, larger area under the curve, and longer terminal half-life than Protein #42. Similarly, Proteins #47, #48 and #49 exhibit slower clearance, larger area under the curve, and longer terminal half-life than Protein #46. And Proteins #51, #52 and #53 exhibit slower clearance, larger area under the curve, and longer terminal half-life than Protein #50. Likewise, similar results are obtained when comparing the mouse pharmacokinetic parameters of Proteins #54 to #68. In particular, Proteins #55 and #56 exhibit slower clearance, larger area under the curve, and longer terminal half-life than Protein #54. Also, Proteins #58, #59 and #60 exhibit slower clearance, larger area under the curve, and longer terminal half-life than Protein #57. Similarly, Proteins #62, #63 and #64 exhibit slower clearance, larger area under the curve, and longer terminal half-life than Protein #61. And Proteins #66, #67 and #68 exhibit slower clearance, larger area under the curve, and longer terminal half-life than Protein #65. The effect of the sequence modifications on pharmacokinetic properties of the proteins in mouse is thus observed when using different designed ankyrin repeat domains with binding specificity for serum albumin as means for half-life extension. The effect of the sequence modifications on pharmacokinetic properties of the proteins in mouse is thus also observed when using different linker sequences (e.g. Pro-Thr-rich linker instead of Gly-Ser-rich linker).

Example 7: Cynomolgus Monkey Pharmacokinetic Parameters Protein Variants

Pharmacokinetic analyses are performed in two male *Macaca fascicularis* for each protein using Proteins #24 to #38, produced as described in Example 2. Proteins are dosed at 1 mg/kg via 30 min intravenous infusion administration. For every protein, blood is collected from every animal 5 min, 6 h, 24 h, 72 h, 120 h, 168 h, 336 h, 408 h, 504 h, and 672 h post injection. The blood samples are allowed to stand at room temperature and are centrifuged to generate serum using procedures well-known to the person skilled in the art, followed by storage at −80° C. pending analyses. Serum concentrations of Proteins #24 to #68 are determined by sandwich ELISA as described in Example 6. Pharmacokinetic parameters are determined using standard software such as Phoenix WinNonLin (Certara, Princeton, USA) or GraphPadPrism (GraphPad Software, La Jolla, USA) and standard analyses such as non-compartmental analyses, all well-known to the person skilled in the art. The pharmacokinetic parameters area under the curve, clearance, volume of distribution, and half-life, are derived from the measurements.

The measurements indicate that the sequence modifications described herein lead to improved pharmacokinetic properties. In particular, Proteins #25 and #26 exhibit slower clearance, larger area under the curve, and longer terminal half-life than Protein #24. Also, Proteins #28, #29 and #30 exhibit slower clearance, larger area under the curve, and longer terminal half-life than Protein #27. Similarly, Proteins #32, #33 and #34 exhibit slower clearance, larger area under the curve, and longer terminal half-life than Protein #31. And Proteins #36, #37 and #38 exhibit slower clearance, larger area under the curve, and longer terminal half-life than Protein #35.

Similar results are obtained when comparing the cynomolgus monkey pharmacokinetic parameters of Proteins #39 to #53. In particular, Protein #40 and #41 exhibit slower clearance, larger area under the curve, and longer terminal half-life than Protein #39. Also, Proteins #43, #44 and #45 exhibit slower clearance, larger area under the curve, and longer terminal half-life than Protein #42. Similarly, Proteins #47, #48 and #49 exhibit slower clearance, larger area under the curve, and longer terminal half-life than Protein #46. And Proteins #51, #52 and #53 exhibit slower clearance, larger area under the curve, and longer terminal half-life than Protein #50. Likewise, similar results are obtained when comparing the cynomolgus monkey pharmacokinetic parameters of Proteins #54 to #68. In particular, Proteins #55 and #56 exhibit slower clearance, larger area under the curve, and longer terminal half-life than Protein #54. Also, Proteins #58, #59 and #60 exhibit slower clearance, larger area under the curve, and longer terminal half-life than Protein #57. Similarly, Proteins #62, #63 and #64 exhibit slower clearance, larger area under the curve, and longer terminal half-life than Protein #61. And Proteins #66, #67 and #68 exhibit slower clearance, larger area under the curve, and longer terminal half-life than Protein #65. The effect of the sequence modifications on pharmacokinetic properties of the proteins in cynomolgus monkey is thus observed when using different designed ankyrin repeat domains with binding specificity for serum albumin as means for half-life extension. The effect of the sequence modifications on pharmacokinetic properties of the proteins in cynomolgus monkey is thus also observed when using different linker sequences (e.g. Pro-Thr-rich linker instead of Gly-Ser-rich linker).

Example 8: Generation of Proteins

Proteins of the invention, comprising designed ankyrin repeat domain(s) with sequence modifications described herein, and comparator proteins described herein are generated by recombinant DNA technology or DNA synthesis well-known to the practitioner in the art. One example of such a protein of the invention is a protein comprising from N terminus to C terminus, (i) a designed ankyrin repeat domain consisting of SEQ ID NO: 4, (ii) a ProThr-rich linker consisting of SEQ ID NO: 3, (iii) a designed ankyrin repeat domain consisting of SEQ ID NO: 11, (iv) a ProThr-rich linker consisting of SEQ ID NO: 3, (v) a designed ankyrin repeat domain consisting of SEQ ID NO: 11, (vi) a ProThr-rich linker consisting of SEQ ID NO: 3, and (vii) a designed ankyrin repeat domain consisting of SEQ ID NO: 4 (i.e. SEQ ID NOs: 4-3-11-3-11-3-4). Similarly, one example of such a protein of the invention is a protein comprising from N terminus to C terminus, (i) a designed ankyrin repeat domain consisting of SEQ ID NO: 4, (ii) a ProThr-rich linker consisting of SEQ ID NO: 3, (iii) a designed ankyrin repeat domain consisting of SEQ ID NO: 10, (iv) a ProThr-rich linker consisting of SEQ ID NO: 3, (v) a designed ankyrin repeat domain consisting of SEQ ID NO: 10, (vi) a ProThr-rich linker consisting of SEQ ID NO: 3, and (vii) a designed ankyrin repeat domain consisting of SEQ ID NO: 4 (i.e. SEQ ID NOs: 4-3-10-3-10-3-4). Similarly, one example of such a comparator protein is a protein comprising from N terminus to C terminus, (i) a designed ankyrin repeat domain consisting of SEQ ID NO: 4, (ii) a ProThr-rich linker consisting of SEQ ID NO: 3, (iii) a designed ankyrin repeat domain consisting of SEQ ID NO: 9, (iv) a ProThr-rich linker consisting of SEQ ID NO: 3, (v) a designed ankyrin repeat domain consisting of SEQ ID NO: 9, (vi) a ProThr-rich linker consisting of SEQ ID NO: 3, and (vii) a designed ankyrin repeat domain consisting of SEQ ID NO: 4 (i.e. SEQ ID NOs: 4-3-9-3-9-3-4). Analogously, proteins of the invention are prepared using designed ankyrin repeat domains with binding specificity for serum albumin consisting of SEQ ID NOs: 4 to 6, polypeptide linkers consisting of SEQ ID NOs: 2 or 3, and designed ankyrin repeat domains consisting of SEQ ID NOs: 10, 11, 13 to 15, 17 to 19 and 21 to 23. Analogously, comparator proteins as described herein are prepared using designed ankyrin repeat domains with binding specificity for serum albumin consisting of SEQ ID NOs: 4 to 6, polypeptide linkers consisting of SEQ ID NOs: 2 or 3, and designed ankyrin repeat domains consisting of SEQ ID NOs: 9, 12, 16, and 20. Examples of such proteins of the inventions are recombinant binding proteins (See FIG. 1). An example of a recombinant binding protein of the invention is a variant of the recombinant binding protein consisting of SEQ ID NO: 134 of WO2016156596, wherein position 158 is Q, position 165 is L, position 293 is R, position 297 is Q, position 339 is Q, position 346 is L, position 441 is R, and position 445 is Q. Methods to generate such proteins, for example recombinant binding proteins, are well-known to the practitioner in the art from e.g. WO2016156596 or WO2018054971.

Example 9: Production of Proteins

Proteins as described in Example 8, additionally having a His-tag (SEQ ID NO: 1) fused to the N terminus are produced as described in Example 2. Similarly, proteins as described in Example 8, additionally carrying the amino acids MGS at the N terminus (wherein the N-terminal methionine is efficiently cleaved off from the expressed polypeptide in the cytoplasm of *E. coli* since the start Met is followed by a small Gly residue), can be produced in *E. coli* and be purified using conventional methods. Similarly, a recombinant binding protein as described in Example 8, additionally carrying the amino acids MGS at the N terminus (wherein the N-terminal methionine is efficiently cleaved off from the expressed polypeptide in the cytoplasm of *E. coli* since the start Met is followed by a small Gly residue), can be produced in *E. coli* and be purified using conventional methods.

Example 10: Mouse Pharmacokinetic Profiles of Proteins

Proteins or recombinant binding proteins produced as described in Example 9 are tested in mouse to determine pharmacokinetic parameters as described in Example 6. It is observed that a protein consisting of SEQ ID NOs: 4-3-11-3-11-3-4 and a protein consisting of SEQ ID NOs: 4-3-10-3-10-3-4, exhibit slower clearance, larger area under the curve, and longer terminal half-life than a protein consisting of SEQ ID NOs: 4-3-9-3-9-3-4. Similarly, it is observed that a protein consisting of SEQ ID NOs: 5-3-14-3-14-3-5, a protein consisting of SEQ ID NOs: 5-3-13-3-13-3-5, or a protein consisting of SEQ ID NOs: 5-3-15-3-15-3-5, exhibit slower clearance, larger area under the curve, and longer terminal half-life than a protein consisting of SEQ ID NOs: 5-3-12-3-12-3-5. Similarly, it is observed that a protein consisting of SEQ ID NOs: 6-2-19-2-19-2-6, a protein consisting of SEQ ID NOs: 6-2-18-2-18-2-6, or a protein consisting of SEQ ID NOs: 6-2-17-2-17-2-6, exhibit slower clearance, larger area under the curve, and longer terminal half-life than a protein consisting of SEQ ID NOs: 6-2-16-2-16-2-6. Similarly, it is observed that a protein consisting of SEQ ID NOs: 4-3-23-3-23-3-4, a protein consisting of SEQ ID NOs: 4-3-22-3-22-3-4, or a protein consisting of SEQ ID NOs: 4-3-21-3-21-3-4, exhibit slower clearance, larger area under the curve, and longer terminal half-life than a protein consisting of SEQ ID NOs: 4-3-20-3-20-3-4.

Example 11: Cynomolgus Monkey Pharmacokinetic Profiles of Proteins

Proteins or recombinant binding proteins produced as described in Example 9 are tested in cynomolgus monkey to determine pharmacokinetic parameters as described in Example 7. It is observed that a protein consisting of SEQ ID NOs: 4-3-11-3-11-3-4 and a protein consisting of SEQ ID NOs: 4-3-10-3-10-3-4, exhibit slower clearance, larger area under the curve, and longer terminal half-life than a protein consisting of SEQ ID NOs: 4-3-9-3-9-3-4. Similarly, it is observed that a protein consisting of SEQ ID NOs: 5-3-14-3-14-3-5, a protein consisting of SEQ ID NOs: 5-3-13-3-13-3-5, or a protein consisting of SEQ ID NOs: 5-3-15-3-15-3-5, exhibit slower clearance, larger area under the curve, and longer terminal half-life than a protein consisting of SEQ ID NOs: 5-3-12-3-12-3-5. Similarly, it is observed that a protein consisting of SEQ ID NOs: 6-2-19-2-19-2-6, a protein consisting of SEQ ID NOs: 6-2-18-2-18-2-6, or a protein consisting of SEQ ID NOs: 6-2-17-2-17-2-6, exhibit slower clearance, larger area under the curve, and longer terminal half-life than a protein consisting of SEQ ID NOs: 6-2-16-2-16-2-6. Similarly, it is observed that a protein consisting of SEQ ID NOs: 4-3-23-3-23-3-4, a protein consisting of SEQ ID NOs: 4-3-22-3-22-3-4, or a protein consisting of SEQ ID NOs: 4-3-21-3-21-3-4, exhibit slower clearance, larger area under the curve, and longer terminal half-life than a protein consisting of SEQ ID NOs: 4-3-20-3-20-3-4.

Additional examples of N-terminal capping modules and designed ankyrin repeat domains comprising the surface design of the invention are provided in SEQ ID NOs: 112 to 142. These sequences additionally have the amino acids GS at the N terminus.

The invention claimed is:

1. A designed ankyrin repeat domain comprising (i) an N-terminal capping module having a glutamine (Q) at a position corresponding to position 8 of SEQ ID NO: 69 and/or a leucine (L), valine (V), isoleucine (I), methionine (M), or alanine (A) at a position corresponding to position 15 of SEQ ID NO: 69, and (ii) a C-terminal capping module having an arginine (R) at a position corresponding to position 14 of SEQ ID NO: 82 and/or a glutamine (Q) at a position corresponding to position 18 of SEQ ID NO: 82.

* * * * *